(12) United States Patent
Dreyer et al.

(10) Patent No.: US 6,246,993 B1
(45) Date of Patent: Jun. 12, 2001

(54) REORDER SYSTEM FOR USE WITH AN ELECTRONIC PRINTING PRESS

(75) Inventors: Mark G. Dreyer, Aurora; James L. Warmus, LaGrange; Robert W. Gill, Plainfield, all of IL (US); Roger Kitzmiller, Charlotte, NC (US)

(73) Assignee: R. R. Donnelly & Sons Company, Downers Grove, IL (US)

( * ) Notice: Subject to any disclaimer, the term of this patent is extended or adjusted under 35 U.S.C. 154(b) by 0 days.

(21) Appl. No.: 08/959,994

(22) Filed: Oct. 29, 1997

(51) Int. Cl.⁷ .................................................. G06F 17/60
(52) U.S. Cl. ............................ 705/9; 700/100; 700/110; 705/8; 705/410
(58) Field of Search ................................ 53/52, 147, 443, 53/447, 540; 270/1.01; 364/148.01, 468.01, 468.03, 468.05, 468.06, 468.15, 468.16, 468.17; 705/8, 9, 401, 402, 410; 700/28, 95, 99, 100, 108, 110

(56) References Cited

U.S. PATENT DOCUMENTS

| Re. 32,690 | 6/1988 | Wong ..................................... 270/54 |
| 3,582,621 | * 6/1971 | Lawler .................................. 364/138 |
| 3,872,460 | 3/1975 | Fredrickson et al. ......... 340/324 AD |
| 3,899,165 | 8/1975 | Abram et al. .......................... 270/54 |
| 4,095,780 | 6/1978 | Gaspar et al. ........................ 270/73 |
| 4,121,818 | 10/1978 | Riley et al. ............................. 270/54 |
| 4,346,446 | * 8/1982 | Erbstein et al. ...................... 702/182 |
| 4,395,031 | 7/1983 | Gruber et al. ........................ 270/54 |
| 4,426,072 | 1/1984 | Cole et al. ............................. 270/53 |
| 4,495,582 | 1/1985 | Dessert et al. ....................... 364/469 |
| 4,499,545 | * 2/1985 | Daniels et al. ....................... 705/402 |
| 4,500,083 | 2/1985 | Wong et al. ........................... 270/54 |
| 4,516,209 | 5/1985 | Scribner ................................ 364/466 |
| 4,517,637 | * 5/1985 | Cassell .................................. 364/138 |
| 4,536,176 | 8/1985 | Gaspar ................................. 493/365 |

(List continued on next page.)

FOREIGN PATENT DOCUMENTS

| 0 602547 A2 | 6/1994 | (EP) . |
| PCT/US86/ 00242 | 8/1986 | (WO) . |
| WO 95 07510 | 3/1995 | (WO) . |

OTHER PUBLICATIONS

Ultimate Technographics, Inc. Manual, "Poststrip," 1989.*
Dieckmann, Glenn, "Press Imposition for IBM 4250, General Information," R.R. Donnelley & Sons Company, Crawfordsville Manufacturing Division, Department CHT, Feb. 21, 1989.*
*Alpha Four, New Version 3*, "True Relational Database Power Without Programming, Reference Manual," Alpha Software Corporation, Lesson 20: Using Sets and Lesson 22: Advanced Sets: One–to–Many Links, 1993.*

(List continued on next page.)

*Primary Examiner*—Edward R. Cosimano
(74) *Attorney, Agent, or Firm*—Marshall, O'Toole, Gerstein, Murray & Borun

(57) ABSTRACT

A method of, and system for, selectively reordering the reprinting of books on one or more electronic presses are disclosed. In one embodiment, sensors and a processor are utilized to reorder books fouled by an auxiliary device. In another embodiment, a sensor, and a global processor in communication with first and second local processors respectively associated with first and second printing presses are utilized to reorder books on one of the first and second printing presses selected to minimize processing time and/or to maximize postal rate discounts. In another embodiment, a sensor and a press processor are utilized to reorder errored books by inserting a book back into a stream of books being printed if re-printing the book with the stream entitles the errored book to a predefined postal discount.

100 Claims, 48 Drawing Sheets

U.S. PATENT DOCUMENTS

| | | | |
|---|---|---|---|
| 4,554,044 | 11/1985 | Gaspar et al. | 156/510 |
| 4,601,003 | 7/1986 | Yoneyama et al. | 364/518 |
| 4,639,873 | 1/1987 | Baggarly et al. | 364/466 |
| 4,672,462 | 6/1987 | Yamada | 358/280 |
| 4,674,052 | 6/1987 | Wong et al. | 364/466 |
| 4,718,784 | 1/1988 | Drisko | 400/68 |
| 4,727,402 | 2/1988 | Smith | 355/14 SH |
| 4,729,037 | 3/1988 | Doelves | 358/299 |
| 4,734,865 | 3/1988 | Scullion et al. | 364/478 |
| 4,768,766 | 9/1988 | Berger et al. | 270/58 |
| 4,789,147 | 12/1988 | Berger et al. | 270/1.1 |
| 4,800,505 | 1/1989 | Axelrod et al. | 364/478 |
| 4,827,315 | 5/1989 | Wolfberg et al. | 346/160 |
| 4,866,628 * | 9/1989 | Natarajan | 364/468.08 |
| 4,900,001 | 2/1990 | Lapeyre | 270/1.1 |
| 4,903,139 | 2/1990 | Minter et al. | 358/296 |
| 4,908,768 | 3/1990 | Gelfer et al. | 364/464.03 |
| 4,910,612 | 3/1990 | Yamazaki | 358/496 |
| 4,928,252 | 5/1990 | Gabbe et al. | 364/519 |
| 4,937,761 | 6/1990 | Hassett | 364/518 |
| 4,968,993 | 11/1990 | Wolfberg et al. | 346/160 |
| 4,974,171 | 11/1990 | Yeh et al. | 364/519 |
| 5,001,500 | 3/1991 | Wolfberg et al. | 346/160 |
| 5,021,975 | 6/1991 | Yamanashi | 364/519 |
| 5,027,279 | 6/1991 | Gottlieb et al. | 364/478 |
| 5,043,749 | 8/1991 | Punater et al. | 346/153.1 |
| 5,067,024 | 11/1991 | Anzai | 358/296 |
| 5,072,397 * | 12/1991 | Barns-Slavin et al. | 705/402 |
| 5,105,283 | 4/1992 | Forest et al. | 358/401 |
| 5,112,179 | 5/1992 | Chan et al. | 412/1 |
| 5,119,306 | 6/1992 | Metelits et al. | 364/464.02 |
| 5,133,051 | 7/1992 | Handley | 395/148 |
| 5,136,316 | 8/1992 | Punater et al. | 346/153.1 |
| 5,142,667 | 8/1992 | Dimperio et al. | 395/115 |
| 5,144,562 | 9/1992 | Stikkelorum et al. | 364/478 |
| 5,177,877 | 1/1993 | Duchesne et al. | 34/51 |
| 5,178,063 | 1/1993 | Wolfberg et al. | 101/76 |
| 5,194,899 | 3/1993 | Buchanan | 355/244 |
| 5,245,701 | 9/1993 | Matsumoto | 395/129 |
| 5,267,155 | 11/1993 | Buchanan et al. | 364/419 |
| 5,271,065 | 12/1993 | Rourke et al. | 382/1 |
| 5,274,567 | 12/1993 | Kallin et al. | 364/478 |
| 5,274,757 | 12/1993 | Miyoski et al. | 395/146 |
| 5,289,569 | 2/1994 | Taniguchi | 395/145 |
| 5,293,310 * | 3/1994 | Carroll et al. | 705/14 |
| 5,295,236 | 3/1994 | Bjorge et al. | 395/134 |
| 5,299,310 | 3/1994 | Motoyama | 395/165 |
| 5,301,036 | 4/1994 | Barrett et al. | 358/448 |
| 5,313,564 | 5/1994 | Kafri et al. | 395/101 |
| 5,333,246 | 7/1994 | Nagasaka | 395/133 |
| 5,337,246 * | 8/1994 | Carroll et al. | 705/402 |
| 5,349,648 | 9/1994 | Handley | 395/148 |
| 5,353,222 | 10/1994 | Takise et al. | 364/419.17 |
| 5,359,423 | 10/1994 | Loce | 358/296 |
| 5,359,432 | 10/1994 | Peltzer et al. | 358/452 |
| 5,379,373 | 1/1995 | Hayaski et al. | 395/148 |
| 5,383,129 * | 1/1995 | Farrell | 705/400 |
| 5,384,886 | 1/1995 | Rourke | 395/147 |
| 5,396,321 | 3/1995 | McFarland et al. | 355/313 |
| 5,398,289 | 3/1995 | Rourke et al. | 382/1 |
| 5,412,566 | 5/1995 | Sawa | 364/419.14 |
| 5,442,561 * | 8/1995 | Yoshizawa et al. | 364/468.06 |
| 5,444,630 * | 8/1995 | Dlugos | 705/402 |
| 5,459,826 | 10/1995 | Archibald | 395/147 |
| 5,493,490 | 2/1996 | Johnson | 364/401 |
| 5,553,258 * | 9/1996 | Godiwala et al. | 711/3 |
| 5,594,860 | 1/1997 | Gauthier | 395/501 |
| 5,630,028 | 5/1997 | DeMeo | 395/110 |
| 5,729,665 | 3/1998 | Gauthier | 395/117 |
| B1 4,968,993 | 7/1993 | Wolfberg et al. | 346/160 |

OTHER PUBLICATIONS

"Design Your Forms, Power With Room To Grow: Xbasic™," advertisement, DBMS Magazine, Sep. 1994.*

Xeikon announcement, "Xeikon announces new RIP for the DCP–1 digital color press," Sep. 13, 1994.*

"Finding the Right Niches for Electronic Printing," *The Seybold Report on Desktop Publishing*, Mar. 7, 1994, pp. 12–18.*

Xeikon brochure, "Beta Specifications, Xeikon DCP–1 Digital Color Press," date unknown.*

Barco Graphics brochure, "RIP and Electronic Collation System for Xeikon DCP–1 Digital Printing Press," Feb. 2, 1994, with Addendum 1.*

*Seybold Report on Publishing Systems*, vol. 25, No. 22, ISSN: 0736–7260, Aug. 26, 1996.*

"Variable Postscript and the Coming of Age of Electronic Print–for–Profit," *Print on Demand Business*, May/Jun. 1996, pp. 64, 66–67.*

"Variable–Data Printing Comes of Age: Capabilities & Market Demand Converge," *Seybold Report on Publishing Systems*, vol. 27, No. 2, Sep. 15, 1997, pp. 3–24.*

"Indigo Variable Data Solution Evaluation," Interoffice Memorandum from R.R. Donnelley & Sons Company dated Jul. 26, 1995 (portions redacted).*

H. Sharples, "Software Automates Impositions; Prepress Imaging," vol. 65, No. 9, p. 67, Graphic Arts Monthly (Sep., 1993).*

"Linotype–Hell's Herkules: Fast, Versatile Drum Imager to Head IPEX lineup; Product Announcement," vol. 23, No. 1, p. 3, The Seybold Report on Publishing Systems (Sep. 1, 1993).*

"Aldus to Offer Presswise 2.0 Imposition Software for Large–Format Presses," PR Newswire (Sep. 7, 1993).*

P. Dyson, "Computer to Plate: Now There's a Market; Direct–to–Plate Production Now Feasible; includes related article on the Eskofot Escosan 2540 for boards and films," vol. 23, No. 4, p. 3, The Seybold Report on Publishing Systems (Oct. 11, 1993).*

"Imposition Cuts Stripping Time; Electronic Imposing System; Prepress Imaging," vol. 65, No. 11, p. 84, Graphic Arts Monthly (Nov., 1993).*

S. Edwards et al., "IFRA '93 Review: An Industry Riding the Crest of a Slump; IFRA European Newspaper Equipment Exhibition; includes related article on trade show rumors," vol. 23, No. 6, p. 3, The Seybold Report on Publishing Systems (Nov. 8, 1993).*

H. Sharples, "Electronic Imposition: Moving Forward," vol. 66, No. 2, p. 53, Graphic Arts Monthly (Feb., 1994).*

"Aldus Prepress Division Ships Presswise 2.0 for the Apple MacIntosh," PR Newswire (Mar. 22, 1994).*

"Press Imposition Software; Seybold Special Report: Seybold Seminars Boston '94, Part I; Product Announcement," vol. 23, No. 15, p. S74, The Seybold Report on Publishing Systems (Apr. 22, 1994).*

"High–Resolution Output; includes related articles on how to obtain a Hyphen print sample and naming a new screening technology; Seybold Special Report: Seybold Seminars Boston '94, part I," vol. 23, No. 15, p. S47, The Seybold Report on Publishing Systems (Apr. 22, 1994).*

P. Hilts, "Donnelley's Digital Production Vision; R.R. Donnelley and Sons invited book publishers to come to Crawfordsville to see the future of printing," vol. 241, No. 34, p. 24, Publishers Weekly (Aug. 22, 1994).*

A. Karsh, "Scitex's SGAUA Review: Savanna, GTO–DI Interface, Whisper Upgrade; Scitex Graphic Arts User Association, Scitex Savanna Typesetting System, Press Interface for GTO–DI, Autoflat Image Processing Software, MacCSS Connection Peripheral Server," vol. 24, No. 2, p. 11, The Seybold Report on Publishing Systems (Sep. 19, 1994).*

"Color Shop Goes Electronic; Color Tech Corp.," vol. 66, No. 10, p. 90, Graphic Arts Monthly (Oct., 1994).*

"Xerox and Scenicsoft Bring New Flexibility to Prepress Work With Postscript Files," vol. 7, No. 10, Worldwide Videotex (Oct., 1994).*

"High–Resolution Output Devices; Seybold Special Report: Seybold San Francisco '94, Part 1; Product Announcement," vol. 24, No. 3, p. S32, The Seybold Report on Publishing Systems (Oct. 26, 1994).*

"Output Servers; Seybold Special Report: Seybold San Francisco '94, part 2, Product Announcement," vol. 24, No. 3, p. T13, The Seybold Report on Publishing Systems (Oct. 26, 1994).*

"CTP Field Gets a New Entry; Linotype–Hell's Computer–to–Plate System, Gutenborg," vol. 66, No. 11, p. 102. Graphic Arts Monthly (Nov., 1994).*

AGFA Internet Website: "Chromapress Software" (Oct. 30, 1998), URL: www.agfahome.com/products/printing/software.html.*

AGFA Internet Website: "Digital Color Printing System: Personalizer–X v2.0, Variable Data Software for Chromapress" (Oct. 30, 1998), URL: www.agfahome.com/products/printing/software/personalizerx.html.*

Atlas Internet Website: "PrintShop Mail" (Oct. 30, 1998), URL: www.atlassoftware.n1/products/psmail/psmail.html.*

Atlas Internet Website: "Atlas Software Products" (Oct. 30, 1998), URL: www.atlassoftware.n1/products/products.html.*

BARCO Graphics Internet Website: "Variable Information Printing" (Oct. 29, 1998), URL: www.barco.com/graphics/systems/vip/viphome.htm.*

BARCO Graphics Internet Website: "BARCO Graphics VIP concept gives digital printing its true original dimension," URL: www.barco.com/graphics;press/prl78ife.htm (Oct. 29, 1998).*

BARCO Graphics Internet Website: "BARCO Graphics wins Seybold Award for variable date," URL: www.barco.com/graphics/press/pr162ice.htm (Oct. 29, 1998).*

BARCO Graphics Internet Website: "VIPDesigner Technical Specifications" (Oct. 29, 1998), URL: www.barco.com/graphic/data/vipdesigf.htm.*

BITSTREAM Internet Website: "Application Products: PageFlex™" (Oct. 29, 1998), URL: www.bitstream.com/products/application/pageflex/index.html.*

Colorage/Splash Internet Website: "Splash Technology, About Our Company," URL: www.colorage.com/company/about.html (Oct. 30, 1998).*

Colorage/Splash Internet Website: "Splash Launches Docu-Press Series of Servers for Xerox Midrange Digital Color Copiers" (Oct. 30, 1998), URL: www.colorage.com/company/press98/9803Mar2.html.*

Document Sciences Corportion Internet Website: "Document Sciences Corporation", URL: www.xerox.com/alliance/psg/docsci.htm (Oct. 31, 1998).*

Document Sciences Corporation Internet Website: "Products and Solutions," URL: www.docscience.com/product.htm (Oct. 31, 1998).*

Document Sciences Corporation Internet Website: "Tomorrow's Technology is Today's Reality," URL: www.docuscience.com/products/compuset.htm (Oct. 31, 1998).*

DPS Internet Website: "DataBase Publishing Software, About DPS" (Oct. 31, 1998), URL: www.databasepub.com/about.html.*

DPS Internet Website: "Expert Publisher: Intelligent Automation" (Oct. 31, 1998), URL: www.databasepub.com/newpub.html.*

DPS Internet Website, URL: www.databasepub.com/bottom.html (Oct. 31, 1998).*

DPS Internet Website: "Applications," URL: www.databasepub.com/left.html (Oct. 31, 1998).*

DPS Internet Website: "Catalog Genie Grants Wishes" (Oct. 31, 1998), URL: www.databasepub.com/catsoftware.html.*

DPS Internet Website: "DPS Introduces Catalog Genie" (Oct. 31, 1998), URL: www.databasepubl.com/genie.html.*

DPS Internet Website: "DPS Introduces New Release of Catalog Genie" (Oct. 31. 1998), URL: www.databasepub.com/genie2.html.*

Elixir Internet Webiste: "Xerox to Distribute and Support Elixir's Opus (R) Worldwide," URL: www.eliximt.elixir.com/nwsevnt. (Oct. 31, 1998).*

Elixir Internet Website: "Elixir Products" (Oct. 31, 1998), URL: www.elixir.com/Products/products.htm.*

Elixir Internet Website: "Opus," URL: www.elixir.com/Products/opus.htm (Oct. 31, 1998).*

Elixir Internet Website: "DataMerge," URL: www.elixir.com/Products/dmerge.htm (Oct. 31, 1998).*

Elixir Internet Website: "AppBuilder for AFP," URL: www.elixir.com/Products/appafp.htm (Oct. 31, 1998).*

Elixir Internet Website: "AppBuilder for VIPP" (Oct. 31, 1998), URL:www.elixir.com/Products.appvipp.htm.*

Em Software Internet Website: "Welcome to Em Software on the Web!" (Oct. 31, 1998). URL: www.emsoftware.com/.*

Em Software Internet Website: "Em Software—Products" (Oct. 31, 1998), URL: www.emsoftware.com/products.html.*

Group 1 Software Internet Website: "Group 1 Software: EZ–Letter" (Oct. 31, 1998), URL: www.group1software.com/products/ds.asp.*

Indigo Internet Website: "Yours Truly Software" (Oct. 29, 1998), URL: www.indigonet.com/yours_truly.htm.*

Meadows Information Systems Internet Website: "About Meadows Information Systems, Inc.", URL: www.meadowsinfo.com/mishtml/meadows.htm (Oct. 27, 1998).*

Meadows Information Systems Internet Website: "Auto-Price XTension to QuarkXPress by Meadows Information Systems", URL: www.meadowsinfo.com/mishtml/autopric.htm (Oct. 27, 1998).*

Meadows Information Systems Internet Website: "Data-Merge XTension to QuarkXPress by Meadows Information Systems", URL: www.meadowsinfo.com/mishtml/datamerg.htm (Oct. 27, 1998).*

Meadows Information Systems Internet Website: "Group Picture XTension to QuarkXPress by Meadows Information Systems" (Oct. 17, 1998), URL: www.meadowsinfo.com/mishtml/grouppic.htm.*

Scitex Internet Website: "Scitex Darwin Desktop 2.0 is Now Shipping," URL: www.scitex.com/press/english/darwin2.htm (Oct. 29, 1998).*

T/R Systems Internet Website: "About T/R Systems" (Nov. 2, 1998), URL: www.trsystems.com/tr_docs/About.htm.*

Varis Corporation Internet Website: "Varis Corporation and Scitex Digital Printing Announce World Wide Co–Marketing Agreement for High Speed Variable PostScript Printing," URL: www.variscorp.com/ns/ns.sci.html#pr (Nov. 2, 1998).*

Varis Corporation Internet Website: "Redefining the process . . . VariScript Software," URL: www.variscopr.com/pro/text.html (Nov. 2, 1998).*

Varis Corporation Internet Website: "Varis Corporation Unveils Unprecedented Products for Variable Print–On–Demand Market," URL: www.variscorp.com/ns/ns.pro.html#pr (Nov. 2, 1998).*

BARCO Graphics/IBM brochure: "BARCO VIPDesigner Software for the IBM InfoColor 70 Printer" (1998).*

Colorbus Advertisement: "There's One in Every Family," *DocuWorld*, Issue 1, vol. 2, p. 2 (1998).*

DocuWorld Product Watch: "Authoring Tool for Variable Information Jobs," *DocuWorld*, Issue 1, vol. 2, p. 72 (1998).*

Drennan, Bill, et al., "Xerox offers programming language," *The Seybold Report on Publishing Systems*, vol. 27, No. 7, p. 9 (Dec. 1997).*

Eldad, Gefen, "Getting Personal, Printing your first personalized job may be easier than you think", DocuWorld Issue 1, vol. 2, p. 42 (1998).*

Group 1 Software Advertisement: "DOC1 Delivers What You Want, When You Need It," *DocuWorld*, Issue 1, vol. 2, p. 23 (1998).*

Indigo Brochure: "Indigo Yours Truly Personalization—Profitability" (1997).*

Meadows Information Systems Flyer: "DataMerge—Personalize documents with this powerful XTension to QuarkXPress" (undated).*

Meadows Information Systems Flyer: "Group Picture—Save complete Groups of QuarkXPress items in their original layout" (undated).*

Scitex/Xerox Advertisement: "Xerox and Scitex Bring You the Magic of Professional Color," *DocuWorld*, Issue 1, vol. 2, p. 39 (1998).*

Scitex brochure: "Scitex Darwin: Powerful Variable Information Tool for Scitex DFEs" (undated).*

Scitex brochure: "SX3000/40 Digital Front End: A Powerful Color Print Server for the Xerox DocuColor 40" (undated).*

Scitex brochure: "SX3000/70 Digital Front End: A Powerful Color Print Server for the Xerox DocuColor 70" (undated).*

Scitex brochure: "Scitex Xerox Success Stories: CAD Graphics, Chicago, Illinois" (Jul. 1998).*

Scitex brochure: "Scitex Xerox Success Stories: DW Graphics, Stockton, CA" (Jul. 1998).*

Xerox brochure: "think color: Xerox DocuColor 70" (1998).*

Xerox brochure: "New Generation Fiery Technology for the Xerox DocuColor 70 Digital Color Press: Fiery ZX–70" (1998).*

Xerox brochure: World–class prepress performance for the Xerox DocuColor 70 Digital Color Press: Scitex SX3000T (1998).*

Xerox brochure: "Xerox VIPP—the fastest, most reliable method to reach your customers individually . . . all at the same time" (1998).*

Xerox brochure: "BOOM!—The Explosion is in Short–run Digital Color Printing" (1998).*

* cited by examiner

534

| Item | 1 | DB.ORG.LOG | | |
|---|---|---|---|---|
| Tables | Segments | | | |
| | ID | Start Rec | End Rec | Name |
| | | | | |
| | Book Tickets | | | |
| | ID | Start Rec | End Rec | Seg_ID |
| | | | | |
| | Press Runs | | | |
| | ID | Btk_ID | Start Time | End Time |
| | | | | |
| | Files | | | |
| | ID | Filename | | |
| | | | | |
| | Rip Log | | | |
| | ID | File_ID | Press_Num | Rip Time | Rip Files Deleted |
| | | | | |
| | Book Ticket Files | | | |
| | Book Ticket ID | File | | |
| | | | | |
| | Reorder Table | | | |
| | Rec Number | Final Spot | Complete | |
| | | | | |
| | Job Parameters | | | |
| | Quark File Name | Database Name | | |

534

| Item | 2 | DB.ORG.LOG | | | |
|---|---|---|---|---|---|
| Tables | Segments | | | | |
| | ID | Start Rec | End Rec | Name | |
| | | | | | |
| | Book Tickets | | | | |
| | ID | Start Rec | End Rec | Seg_ID | |
| | | | | | |
| | Press Runs | | | | |
| | ID | Btk_ID | Start Time | End Time | |
| | | | | | |
| | Files | | | | |
| | ID | Filename | | | |
| | | | | | |
| | Rip Log | | | | |
| | ID | File_ID | Press_Num | Rip time | Rip Files Deleted |
| | | | | | |
| | Book Ticket Files | | | | |
| | Book Ticket ID | File | | | |
| | | | | | |
| | Reorder Table | | | | |
| | Rec Number | Final Spot | Complete | | |
| | | | | | |
| | Job Parameters | | | | |
| | Quark File Name | Database Name | | | |
| | Cust Data.QxP | DB.ORG | | | |

| Item | 3 | DB.ORG.LOG | | |
|---|---|---|---|---|
| Tables | Segments | | | |
| | ID | Start Rec | End Rec | Name |
| | 1 | 1 | 2000 | DB.ORG.1 |
| | 2 | 2001 | 4000 | DB.ORG.2 |
| | 3 | 4001 | 6000 | DB.ORG.3 |
| | 4 | 6001 | 8000 | DB.ORG.4 |
| | 5 | 8001 | 10000 | DB.ORG.5 |

| Book Tickets | | | |
|---|---|---|---|
| ID | Start Rec | End Rec | Seg_ID |

| Press Runs | | | |
|---|---|---|---|
| ID | Btk_ID | Start Time | End Time |

| Files | |
|---|---|
| ID | Filename |

| Rip Log | | | | |
|---|---|---|---|---|
| ID | File_ID | Press_Num | Rip time | Rip Files Deleted |

| Book Ticket Files | |
|---|---|
| Book Ticket ID | File |

| Reorder Table | | |
|---|---|---|
| Rec Number | Final Spot | Complete |

| Job Parameters | |
|---|---|
| Quark File Name | Database Name |
| Cust Data.QxP | DB.ORG |

FIG. 15C

Item 4 DB.ORG.LOG

Tables

Segments

| ID | Start Rec | End Rec | Name |
|---|---|---|---|
| 1 | 1 | 2000 | DB.ORG.1 |
| 2 | 2001 | 4000 | DB.ORG.2 |
| 3 | 4001 | 6000 | DB.ORG.3 |
| 4 | 6001 | 8000 | DB.ORG.4 |
| 5 | 8001 | 10000 | DB.ORG.5 |

Book Tickets — 546

| ID | Start Rec | End Rec | Seg_ID |
|---|---|---|---|
| 1 | 1 | 1000 | 1 |
| 2 | 1001 | 2000 | 1 |
| 3 | 2001 | 3000 | 2 |
| 4 | 3001 | 4000 | 2 |
| 5 | 4001 | 5000 | 3 |
| 6 | 5001 | 6000 | 3 |
| 7 | 6001 | 7000 | 4 |
| 8 | 7001 | 8000 | 4 |
| 9 | 8001 | 9000 | 5 |
| 10 | 9001 | 10000 | 5 |

Press Runs

| ID | Btk_ID | Start Time | End Time |
|---|---|---|---|

Files — 544

| ID | Filename |
|---|---|
| 1 | Cust Data.QxP.M |
| 2 | Cust Data.QxP.01.V01 |
| 3 | Cust Data.QxP.01.V02 |
| 4 | Cust Data.QxP.01.V03 |
| 5 | Cust Data.QxP.01.V04 |

Rip Log

| ID | File_ID | Press_Num | Rip Time | Rip Files Deleted |
|---|---|---|---|---|

Book Ticket Files — 542

| Book Ticket ID | File |
|---|---|
| 1 | 1 |
| 1 | 2 |
| 1 | 3 |
| 2 | 1 |
| 2 | 4 |

Reorder Table — 534

| Rec Number | Final Spot | Complete |
|---|---|---|

Job Parameters

| Quark File Name | Database Name |
|---|---|
| Cust Data.QxP | DB.ORG |

FIG. 15D

Item 5    DB.ORG.LOG

534

Tables
    Segments

| ID | Start Rec | End Rec | Name |
|---|---|---|---|
| 1 | 1 | 2000 | DB.ORG.1 |
| 2 | 2001 | 4000 | DB.ORG.2 |
| 3 | 4001 | 6000 | DB.ORG.3 |
| 4 | 6001 | 8000 | DB.ORG.4 |
| 5 | 8001 | 10000 | DB.ORG.5 |

Book Tickets

| ID | Start Rec | End Rec | Seg_ID |
|---|---|---|---|
| 1 | 1 | 1000 | 1 |
| 2 | 1001 | 2000 | 1 |
| 3 | 2001 | 3000 | 2 |
| 4 | 3001 | 4000 | 2 |
| 5 | 4001 | 5000 | 3 |
| 6 | 5001 | 6000 | 3 |
| 7 | 6001 | 7000 | 4 |
| 8 | 7001 | 8000 | 4 |
| 9 | 8001 | 9000 | 5 |
| 10 | 9001 | 10000 | 5 |

Press Runs

| ID | Btk_ID | Start Time | End Time |
|---|---|---|---|

Files

| ID | Filename |
|---|---|
| 1 | Cust Data.QxP.M |
| 2 | Cust Data.QxP.01.V01 |
| 3 | Cust Data.QxP.01.V02 |
| 4 | Cust Data.QxP.01.V03 |
| 5 | Cust Data.QxP.01.V04 |

548

Rip Log

| ID | File_ID | Press_Num | Rip Time | Rip Files Deleted |
|---|---|---|---|---|
| 1 | 1 | 21 | 10/1/97 | |
| 2 | 2 | 21 | 12:21 | |
| 3 | 3 | 21 | 10/1/97 1:06 | |
| | | | 10/1/97 1:24 | |

Book Ticket Files

| Book Ticket ID | File |
|---|---|
| 1 | 1 |
| 1 | 2 |
| 1 | 3 |
| 2 | 1 |
| 2 | 4 |

Reorder Table

| Rec Number | Final Spot | Complete |
|---|---|---|

Job Parameters

| Quark File Name | Database Name |
|---|---|
| Cust Data QxP | DB.ORG |

FIG. 15E

Item 6    DB.ORG.LOG

→ 534

Tables

Segments

| ID | Start Rec | End Rec | Name |
|---|---|---|---|
| 1 | 1 | 2000 | DB.ORG.1 |
| 2 | 2001 | 4000 | DB.ORG.2 |
| 3 | 4001 | 6000 | DB.ORG.3 |
| 4 | 6001 | 8000 | DB.ORG.4 |
| 5 | 8001 | 10000 | DB.ORG.5 |

Book Tickets

| ID | Start Rec | End Rec | Seg_ID |
|---|---|---|---|
| 1 | 1 | 1000 | 1 |
| 2 | 1001 | 2000 | 1 |
| 3 | 2001 | 3000 | 2 |
| 4 | 3001 | 4000 | 2 |
| 5 | 4001 | 5000 | 3 |
| 6 | 5001 | 6000 | 3 |
| 7 | 6001 | 7000 | 4 |
| 8 | 7001 | 8000 | 4 |
| 9 | 8001 | 9000 | 5 |
| 10 | 9001 | 10000 | 5 |

Press Runs

| ID | Btk_ID | Start Time | End Time |
|---|---|---|---|
|  | 1 | 1 |  |
|  | 2 | 2 |  |
|  | 3 | 3 |  |

Files

| ID | Filename |
|---|---|
| 1 | Cust Data.QxP.M |
| 2 | Cust Data.QxP.01.V01 |
| 3 | Cust Data.QxP.01.V02 |
| 4 | Cust Data.QxP.01.V03 |
| 5 | Cust Data.QxP.01.V04 |

→ 548

Rip Log

| ID | File_ID | Press_Num | Rip Time | Rip Files Deleted |
|---|---|---|---|---|
| 1 | 1 | 21 | 10/1/97 12:21 |  |
| 2 | 2 | 21 | 10/1/97 1:06 |  |
| 3 | 3 | 21 | 10/1/97 1:24 |  |

Book Ticket Files

| Book Ticket ID | File |
|---|---|
| 1 | 1 |
| 1 | 2 |
| 1 | 3 |
| 2 | 1 |
| 2 | 4 |

Reorder Table

| Rec Number | Final Spot | Complete |
|---|---|---|
| 1 |  |  |
| 12 |  |  |
| 112 |  |  |
| 6364 |  |  |

→ 550

Job Parameters

| Quark File Name | Database Name |
|---|---|
| Cust Data.QxP | DB.ORG |

FIG. 15F

SETUP GLOBAL REORDER TABLE

Global Reorder Table

Tables

| Postal Sorts Database Name | Zip code | Item | ∧ | | | | |
|---|---|---|---|---|---|---|---|
| | | CR | Job Params | # Book Bundle | # Reordered | # After | Done |

↙ 541

| Reorders Seg_ID | GRT_Seg_ID | Zip Code CR | Pointer To Data | | | GRT_Seg_ID |
|---|---|---|---|---|---|---|

Global Reorder Table

Tables

| Postal Sorts Database Name | Zip code | CR | Job Params | # Book Bundle | # Reordered | # After | Done |
|---|---|---|---|---|---|---|---|
| DB.ORG.1 | 60610 | 12 | 10110101011 | 10 | | | FALSE |
| DB.ORG.1 | 60610 | 13 | 10110101011 | 10 | | | FALSE |
| DB.ORG.1 | 60610 | 14 | 10110101011 | 11 | | | FALSE |
| DB.ORG.1 | 60611 | 1 | 10110101011 | 8 | | | FALSE |
| DB.ORG.1 | 60611 | 2 | 10110101011 | 9 | | | FALSE |
| DB.ORG.1 | 60611 | 3 | 10110101011 | 14 | | | FALSE |
| DB.ORG.1 | 60611 | 4 | 10110101011 | 16 | | | FALSE |
| . | . | . | . | . | | | |
| DB.ORG.5 | 80864 | 54 | 10110101011 | 12 | | | FALSE |

| Reorders | GRT_Seg_ID | Zip Code CR | Pointer To Data |
|---|---|---|---|
| Seg_ID | | | |

FIG. 17B

Global Reorder Table → 541

Tables

Postal Sorts

| Database Name | Zip code | Item | CR | Job Params | # Book Bundle | # Reordered | # After | Done | GRT_Seg_ID |
|---|---|---|---|---|---|---|---|---|---|
| DB.ORG.1 | 60610 | | 12 | 10110101011 | 10 | | | FALSE | 1 |
| DB.ORG.1 | 60610 | | 13 | 10110101011 | 10 | | | FALSE | 2 |
| DB.ORG.1 | 60610 | | 14 | 10110101011 | 11 | | | FALSE | 3 |
| DB.ORG.1 | 60611 | | 1 | 10110101011 | 8 | | | FALSE | 4 |
| DB.ORG.1 | 60611 | | 2 | 10110101011 | 9 | | | FALSE | 5 |
| DB.ORG.1 | 60611 | | 3 | 10110101011 | 14 | | | FALSE | 6 |
| DB.ORG.1 | 60611 | | 4 | 10110101011 | 16 | | | FALSE | 7 |
| . | . | . | . | . | . | . | . | . | . |
| DB.ORG.5 | 80864 | | 64 | 10110101011 | 12 | | | FALSE | " |

| Reorders | GRT_Seg_ID | Zip Code CR | | | Pointer To Data | | | | |

Global Reorder Table

Item ID → 541

| Database Name | Zip code | CR | Job Params | # Book Bundle | # Reordered | # After | Done | GRT_Seg_ID |
|---|---|---|---|---|---|---|---|---|
| Postal Sorts | | | | | | | | |
| DB.ORG.1 | 60610 | 12 | 10110101011 | 10 | 1 | | FALSE | 1 |
| DB.ORG.1 | 60610 | 13 | 10110101011 | 10 | | 1 | FALSE | 2 |
| DB.ORG.1 | 60610 | 14 | 10110101011 | 11 | | | FALSE | 3 |
| DB.ORG.1 | 60611 | 1 | 10110101011 | 8 | | | FALSE | 4 |
| DB.ORG.1 | 60611 | 2 | 10110101011 | 9 | | | FALSE | 5 |
| DB.ORG.1 | 60611 | 3 | 10110101011 | 14 | | | FALSE | 6 |
| DB.ORG.1 | 60611 | 4 | 10110101011 | 16 | | | FALSE | 7 |
| . | . | . | . | . | | | . | . |
| . | . | . | . | . | | | . | . |
| DB.ORG.5 | 80864 | 64 | 10110101011 | 12 | | | FALSE | n |

Tables → 540

Reorders

| Seg_ID | GRT_Seg_ID | Zip Code CR | Pointer To Data |
|---|---|---|---|
| 24 | 3 | 60610  12 | t:\jobs\newjob |

ANY GLOBAL REORDER

NEW POSTAL ROUTE CONNECTOR

NEW DATABASE CONNECTOR

DELETE DATABASE CONNECTOR

FIG. 23

Possible human interface for the job reorder decision screen

The books in the job reorder table breakdown as follows:

| From Press | % | # | Make Single Book Ticket | Press To Print On | Auto File Transfer | Re-Process or Archive (On or Off Line) |
|---|---|---|---|---|---|---|
| A | 30 | 800 | Yes | A | | |
| B | 31 | 820 | Yes | B | | |
| C | <1 | 16 | Yes | C | | |
| D | <1 | 14 | Yes | C | Yes | |
| NOP* | 36 | 1024 | | | | Re-Process |

*NOP = Files for these books are not currently / still in raster format on any press.

Cancel    Save/Do

REORDER SYSTEM FOR USE WITH AN ELECTRONIC PRINTING PRESS

TECHNICAL FIELD

The present invention relates generally to electronic printing presses, and more particularly to a method of and system for selectively reordering the reprinting of books on one or more electronic printing presses.

BACKGROUND ART

Most printing systems in use today utilize printing plates or cylinders which are engraved or photochemically processed to create an image thereon. Ink is then deposited on the plate or cylinder and the ink is thereafter transferred to a substrate, such as paper. In a conventional printing press, a number of pages are printed on a sheet of paper to form a signature which is then folded and assembled with other signatures. The assembled signatures are then bound, trimmed and finished by finishing apparatus to produce finished books, such as magazines, catalogs or any other printed and bound matter.

Often, there is a need to produce different versions of books and/or customized books within a single press run. For example, it may be desirable to produce a number of standard books together with a number of books having additional and/or different signatures or pages therein. Also, it may be necessary or desirable to provide customized information in the form of an address label, personalized information or the like on the inside or outside of finished books. In either case, conventional printing systems are not easily adaptable to produce books of these types.

A printing system which has the ability to produce differing book versions and/or books with customized information is disclosed in Riley U.S. Pat. No. 4,121,818, assigned to the assignee of the instant application. The printing system includes a number of packer boxes disposed adjacent a binding chain wherein each packer box stores a plurality of signatures. A control is included for controlling the packer boxes to selectively feed signatures onto chain spaces of the binding chain so that books of varying content can be produced. Customized information can be printed on the signatures by means of an ink jet printer which is selectively operated by the control. Other types of customization can be effectuated, such as by inserting or onserting cards or the like.

Other systems for producing customized books are disclosed in Abrams et al. U.S. Pat. No. 3,899,165, Wong et al. U.S. Pat. Nos. 4,500,083 and 4,674,052, Wong U.S. Pat. No. Re 32,690 and Berger et al. U.S. Pat. Nos. 4,768,766 and 4,789,147.

Image manipulating systems have been developed which permit gathering of images in an office or home environment. For example, conventional word processing programs, such as MICROSOFT WORD®, WORDPERFECT® and the like, permit a user to import images into a page and also allow a user to command which pages of a document to print. In addition, macros (i.e., a sequence of commands) can be assembled and executed within these programs which can allow printing of particular document pages in a certain order. Still further, most word processing programs have merge capability wherein a customized image is merged with other standardized information and printed or displayed. As one example, customized information in the form of addressee and address information may be merged with standardized return address information and printed on a series of envelopes.

A different image gathering capability provided by CAD (computer aided design) software, sometimes referred to as "layering," involves the creation and storage of a base page and one or more layer pages. A user can issue commands to display or print the base page and one or more of the layer pages simultaneously atop one another to achieve an effect similar to the overlay of transparencies so that a composite page appearance results.

While the foregoing image manipulating systems allow some image gathering capability, none is effective to assist in the rapid production of different book versions. Of course, CAD systems are primarily designed for line art and not text nor graphic images, and hence are of only limited use. Further, if one were to use word processing software to produce book versions it would be necessary to issue commands to separately print the pages of each book version just before such version is to be produced. That is, a user would have to create and store pages to be included in a first book version and then command the software to print as many copies of the first version as are needed. Thereafter, the user would have to recall the pages of the first version from memory, edit and store the pages to create pages to be included in a second book version and then command the system to print the required number of books of the second version. Similar steps would have to be undertaken for each other book version to be produced. Alternatively, the pages of the different book versions could be created and stored and thereafter printed together. In either event, where many book versions are to be produced, such a process would be quite time-consuming. In addition, image importation and merge routines provided as a part of word processing software are adapted for use on a sub-page basis only and hence are of only limited usefulness in the book production environment. Still further, data manipulated by word processing software are largely (if not entirely) in symbolic format. As a result, data to be displayed or printed must be first rasterized by a raster image processor (RIP), which utilizes complex and time-consuming computational routines which further increase production time to an economically impractical level.

Recently, new printing systems have been developed, called "demand printers," which are capable of high speed printing of images from electronic representations thereof. The demand printer produces high quality color images using a set of fusible toners in an electrophotographic process. More particularly, a web of paper is passed adjacent a series of drums, each of which has been electrostatically charged according to an image pattern for a particular color to be applied to the web. The charge is transferred to the paper and an oppositely charged toner of the proper color is brought into contact with the paper. The oppositely charged web and toner attract so that the toner is held on the paper as other colors are applied thereto. The toners and paper are thereafter heated to fuse the toners to the paper to produce the final image. The web is then cut into sheets (or "forms") and the forms are further processed as needed to produce a final product.

Unlike conventional presses which utilize engraved or photochemically prepared plates or cylinders, demand printers are capable of rapidly printing high quality images of differing content owing to the fact that the images are produced by an electrophotographic process. That is, instead of the need to replate and re-engrave a gravure cylinder when a different image is to be printed therewith, it is only necessary to change the charge applied to the drums of the printer in order to make such change. Thus, different images can be printed by the same printer without significant delays.

This advantage makes the demand printer desirable for use in certain production environments. However, applicants are currently unaware of any systems developed by others which utilize this advantage to produce differing book versions in an efficient manner.

Properly controlled demand printing presses offer significant advantages over the prior art. Nonetheless, they are not infallible. Although error rates for such presses are low, from time to time an error such as a missed book or a missed sheet from a book can occur. In some demand printers (termed herein "one book per job printers"), the printing of each book is processed as a complete job or production run. In such printers, only one book is printed at a time. In other words, the demand printer will not start printing a new book until the current book is satisfactorily printed thereby creating a natural pause in the printing process. This natural pause renders "reordering" a book when an error is detected relatively straightforward. Specifically, the demand printer simply reruns the current job.

In other demand printers (termed herein "multiple books per job printers"), a job or production run is processed as a stream of books to be printed. Such streams are often on the order of 1,000 books or more. Once a job is started on such a printer, the stream of books is continually printed from the first book to the last. In other words, the press does not necessarily wait for the complete printing of a first book before beginning to print a second book. In the past, when errors occurred on this latter-type of demand printing press, the press operator was often forced to identify errored books and to manually request the press to reprint the errored books after the corresponding job of printing 1,000 or more books was completed.

As is well known, the United States Post Office offers various levels of discounts for pre-sorted mass-mailings meeting various sorting definitions. For example, a first discount level such as an automated carrier route discount is provided for mailings of ten pieces of mail or more sorted by carrier route; a second discount level such as an automated five digit discount is provided for mailings of ten pieces or more sorted by five-digit zip codes; a third discount level such as an automated three digit discount is provided for mailings of ten pieces or more sorted by the first three digits of the addressees' zip codes; and a fourth level of discount is provided for mailings of ten pieces or more sorted by state (i.e., the first zip code digit). The books in the jobs are typically pre-sorted to obtain an optimum level of discount within this discount structure. In the past, when errored books occurred with "multiple books per job" demand printers, reordering after completion of the job required manual re-sorting to avoid loss of postal discounts for the errored book(s) or, in a worst-case scenario, loss of discounts for the group(s) of books with which the errored book(s) are associated. Both manual reordering of errored books and manual re-sorting of reprinted books introduced delay and costs into the printing process.

As mentioned briefly above, demand printers are often provided with various downstream auxiliary finishing devices such as folding devices, trimming devices, weighing devices, binding devices, gluing devices, dot wackers, tip-ons, card feeders, strappers, and/or mechanical co-mailers. Such auxiliary devices can be coupled to the press thereby permitting processing of books as they are printed, or they can be free-standing thereby requiring transportation of books from the press to the auxiliary device for further processing. As with the demand printers discussed above, such auxiliary devices can foul a printed book from time to time. In the past, when the press operator noted that an auxiliary device had outputted an errored book, the operator would typically be required to manually reorder the errored book and subsequently re-sort the reprinted and finished book if postal discounts were desired thereby introducing further delay and costs into the printing process.

SUMMARY OF THE INVENTION

In accordance with an aspect of the invention, a reorder system for use with an auxiliary device adapted to perform a process on a book printed by a first printing press printing a stream of books is provided. The reorder system comprises a first sensor located downstream of the auxiliary device; and a processor in communication with the first sensor. The processor is adapted to recognize an errored book and to cause the errored book to be reprinted after at least one other book has been printed by the first printing press.

In a preferred embodiment, the processor comprises a global processor and a local processor, the local processor being associated with the auxiliary device. Also in the preferred embodiment, the apparatus is provided with a press processor associated with the first printing press for controlling the operation thereof, and the global processor is in communication with the press processor for causing the first printing press to reprint the errored book in response to signals received by the global processor from the local processor.

In any of the foregoing embodiments, the apparatus can also be utilized with a second printing press, wherein the global processor is in selective communication with a first press processor associated with the first printing press and with a second press processor associated with the second printing press, and wherein the global processor selectively causes the errored book to be reprinted on one of the first and second printing presses. In such an embodiment, the global processor can be programmed to select the one of the first and second printing presses to minimize processing time and/or to maximize postal rate discounts. In the instance where maximized postal rate discounts are desired, the global processor selects the one of the first and second printing presses by comparing postal information for the errored book to postal information of a book to be printed by the first printing press, and/or by comparing the postal information for the errored book to postal information of a book to be printed by the second printing press.

In any of the foregoing embodiments, the errored book preferably comprises fixed and variable data, and the apparatus is provided with a log identifying the fixed and variable data to be used to reprint the fouled book.

In accordance with another important aspect of the invention, a reorder system for use with a first and a second printing press is provided. The reorder system comprises a global processor in selective communication with first and second press processors; and a sensor located downstream of the first printing press. The sensor is coupled to the first press processor whereby the first press processor can detect errored books and wherein, the first press processor notifies the global processor of the errored book and the global processor causes one of the first and second presses to reprint the errored book.

In some embodiments, the global processor selects the corresponding one of the first and second printing presses to minimize processing time. In other embodiments, the global processor selects the corresponding one of the first and second printing presses to maximize a postal rate discount.

In accordance with yet another important aspect of the invention, a reorder system is provided for use in a printing facility having first and second printing presses wherein each of the first and second printing presses are adapted to produce books including both variable and fixed data. The reorder system includes a first sensor located to monitor books output by the first printing press; and a first press processor associated with the first printing press and in communication with the first sensor to recognize errored books. The first press processor is adapted to control a printing order of books in a stream of books to be printed by the first printing press in a given job. Upon recognizing an errored book, the first press processor causes the first printing press to insert the errored book into the stream of books to be printed after at least one other book has been printed.

In a preferred embodiment, the errored book is only inserted into the stream of books if re-printing the errored book with the stream will entitle the errored book to a predefined postal discount. In some such embodiments, the reorder system is further provided with a global processor in selective communication with the first press processor, wherein, if the first press processor determines that re-printing the errored book with the stream will not entitle the errored book to the predefined postal discount, the first press processor identifies the errored book to the global processor. In such an instance, the global processor can be programmed to instruct a second press processor associated with the second printing press to cause the second printing press to re-print the errored book if re-printing the book on the second printing press will entitle the errored book to a second predefined postal discount. The first and second postal discounts may be different or identical.

In some embodiments, the system is provided with a second sensor located to monitor books output by the second printing press, and a second press processor associated with the second printing press and being in communication with the second sensor to recognize errored books. The second press processor is adapted to control a printing order of books in a stream of books to be printed by the second printing press in a given job, wherein, upon recognizing an errored book, the second press processor causes the second printing press to insert the errored book into the stream of books to be printed if re-printing the errored book with the stream will entitle the errored book to a second predefined postal discount. In such embodiments, the system can also be provided with a global processor in selective communication with the first and second press processors, wherein if the first press processor determines that re-printing an errored book with the stream associated with the first printing press will not entitle the errored book to the predefined postal discount, the first press processor identifies the errored book to the global processor. Similarly, if the second press processor determines that re-printing an errored book with the stream associated with the second printing press at this time will not entitle the errored book to the second predefined postal discount, the second press processor identifies the errored book to the global processor. In such embodiments, the global processor can be adapted to develop a new job to re-print errored books received from the first and second press processors.

In accordance with yet another aspect of the invention, a method for reordering an errored book detected at an auxiliary device located downstream of a printing press printing a stream of books containing variable data and fixed data is provided. The method comprises the steps of: creating at least one database identifying the variable and fixed data to be included in each book in the stream of books; recording an identifier of each book exiting the auxiliary device; comparing the identifiers of the books exiting the auxiliary device to the at least one database to recognize an errored book; and, ordering the printing press to reprint an errored book by using the identifier of the errored book to access the at least one database and providing the fixed and variable data needed to reprint the errored book to the printing press.

In accordance with still another aspect of the invention, a method for reordering a book printed by a first printing press printing a stream of books is provided. The method comprises the step of: identifying a book in the stream of books to be reordered; and reprinting the book on the first printing press. Such a method can optionally be provided with the further steps of: if reprinting the book on the first printing press without re-sorting the stream of books will not entitle the reprinted book to a predefined postal discount, determining if reprinting the book on a second printing press printing a second stream of books without re-sorting the second stream will entitle the reprinted book to a second predefined postal discount; and reprinting the book on the second printing press if the reprinted book will be entitled to the second predefined postal discount.

In accordance with another aspect of the invention, a method for reordering a book printed by a first printing press printing a first stream of books is provided. The method comprises the steps of: identifying a book in the first stream of books to be reordered; determining a first postal discount that the reprinted book will be entitled to if reprinted on the first printing press if the first stream of books is not re-sorted; determining a second postal discount that the reprinted book will be entitled to if reprinted on a second printing press printing a second stream of books if the second stream of books is not re-sorted; comparing the first postal discount to the second postal discount; and, selecting one of the first or second printing presses for reprinting the book based on the comparison between the first and second postal discounts.

Other features and advantages are inherent in the apparatus claimed and disclosed or will become apparent to those skilled in the art from the following detailed description in conjunction with the accompanying drawings.

BRIEF DESCRIPTION OF THE DRAWINGS

FIGS. 15a–15f illustrate an exemplary reorder log in various states of completion.

FIGS. 17a–17d illustrate an exemplary global reorder table in various states of completion.

FIG. 23 is a schematic illustration of an exemplary human interface display generated by the global reorder processor.

DESCRIPTION OF THE PREFERRED EMBODIMENTS

Figure 1:
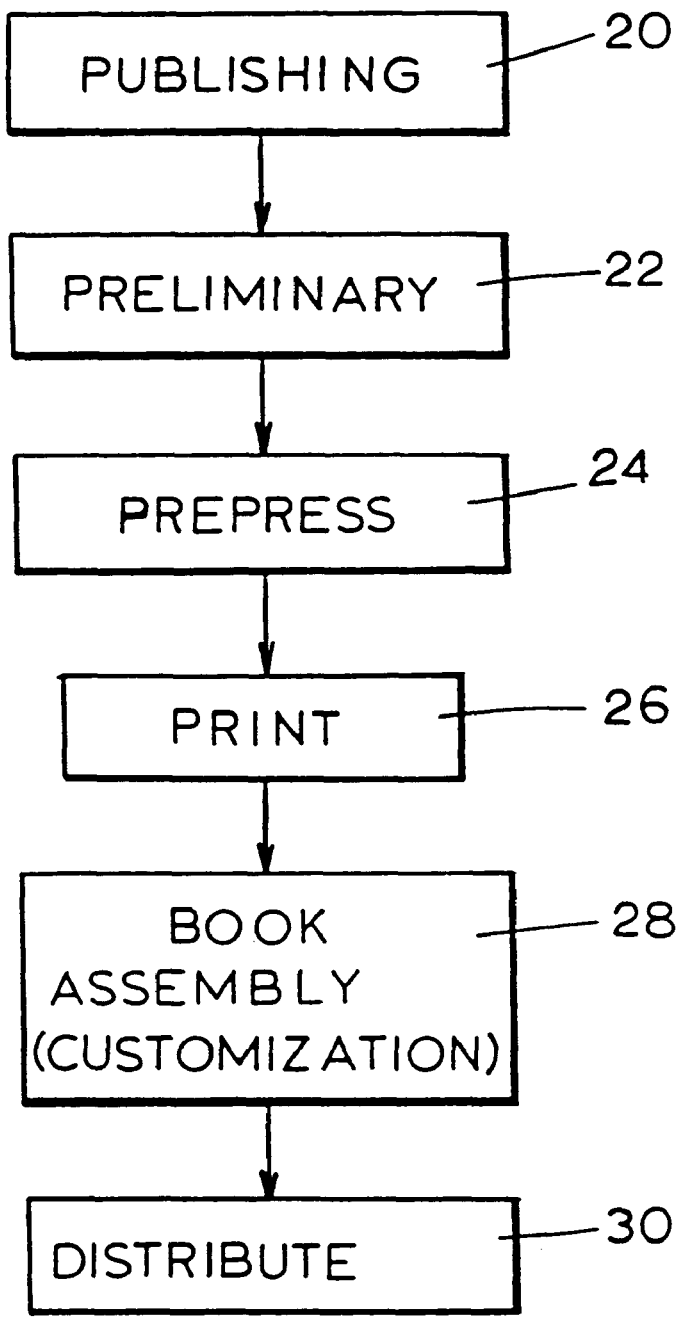
FIG. 1 is a block diagram illustrating a prior art method of producing books.

FIG. 1 illustrates a prior art method of producing books, for example as shown in the above-identified Riley et al. '818 patent identified above. During a publishing step 20, the contents of one or more book versions are determined. Each version may comprise, for example, a set of standard or common pages. In addition, some of the versions may include one or more additional pages or other customized information. Thereafter, during a preliminary step 22, color correction of color images is undertaken together with undercolor removal and screening for halftone images. During a prepress step 24, page imposition is effected and printing cylinders or plates are prepared. The plates or cylinders are then used during a printing step 26 to prepare signatures which are loaded into packer boxes (not shown). As noted in the Riley et al. '818 patent identified above, the signatures are then selectively collected on a gathering chain (not shown) during a book assembly step 28 and the gathered signatures are bound and trimmed to create the books. The books are thereafter distributed during a step 30 to users via one or more distribution systems, for example, the U.S. Postal Service.

As should be evident from the foregoing, customization occurs during the book assembly step 28, inasmuch as the choice of particular signatures to be included in a book is made at that time. In addition, customized information can be printed onto selected signatures using an ink jet printer disposed adjacent the gathering chain. Thus, for example, addressee information can be printed by the ink jet printer on assembled books so that preprinted addressee labels need not be used. Other types of customization can be effected at this time, for example, by inserting or onserting cards into or onto a stack of collected signatures, affixing a specialized or customized cover on a gathered stack of signatures, or the like. Customization at this point in the production process is simpler and less expensive than, for example, separately printing each book version with customized information.

Figure 2:
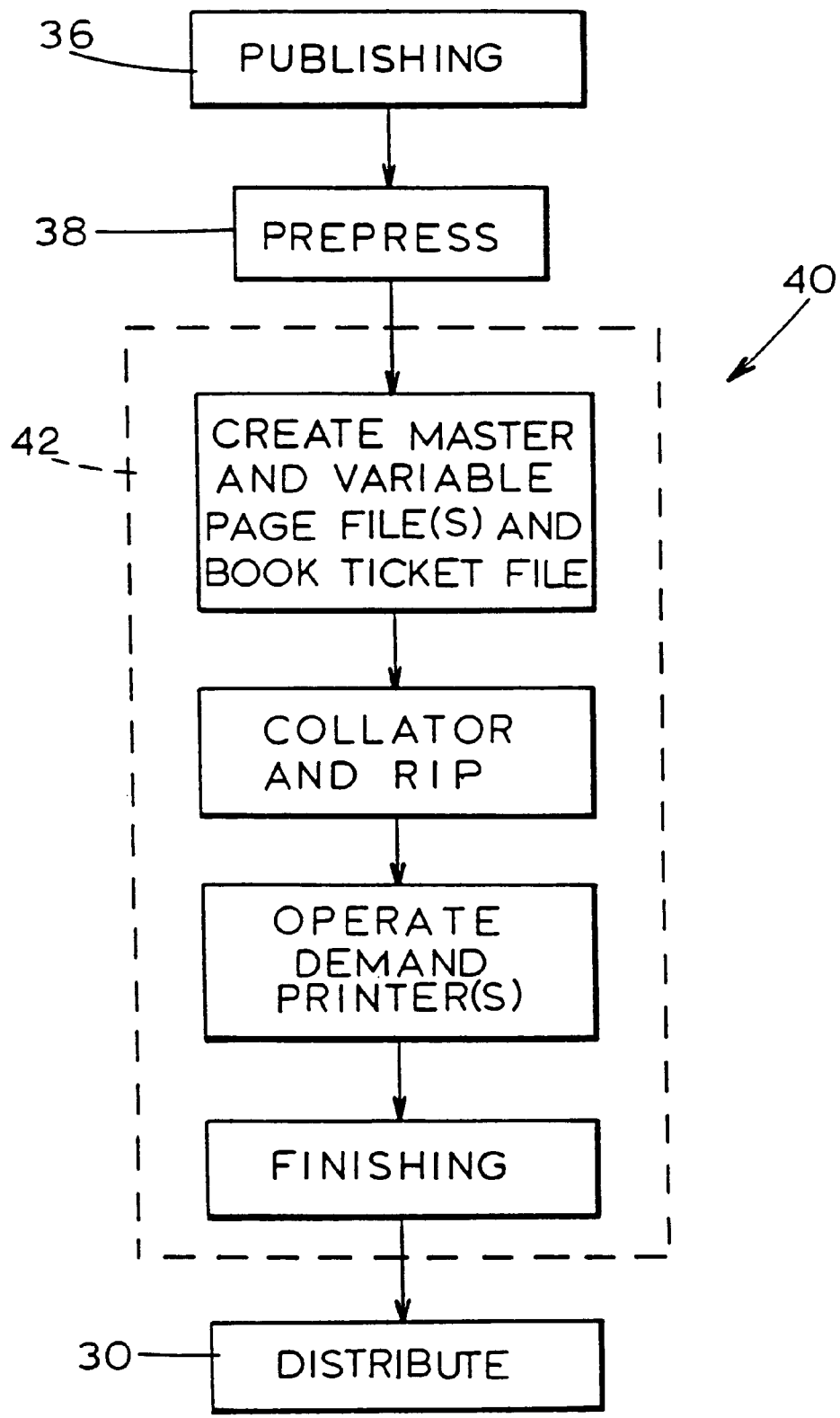
FIG. 2 is a block diagram of a method of producing books.

FIG. 2 illustrates a block diagram of a method 40 which may be used in place of the method of FIG. 1 to produce books. The method 40 includes a step 42 which utilizes the output of publishing and preliminary steps 36, 38 and produces books for distribution according to the step 30 of FIG. 1. The step 42 creates one or more master and variable page files in, for example, a page description language (PDL) such as POSTSCRIPT® (POSTSCRIPT® is a trademark of Adobe Systems, Inc. for its page description language) representing pages to be produced. In addition, as noted in greater detail hereinafter, a press command file is developed which specifies the manner in which data contained within the master and variable page files are to be merged to produce printed pages. The format of the press command file is specified by Barco Graphics of Gent, Belgium and is particularly suited for control of a DCP-1 digital color press manufactured by Xeikon of Mortsel, Belgium. It should be noted that the apparatus and method of the present invention are not limited to use with a particular type of demand printer or a particular system for controlling such a printer, inasmuch as the invention can be adapted for use with any type of printer or control whether located locally or remotely.

The master and variable page files and the press command file are converted by a collator and raster image processor (RIP) into bitmaps which may be stored in a memory. The stored bitmaps are used to control one or more demand printers and/or any other type of display device, such as a laser printer, a CRT, an LCD display or the like so that the device displays pages having fixed and variable information thereon. Alternatively, the master and variable page files may be premerged to create a plurality of combined files each representing a page to be reproduced with master and variable information. The combined files can be then sent to any type of printer or other display device, whether local or remote. Also, the combined files can be converted to a suitable format (e.g., ACROBAT® PDF format) and transmitted to a remote location using a facsimile machine, e-mail or other transmission medium if desired.

During a finishing step, the assembled books are bound and trimmed and, if desired, further customization can be effected.

Figure 3:
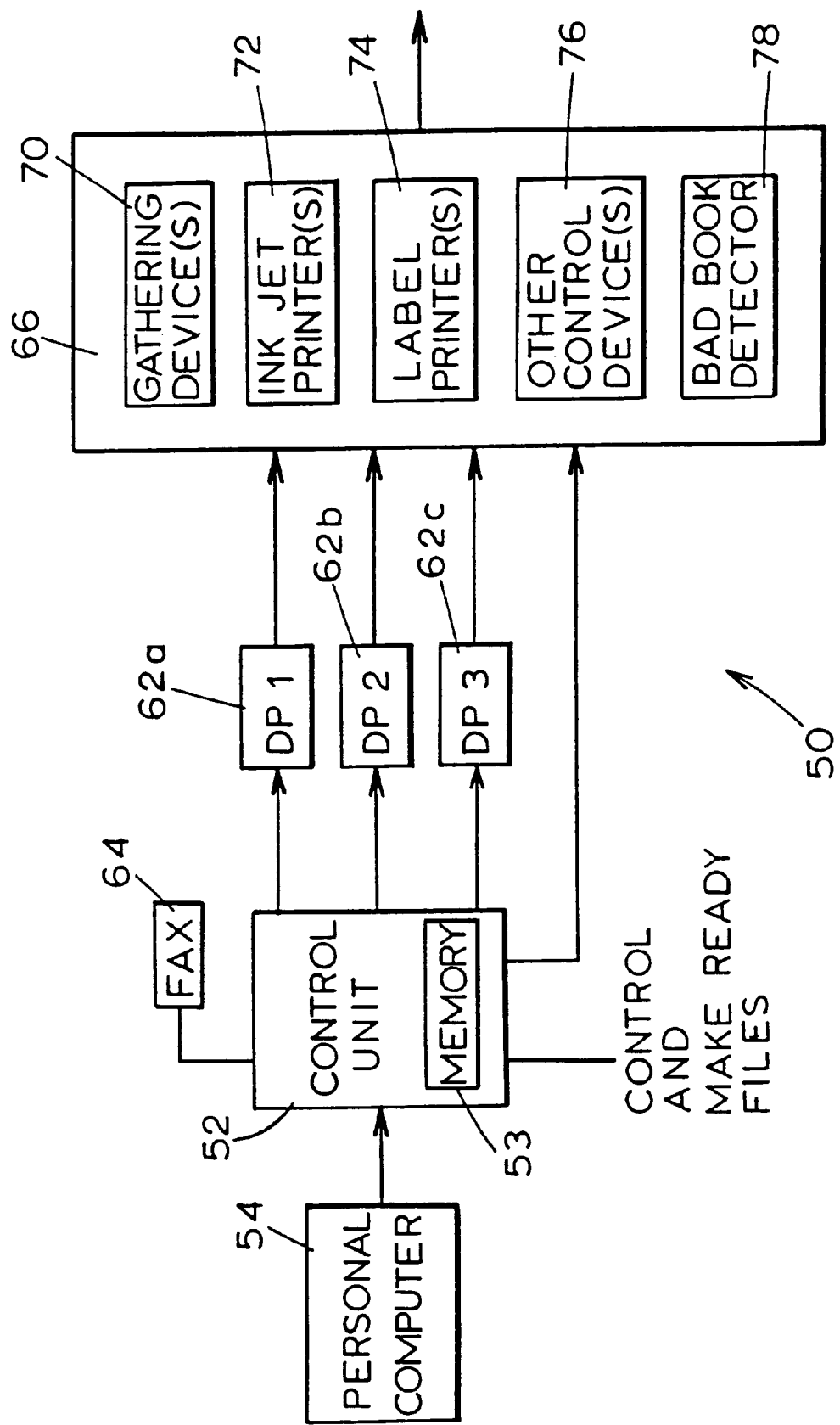
FIG. 3 is a block diagram illustrating an exemplary system for implementing the method illustrated in FIG. 2.

FIG. 3 illustrates a system 50 which implements the steps 36, 38 and 42 in the method 40 of FIG. 2. A control unit 52, which may be implemented by a personal computer or another type of computer, includes a memory 53 and stores therein data representing images to be printed. As noted in greater detail hereinafter, the data may be specified by a publisher using a personal computer 54 or any other type of computer and may comprise one or more template files specifying pages to be produced with master or fixed printed information (i.e., printed information which does not vary from book to book of the same version) and variable printed information (which typically varies from book to book). The variable information may be stored in a database created by the publisher and the template file(s) specify the locations on particular pages for variable information stored in the database as noted in greater detail hereinafter.

If desired, image data may be obtained from any other type of device or devices, such as a scanner which scans input copy, data supplied over a network or any other source. The control unit 52 is further responsive to control and makeready files and causes one or more demand printing systems 62*a*, 62*b*, 62*c* to print desired pages. While three demand printing systems 62*a*–62*c* are illustrated in FIG. 3, it should be understood that the control unit 52 may operate a different number of demand printing systems, as desired. Also, the control unit 52 may operate a fax machine 64 and/or may communicate with other remote devices to send properly converted combined files, as desired and as noted above. The combined files may be printed or may alternatively be reproducible in a different medium and/or may comprise a non-static image or other information, i.e., movies or audio.

The pages printed by the demand printing system 62 may be supplied to a finishing apparatus 66 which includes various auxiliary production devices and device interfaces for assembling the pages to produce finished books which are ready for distribution. As explored in more detail below, the finishing apparatus 66 may include one or more gathering devices 70 for gathering printed pages into books, one or more ink jet printers 72 for printing additional customized information, such as addressee information, on each book, one or more label printers 74 for printing address labels and/or other control devices 76. In addition, one or more detectors 78 may be provided to sense when a defective book is produced. The control unit 52 may be responsive to the output of the detector 78 to reorder a defective book at an appropriate point in the production sequence thereof so that advantage can be taken of postal discounts, if possible.

Figure 4:
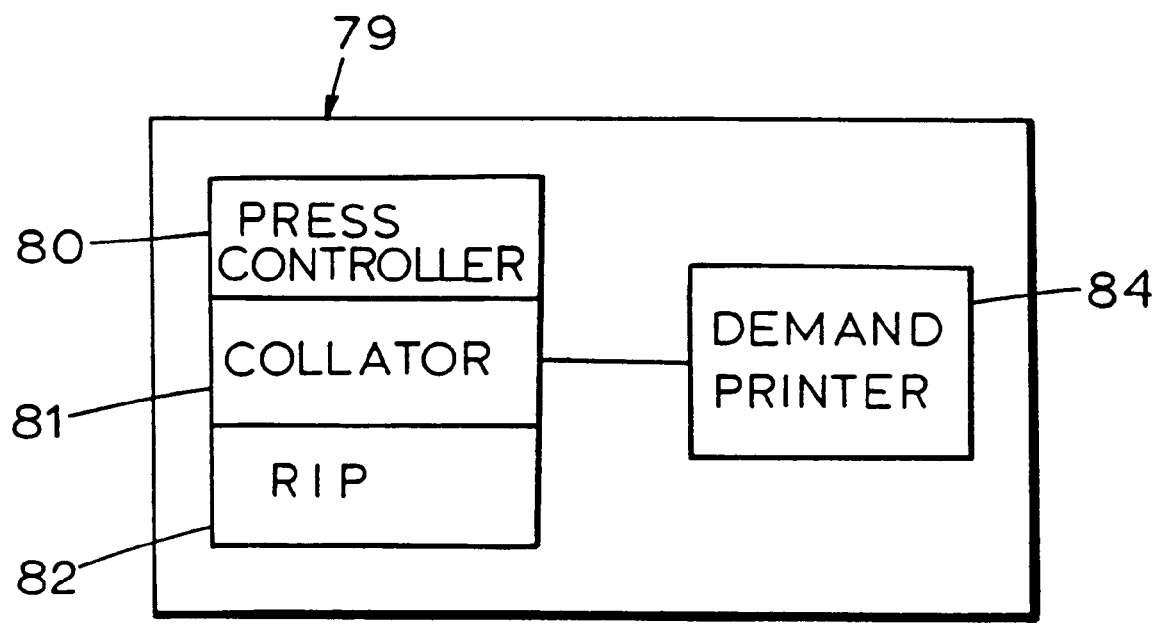
FIG. 4 is a block diagram illustrating one of the demand printing systems of FIG. 3 in greater detail.

FIG. 4 illustrates the demand print system 62*a* of FIG. 3 in greater detail, it being understood that the systems 62*b* and 62*c* are identical thereto. The system 62*a* includes a print system 79 having a press controller 80, a collator 81 and a raster image processor (RIP) 82 which are operable in response to press commands generated by the control unit 52. A collator is an electronic device for storing raster image processor files (i.e., bitmap files) and delivering selected files to a digital press in real time, such that the digital press can run at full speed while processing and printing unique page data for each book produced on the press. The RIP 82 converts the page files to bitmap format or any other format, such as a symbolic printer control language. The collator 81 includes memory in the form of mass storage drives and physical memory and collates the bitmap page files. If desired, the collator 81 and/or RIP 82 may comprise a part of the press controller 80. The controller 80 instructs the collator 81 to send page files to the demand printer 84. The print system 79 may comprise the PrintStreamer system, manufactured and marketed by Barco Graphics of Belgium, while the demand printer 82 may comprise the Xeikon DCP-1 digital color press noted above. It should be noted that a different print system and/or demand printer may alternatively be used, such as the Indigo printer manufactured by Indigo NV, of Maastricht, Netherlands if desired.

Figure 5:
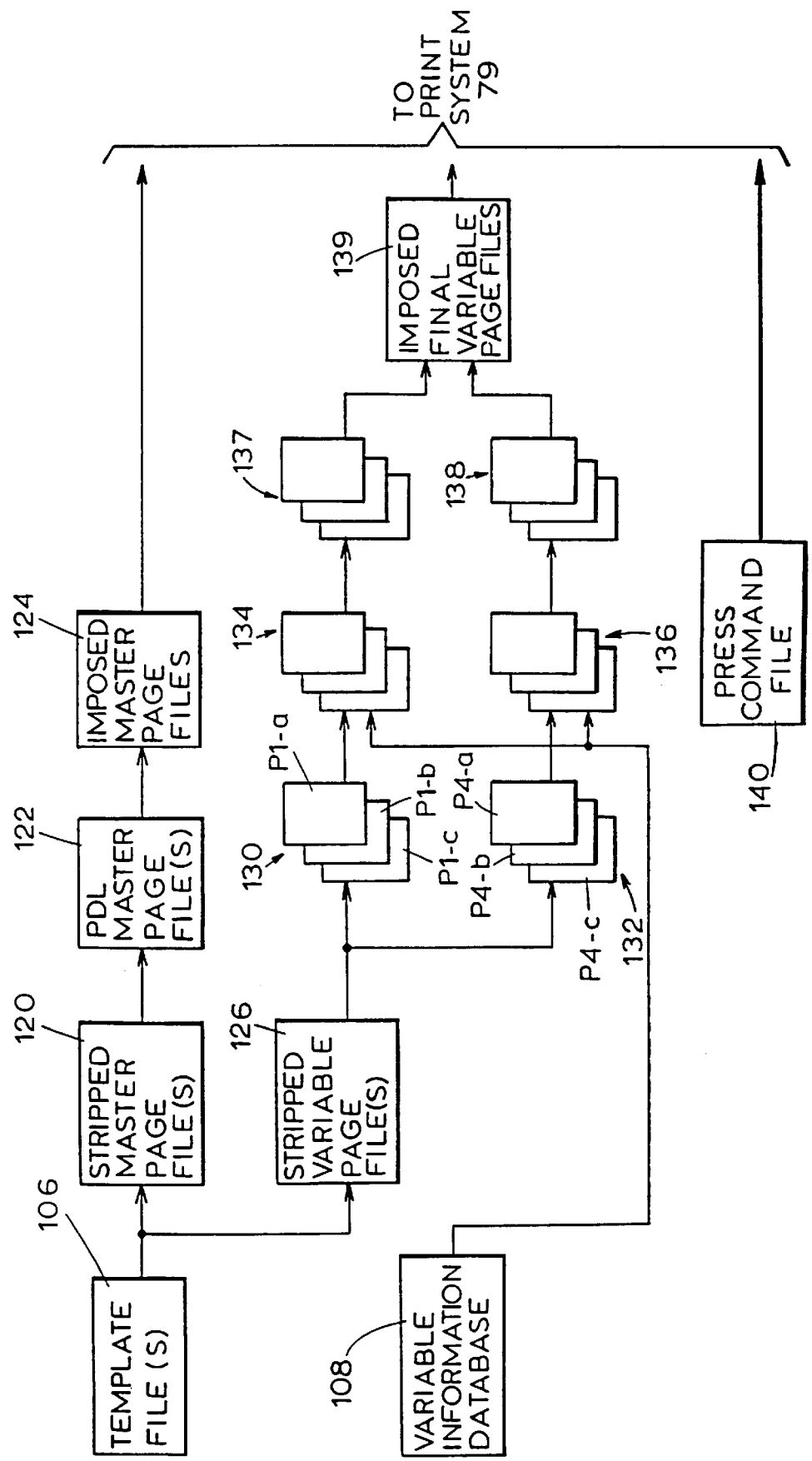
FIG. 5 is a generalized diagram of the certain steps implemented by the method of FIG. 2.
Figure 6A:
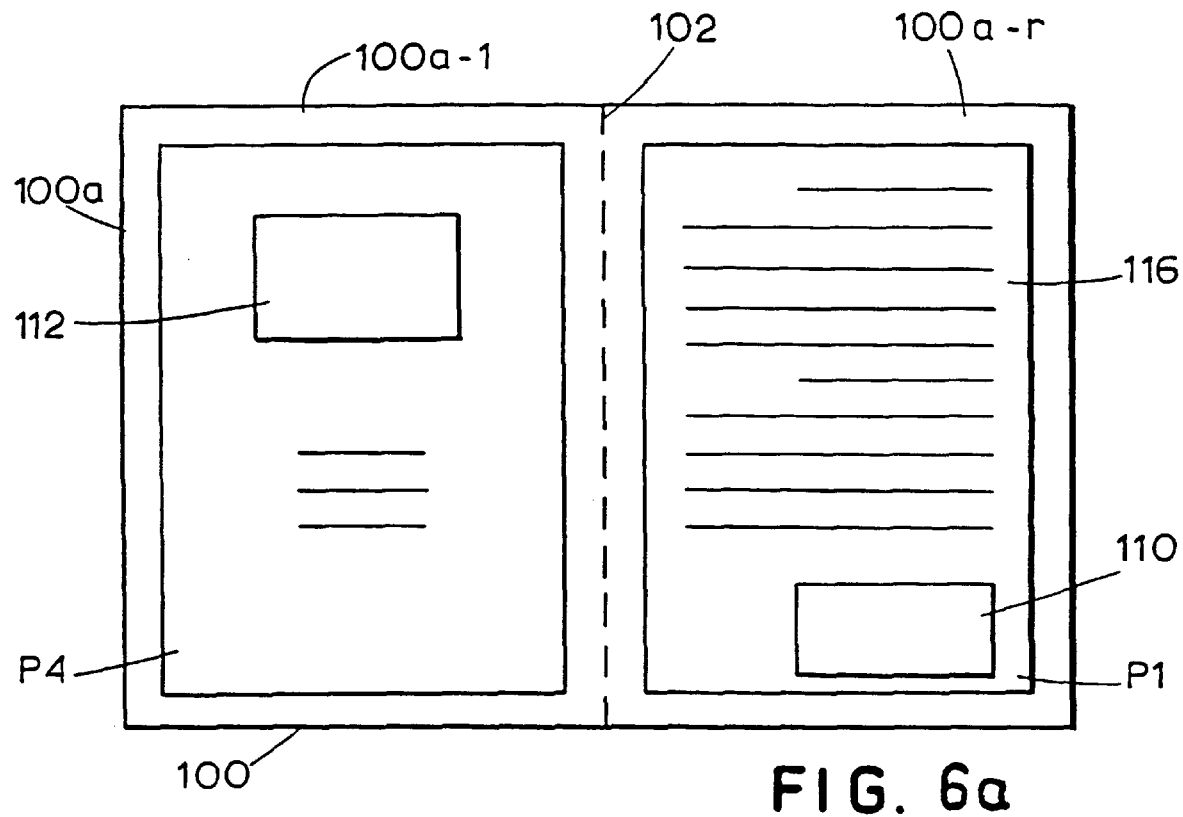
FIGS. 6a and 6b are elevational views of a sample book.
Figure 6B:
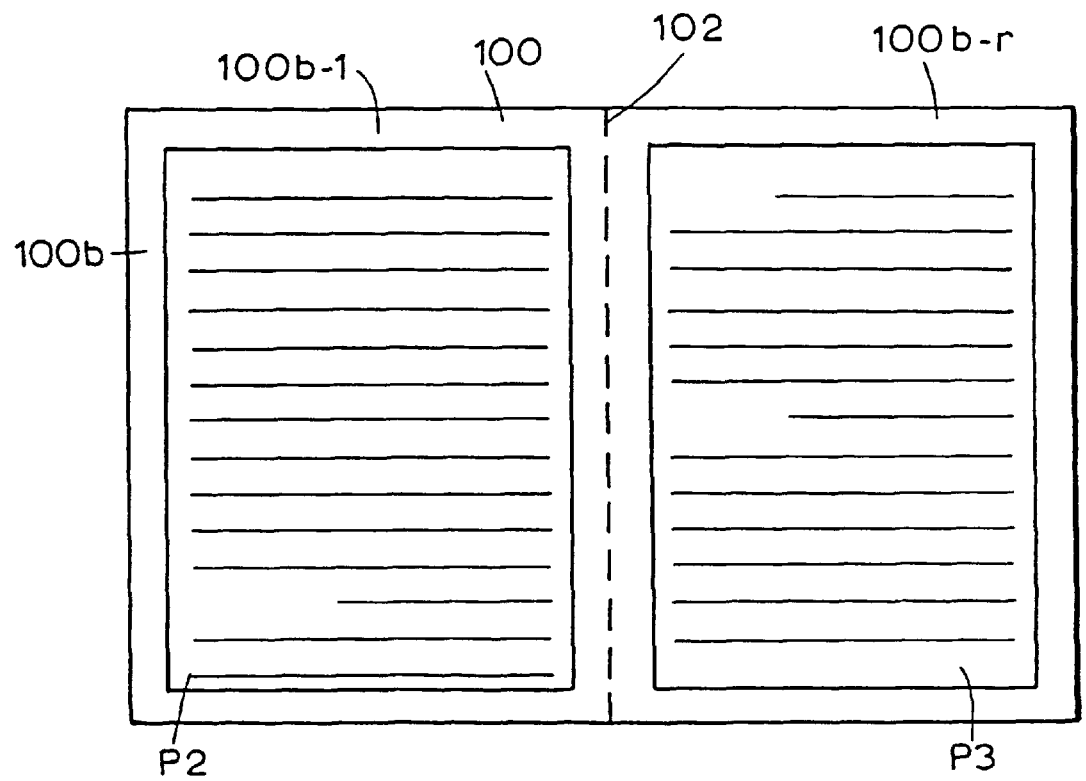

For the purpose of explaining the method illustrated in FIG. 5, as a first example, it will be assumed that the demand print system 62*a* will be operated to produce three four-page books in the form of a brochure in duplex format. That is, as seen in FIGS. 6*a* and 6*b*, a first sheet of paper 100 is to be printed on a first side 10*a* with printed pages P1, P4 while a second side 100*b* of the sheet 100 is to be printed with pages P2, P3. In addition, pages P1–P4 are to be imposed such that the page P1 is placed on a right-hand portion 100*a*–*r* of the side 100*a* while the page P4 is placed on a left-hand portion 100*a*-1 of the side 100*a*. Further, the page P2 is to be placed on a left-hand portion 100*b*-1 of the side 100*b* while the page P3 is to be placed on a right-hand portion 100*b*-r of the side 100*b*. In this fashion, when the sheet of paper 100 is folded along a fold line 102 with the pages P1 and P4 on the outside, the pages P1–P4 will appear in sequence. Because each book to be produced in this example comprises only a single sheet of folded paper, the imposition process need not take into account shingling or bottling effects, although it should be noted that such effects may have to be taken into account when more than one sheet of paper is assembled with other sheets of paper to produce a book and/or when more than two pages are to be printed on a single side of a sheet of paper and thereafter assembled with other pages to create a book.

In addition to the foregoing, in the first example, assume that the three books to be produced include variable and fixed information on the first and last pages of each book and fixed information only on the remaining pages. For example, the page P1 may include variable information in the form of a personalized message, a variable image, or the like in an area 110 whereas the page P4 may include other variable information in an area 112, for example, postal information for mailing the brochure to an addressee. Corresponding front and back pages of the remaining books may include different variable information. The remaining printed information on pages P1–P4 is identical to the printed information on corresponding pages of the other two books.

Figure 7A:
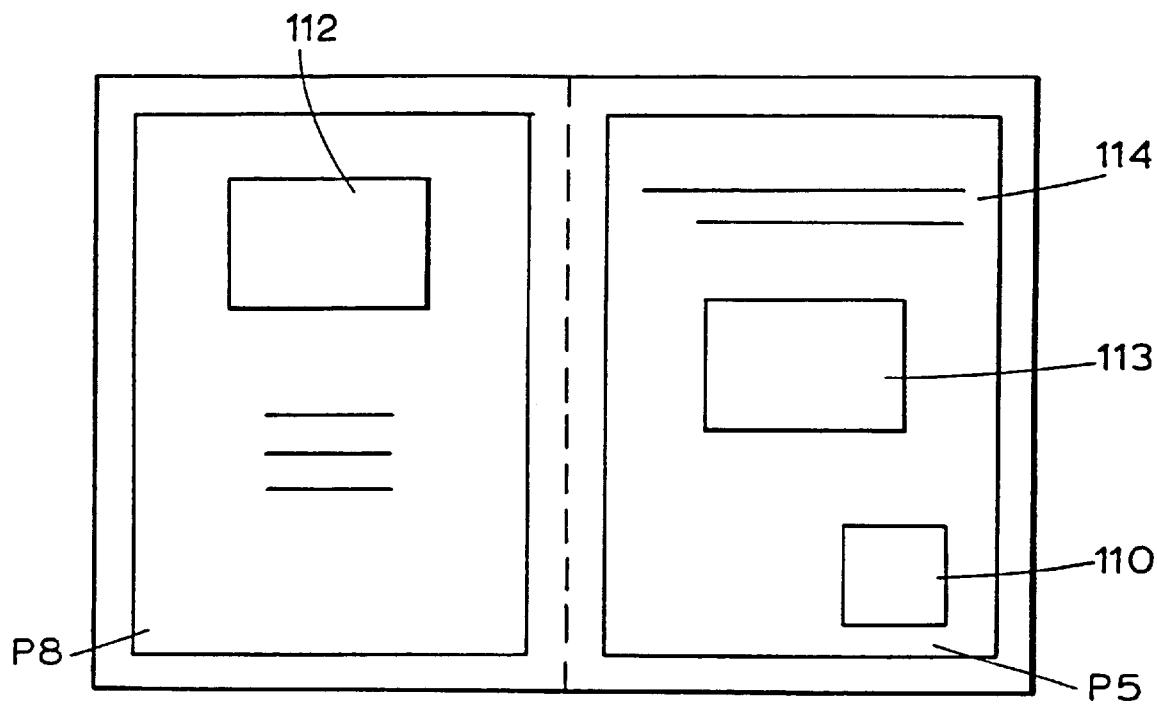
FIGS. 7a, 7b and 8a, 8b are elevational views of other sample books.
Figure 7B:
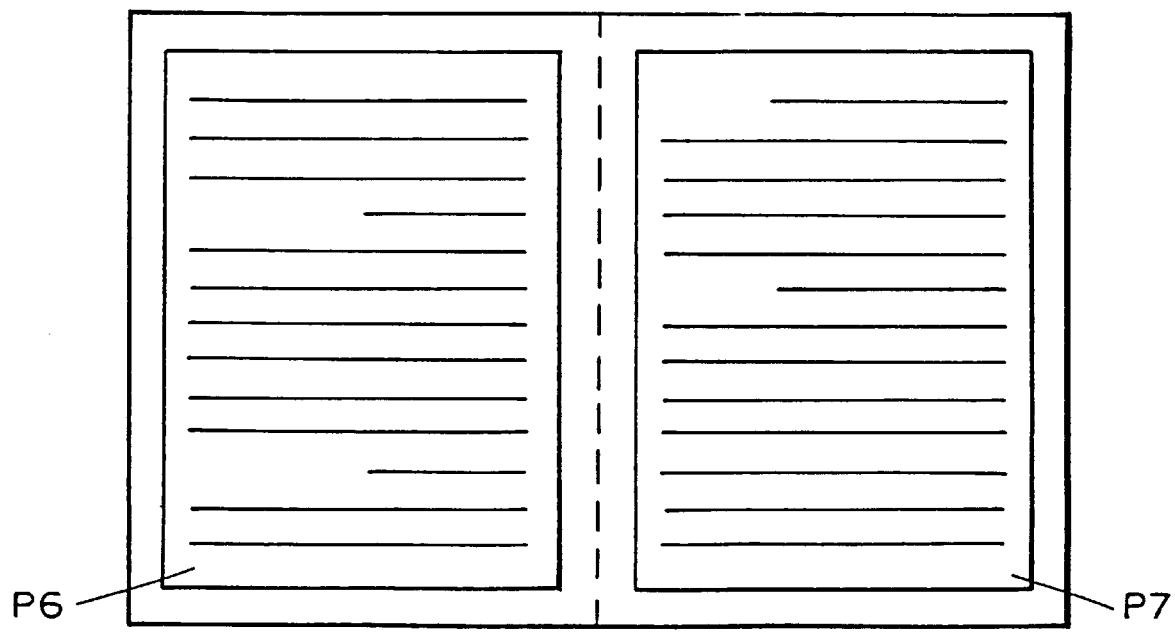

It should be noted that the present invention is not limited to production of books of the same "version" (i.e., books having the same master information). For example, the book versions of FIGS. 7*a*, 7*b* and 8*a*, 8*b* may be produced together with the book version of FIG. 6*a* and 6*b* in the same production run or job. The book version example of FIGS. 7*a* and 7*b* includes pages P5–P8 to be reproduced a number of times to produce individual books. The book version of FIGS. 7*a* and 7*b* is identical to the book version of FIGS. 6*a* and 6*b* except that an additional area 113 is provided on the page P5 for placement of variable information, in addition to the areas 110 and 112. Because of the addition of the area 113, the remaining master information appearing in an area 114 differs from master information appearing in an area 116 of the page P1 of FIG. 6*a*.

Figure 8A:
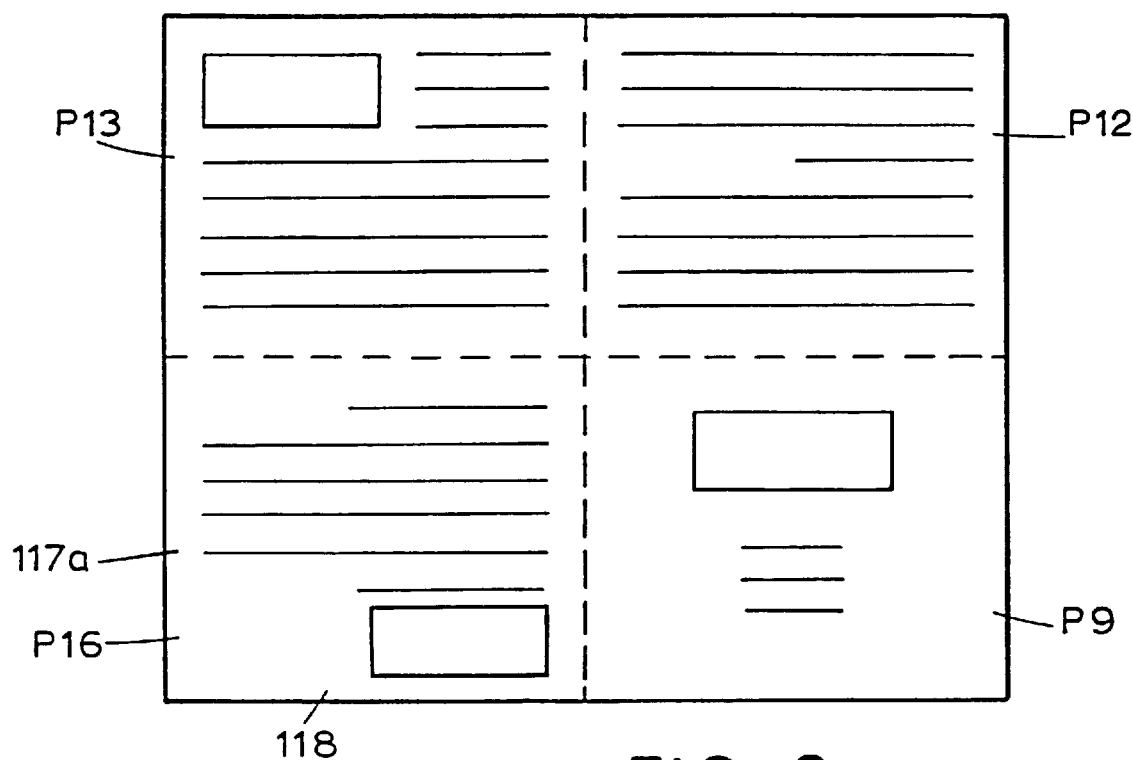
Figure 8B:
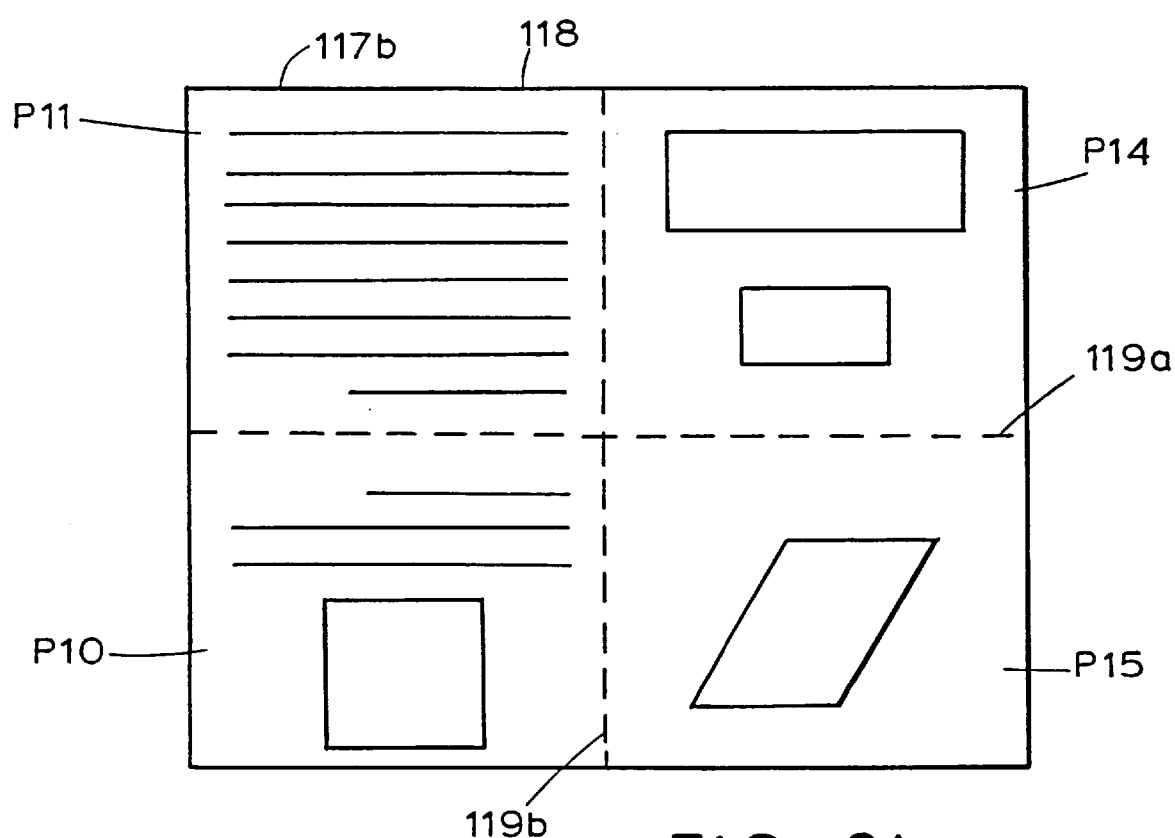

The book version example of FIGS. 8*a* and 8*b* differs from the book version examples of FIGS. 6*a*, 6*b* and 7*a*, 7*b* not only in terms of content of master and variable information, but also number of pages and page size. Specifically, eight pages P9–P16 are to be printed wherein the pages P9, P12, P13 and P16 are to be printed in a first side 117*a* of a sheet of paper 118 and the remaining pages P10, P11, P14 and P15 are to be printed on a second side 117*b* of the sheet 118. In addition, the pages P11–P14 are printed upside down relative to the remaining pages so that, when the sheet 118 is folded first along a fold line 119*a* and then along a fold line 119*b*, the resulting pages P9–P16 appear in order. Thereafter, the folded sheet 118 is trimmed to separate the pages P9–P16. As should be evident, the pages P9–P16 are one-half the size of the pages P1–P8, and further include different master and variable information thereon.

It should be noted that books assembled from multiple printed "forms" (defined in greater detail hereinafter) may alternatively or in addition be produced, if desired.

Referring again to FIG. 5, one or more template files 106 are developed by a publisher specifying the content (including appearance) of fixed information and the positioning of all information (i.e., fixed and variable) on the different books or book versions. A database 108 is also developed by the publisher using the personal computer 54 specifying the content of variable information to be placed in variable information areas, for example, the areas 110, 112 on the pages P1, P4, respectively, of FIGS. 6a and 6b. The database 108 further includes control information, as noted in greater detail hereinafter.

The template files 106 include data specifying the position and content of fixed information on the pages to be printed. Specifically, the template files 106 define template pages wherein each template page includes data representing any fixed information to be reproduced on corresponding pages of the books or book versions and area data representing any area(s) on the corresponding pages where variable information is to be reproduced. The template files are duplicated to create working files. One set of working files is stripped of all area data relating to placement of variable information to create stripped master page files 120 defining template pages having only fixed information thereon. The stripped master page files are then converted into PDL master page files 122 expressed in a page description language, such as POST-SCRIPT®. An optional imposition process may then convert the PDL master page files 122 into imposed master page files 124 each representing a side of a piece of paper to be printed with at least one, and, likely, two or more template pages having fixed information only thereon. Such a template page may be identical to that shown in FIG. 6a except that the areas 110 and 112 are removed therefrom.

A further set of working files is stripped of all fixed information to create stripped variable page files 126 defining template pages having fixed information removed therefrom and further having the area data defining the areas 110, 112. The data representing template pages having variable information thereon are expanded into a set of intermediate page files. In the example of FIGS. 6a and 6b where three books are to be printed, two intermediate page files 130, 132 are thus produced. The file 130 includes a file portion P1-a defining the position of variable information to be produced on the page P1 for the first book. Two other file portions P1-b and P1-c define the position of variable information to be produced on the front pages of the remaining two books. In like fashion, file portions P4-a, P4-b and P4-c represent the position of variable information to be reproduced on the last pages of the three books. At this point, data are also contained in each of the files 130, 132 identifying the entries in the database 108 to be placed in the areas 110, 112 during printing.

The files 130, 132 are then converted into variable page files 134, 136. The files 134, 136 are identical to the files 130, 132, respectively, except that the data in each file identifying entries in the database are replaced by the actual data stored at such entries.

The files 134, 136 are converted into files 137, 138 in a PDL format, for example, POSTSCRIPT®. An optional imposition process may convert the PDL files into imposed final variable page files 139.

The print system 79 operates in response to the press commands in a press command file 140 and merges the page files 122, 137 and 138 (if no imposition is to be effected) or merges the page files 124 and 139 (if the pages are imposed) to create the finished books or book versions.

Figure 9:
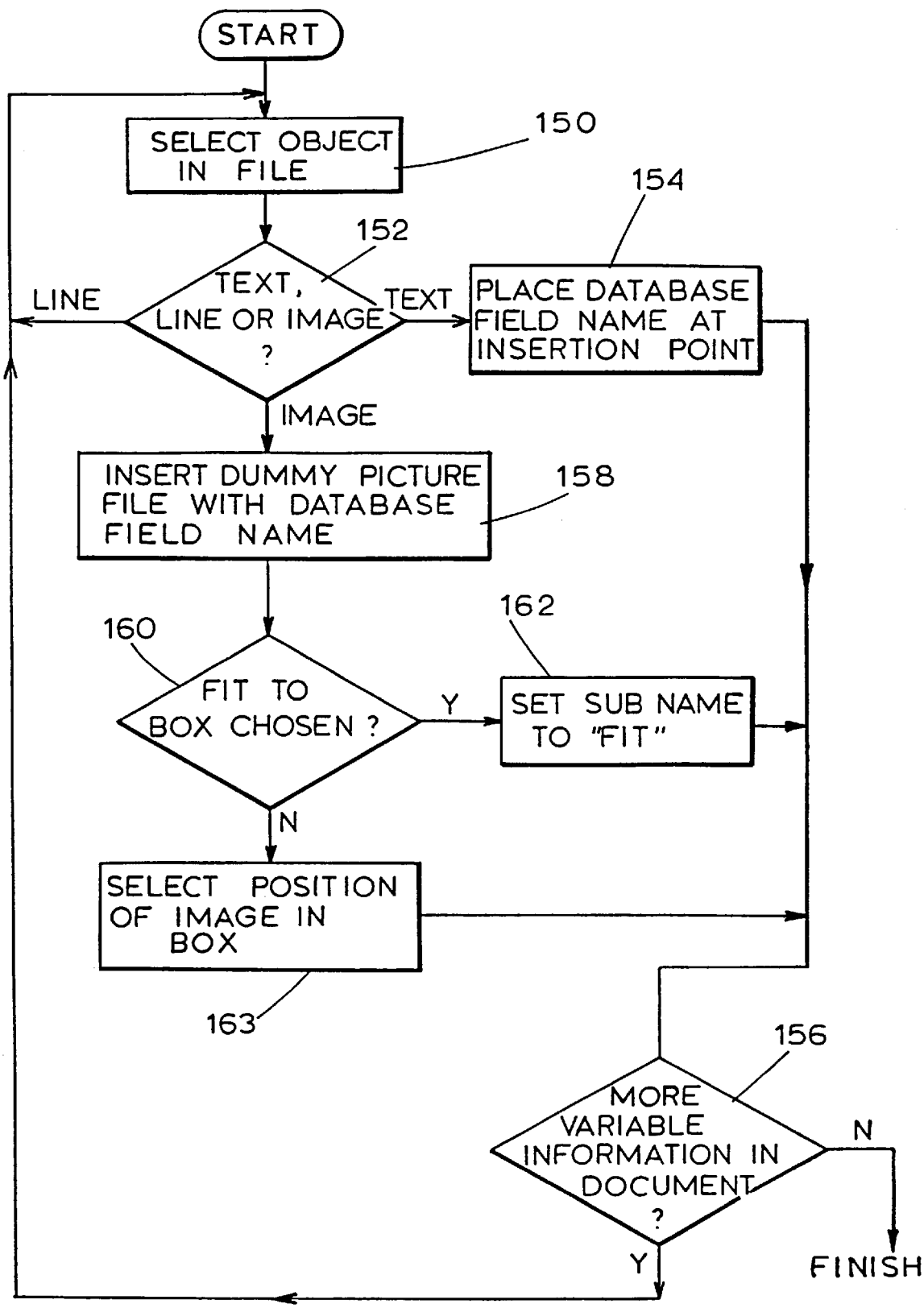
FIG. 9 is a flowchart illustrating programming that may be executed by a user on a personal computer to create the template files 105 of FIG. 5.

FIG. 9 illustrates a flow chart of programming executed by the personal computer 54 for creating the template file(s) 106 of FIG. 5. The programming may be written as an extension of QUARKXPRESS®, a page make-up program distributed by Quark, Inc. of Denver, Colo. The QUARKXPRESS® program may be adapted for operation on the APPLE® MACINTOSH® operating system or any other operating system, such as the MICROSOFT® WINDOWS® operating system. Alternatively, a different page make-up program may be used, if desired.

During the make-up process for a book consisting of one or more pages, a template file is created for each book version to be produced, or, where a book is to include two or more parts (referred to as "sections" hereinafter) a template file may be created for each section. At a block 150 a user may select an area of a page for reproduction of variable information therein, at which point a line object, a text object or an image object may be selected. A block 152 then checks to determine which type of object has been selected. If a text object has been selected, indicating that variable text is to be inserted at a point defined by the current cursor position on the computer display, the name of the appropriate field in the database 108 is inserted into the template file at the insertion point defined by the current cursor position (block 154). If the user wishes to designate more areas for variable information (block 156) control returns to the block 150 to await selection by the user. If the user then selects an image object, a box is defined by the user to contain an image at a desired location on a selected page. Control from the block 152 thereafter passes to a block 158 which inserts a dummy picture file and an indication of the proper database field name in the template file for the page at the location indicated by the current cursor position. The user will thereafter see the dummy picture file at the insertion point on the display of the computer 54 when the page is viewed. The dummy picture file will display an indication of which database field will be used for insertion on the respective pages.

Following the block 158, a block 160 prompts the user to enter an indication of whether the image object is to be displayed in one of two display formats. If the image is to be displayed in other than the original size thereof, a block 162 sets a subname defined for the image to "fit," indicating that the image is to be scaled to fit the box. If the image is to be displayed in the original size thereof, a block 163 prompts a user to select a position for the image at a particular location in the box defined therefor, such as the upper left-hand corner, the lower right-hand corner, or the like. If the user does not select a position, the image is placed in the upper left corner of the image box. Control thereafter proceeds to the block 156.

If the block 152 determines that a line object has been selected, control returns directly to the block 150, inasmuch as variable information cannot be entered into a line object.

At any point during the page make-up process, other functional aspects of the QUARKXPRESS® program may be invoked as necessary to produce finished pages.

Once the user determines that no more variable data is to be inserted into the document (block 156), the resulting page template files(s) are stored on a storage medium, such as an optical disc or other storage device, and/or the file(s) are downloaded together with the database to the control unit 52.

The database 108 is assembled by creating an ASCII file having a plurality of records wherein each record includes one or more fields entered into the database in tab-delimited format (i.e., the fields are separated from one another in each record by tab keystrokes and the records are separated from one another by line returns) and wherein the fields are arranged under field names of a header. Each field may include text to be reproduced on a page or a name of an image file stored in the memory 53 and defining an image to be reproduced on a page.

In addition to the foregoing data, the database 108 may include an optional field designating the number of copies of each book to be produced, an optional townsort image field, a version identification field indicating book version number if multiple book versions are to be produced, an optional distribution list field, control data and the like.

A sample database is set out below having a header consisting of twelve fields (i.e., "version," "address-line1," "addressline2," etc.) and a number of records, nine of which are shown, each having twelve fields:

| Version | Addressline1 | Addressline2 | Addressline3 | Addressline4 | Addressline5 | Price1 | Image1 | Price2 | Copies | Barcode | Townsort |
|---|---|---|---|---|---|---|---|---|---|---|---|
| 01 | William Doe | 123 Elm | Chicago | Illinois | 606248923 | $22.95 | Shoes | $21.95 | 1 | !606248923! | |
| 03 | Hugh Jorgensen | 56 Maple | Chicago | Illinois | 606248923 | $21.95 | Shirt | $20.95 | 1 | !606248923! | |
| 02 | Jay P. Morgan | 1313 Park | Chicago | Illinois | 606248924 | $24.95 | Pants | $22.95 | 1 | !606248924! | ■ |
| 02 | Joe Louis | 819 Elm | LaGrange | Illinois | 605251093 | $19.95 | Pants | $18.95 | 1 | !605251093! | |
| 03 | John Smith | 926 Cossit | LaGrange | Illinois | 605251093 | $19.95 | Shoes | $15.25 | 1 | !605251093! | |
| 01 | Len Johnson | 882 Monroe | LaGrange | Illinois | 605251093 | $19.95 | Shoes | $17.25 | 1 | !605251093! | |
| 02 | Janet Cizmar | 916 Monroe | LaGrange | Illinois | 605251094 | $24.95 | Pants | $21.95 | 1 | !605251094! | ■ |
| 03 | Jay Schroeder | 88 W. 77th | Brookfield | Illinois | 605241391 | $21.95 | Shirt | $19.95 | 1 | !605241391! | |
| 03 | John Doe | 129 Madison | Brookfield | Illinois | 605241391 | $22.95 | Shirt | $19.95 | 1 | !605241391! | ■ |

In the example of FIGS. 6a and 6b, the field names ADDRESSLINE1 through ADDRESSLINE5, BARCODE and TOWNSORT may appear in the area 112 and one or more of the field names PRICE1, IMAGE1 AND PRICE2 may appear in the area 110. Inasmuch as only a single version is to be produced in the example of FIGS. 6a and 6b, the VERSION field would not be used. The COPIES field may be used as a control code to select the number of book copies to be produced.

Figure 10A:
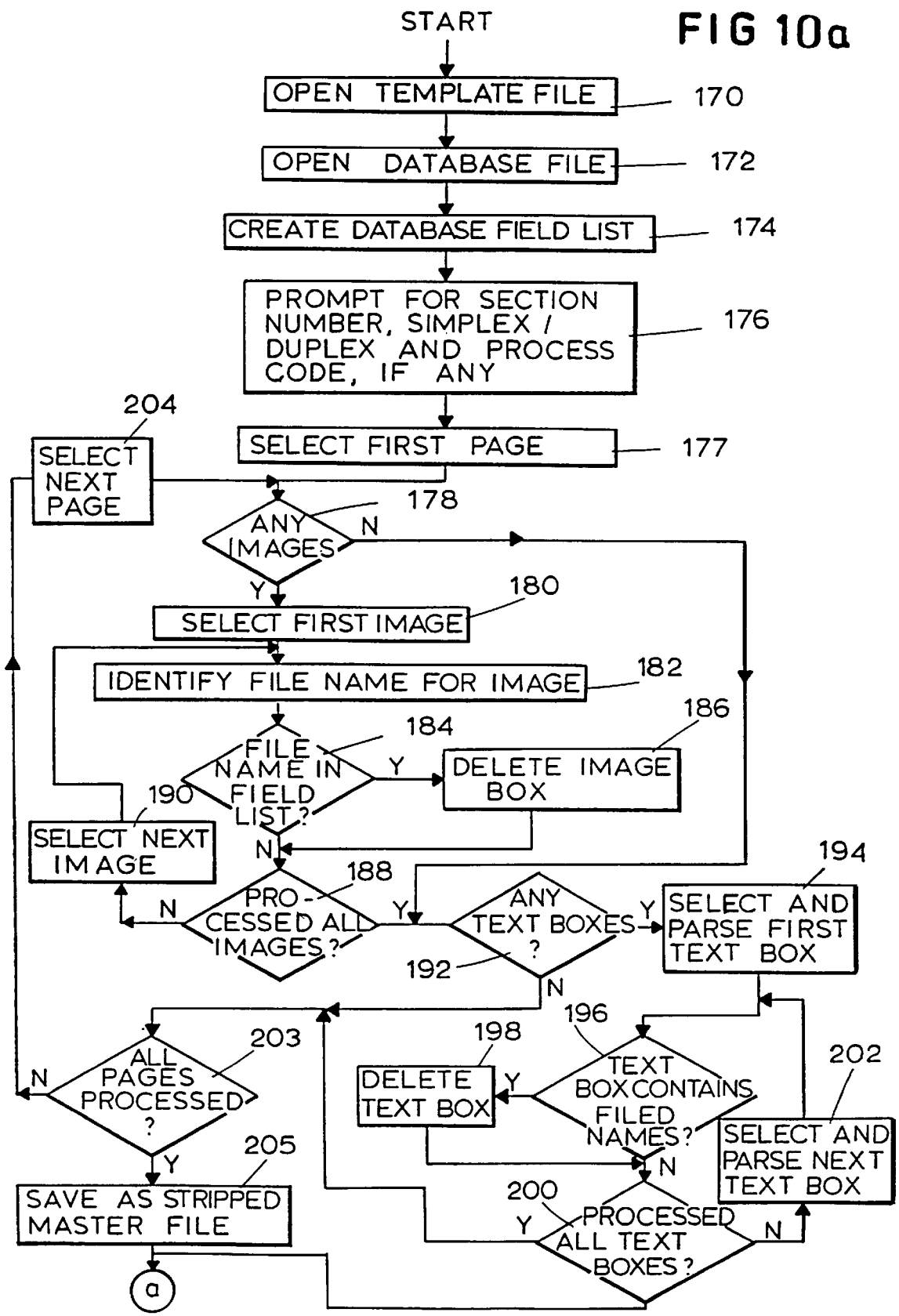
FIGS. 10a–10f, when joined along similarly-lettered lines, together represent programming executed by the control unit 52 of FIG. 3.

Once the template file(s) 106 and the database 108 are assembled, the programming of FIGS. 10a–10f may be executed by the control unit 52 to create the master page files 122 or 124, the final variable page files 137, 138 or 139, and the press command file 140. Referring first to FIG. 10a, a block 170 prompts a user to select a template file 106 and a block 172 opens the database 108. A block 174 then reads and stores in a list the database field names for later reference and a block 176 prompts a user to enter information indicating a section number and whether pages are to be printed in simplex (i.e., single-sided) or duplex (i.e., double-sided) format. The section number identifies the order in which multiple sections are to be processed for a particular book. The user may also be prompted to enter a selective processing code identifying a particular book version to process if multiple versions are to be produced during a single press run.

Following the block 176, a block 177 begins the process of stripping variable information from the template file opened by the block 170 to obtain the stripped master file 120 of FIG. 5. The block 177 selects a first page for processing and a block 178 checks to determine whether there are any images in the template file and, if images are located, a block 180 selects a first image. A block 182 identifies the file name for the image and a block 184 checks the field list to determine whether the file name is included therein. If the file name for the image is included in the field list, then the image comprises variable information and a block 186 deletes the image block. Otherwise, the block 186 is skipped and a block 188 checks to determine whether all images have been processed. If not, a block 190 selects a next image and control returns to the blocks 182–188. Control remains with such blocks until the block 188 determines that all images have been processed and control then passes to a block 192. Control also passes to the block 192 from the block 178 should the latter determine that there are no images in the template file.

The block 192 determines whether any text boxes are present in the open template file. If at least one text box is present, a block 194 selects and parses a first text box and a block 196 checks to determine whether the text box includes at least one of the field names of the database 108. If so, then it has been determined that the text box includes variable information and a block 198 deletes the text box. Otherwise, the block 198 is skipped and a block 200 checks to determine whether all text boxes in the template file have been processed. If not, a block 202 selects and parses the next text box in the template file and control returns to the blocks 196–200. Control remains with such blocks until all text boxes have been processed, whereupon a block 203 determines whether all pages have been processed. If not, a block 204 selects a next page and control returns to the block 178. Otherwise, a block 205 saves the resulting file as the stripped master file.

Control also bypasses the blocks 194–202 and proceeds directly from the block 192 to the block 203 if there are no text boxes in the open template file.

Figure 10B:
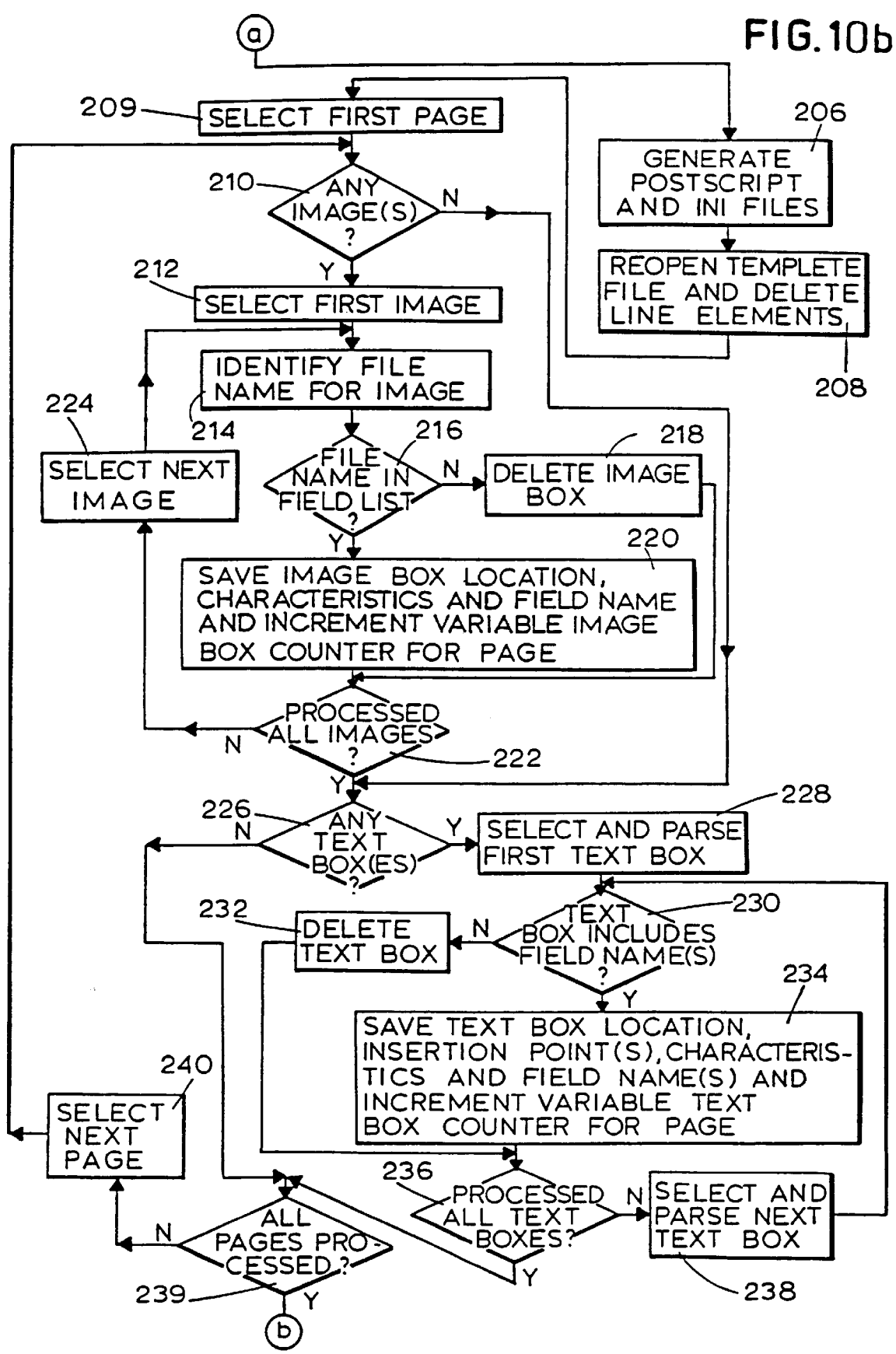

Following the block 205, a block 206, FIG. 10b, converts the stripped master file into the PDL master page file 122 of FIG. 5. At the same time, an initialization (or INI) file is created in ASCII code according to the following format:

name: [file path\name]
psx: [dimension]
psy: [dimension]
ssx: [dimension]
ssy: [dimension]
posx: [dimension]
posy: [dimension]
duplex: [zero or one]
orientation: [zero or one]
output: [filename]
copies: [number]

Where "psx" and "psy" refer to finished page sizes in x and y directions, "ssx" and "ssy" refer to cut sheet size in x and y directions, "posx" and "posy" refer to offsets in x and y directions specifying placement of each page on a cut sheet, "duplex" refers to single or two-sided printing, "orientation" refers to portrait or landscape printing, "output" refers to the name of the output file and "copies" refers to the number of copies to be printed. A sample INI file which specifies parameters for printing of a file called MYJOB.PS is as follows:

Name: c:\jobs\myjob.ps
psx: 8000
psy: 11000
ssx: 11500 ssy: 9000 posx: 150 posy: 150 duplex: 1 orientation: 1 output: myjob.ps copies: 1

In the foregoing example, one copy of the file MYJOB.PS is to be printed in duplex and portrait formats at an offset of 0.15×0.15 inches from a corner of a finished sheet of paper 8×11 inches cut from a sheet originally having dimensions of 9×11.5 inches.

Following the block 206, a block 208 then reopens the same template file originally opened by the block 170 to begin the process of creating the stripped variable page files 126 of FIG. 5. A block 209 selects a first page and a block 210 checks to determine whether there are any images in the file and, if so, a block 212 selects a first image for consideration. A block 214 identifies the file name for the image and if a block 216 determines that the file name is not in the field list, then the image comprises fixed information (i.e., image will be the same in all of the books of a given version) and hence the image box is deleted by a block 218.

On the other hand, if the file name for the image is in the database field list, then the image is of the variable type (i.e., the image changes with the books of a given book version), and hence a block 220 identifies and saves the image box location on the page, the characteristics of the image box, such as the size, skew, background color and subname and the like and further saves the field name of the image from the database 108. Also, a counter in the memory 53 which tracks the number of variable image boxes on the page is incremented.

Control from the blocks 218 and 220 passes to a block 222 which checks to determine whether all images have been processed. If not, a block 224 selects a next image and control returns to the blocks 214–222. Otherwise, control proceeds to a block 226 which begins the process of selecting and identifying text boxes. Control will also pass to block 226 from block 210 if, at block 210, it is determined that there are no images in the file. If there are text boxes present in the template file, a block 228 selects and parses a first text box and a block 230 checks the parsed text box to determine whether it includes one or more field names from the database. If not, then it has been determined that the text box includes only fixed information, and hence a block 232 deletes the text box. Otherwise, a block 234 stores the text box location, the insertion points in the text box at which variable information is to be printed and the characteristics of the text box and the field names of the database 108 identified in such text box in the memory 53. In addition, a variable text box counter is incremented representing the number of text boxes appearing on each page.

Control from the blocks 232 and 234 proceeds to a block 236 which checks to determine whether all text boxes have been processed. If not, a block 238 selects and parses the next text box and control returns to the blocks 230–236. Once all text boxes have been processed, or if the block 226 determines that there are no text boxes in the template file, a block 239 determines whether all pages have been processed and, if not, a block 240 selects the next page and control returns to the block 210. Otherwise, control passes to a block 241, FIG. 10c, which saves the resulting file as the stripped variable file 126 of FIG. 5.

Control also passes to the block 239 from the block 226 if there are no text boxes found.

A block 242 then creates a working copy of the stripped variable file 126 and a first page having variable data thereon is selected and data representing the remaining pages in the file are deleted by a block 244. In the example of FIGS. 6a and 6b, the block 244 creates a file defining the front page of a book with all fixed information deleted therefrom and an area reserved for variable information.

Following the block 244, a block 246 selects a first record in the database 108 and a block 248 reads the record. An optional block 250 checks to determine whether a selective processing code has been entered by the user indicating that the page is to undergo selective page processing. As noted above, the subject apparatus and method may be utilized to produce not only books of a single version (i.e., where corresponding pages differ only in terms of the variable information stored in the database) but also books of different versions. In the latter case, the books of different versions have different fixed and variable information. The fixed and/or variable information may vary in terms of content or appearance (i.e., style, location, rotation, position, etc.) or both in different versions.

If the block 250 determines that selective page processing is to be undertaken, then a block 252 checks to determine whether the database record read by the block 248 is utilized on the page currently under consideration. If this is not the case, a block 253 checks to determine whether the record currently under consideration is the last in the database. If so, control passes to a block 294 of FIG. 10e. Otherwise, a block 254 selects a next record in the database 108 and control returns to the block 248 where the next database record is read.

If the block 250 determines that selective page processing is not to be undertaken, or if the block 252 determines that the record read by the block 248 is used in the page currently under consideration, a block 256 duplicates the data representing the page remaining after execution by the block 244 to initiate development of one of the files 130 or 132. In the first pass through the program of FIG. 10c, and in connection with the example of FIGS. 6a and 6b, the block 256 creates the file 130 and develops page data representing a first version of the page P1-a and adds further variable information to such page data during immediately succeeding passes through the program. Thereafter, data representing the remaining pages P1-b, P1-c and P4-a through P4-c are created and variable information is added to such pages serially during subsequent passes.

A block 258 checks to determine whether there are any image boxes on the page and, if so, a block 260 selects a first image box. A block 262 then inserts the image identified by the database field into the image box. A block 264, FIG. 10d, checks the subname to determine whether the block 162 of FIG. 9 has indicated that the image should be sized to fit the image box. If this is true, a block 266 performs the scaling. Otherwise, a block 268 positions the image in the image box at the position specified by the user and a block 270 checks to determine whether all image boxes have been processed. Control also passes from the block 266 directly to the block 270, thereby skipping the block 268. If not all image boxes have been processed, a block 272 selects a next image box on the page and control returns to the blocks 262–270 so that remaining image boxes are serially processed.

Figure 10C:
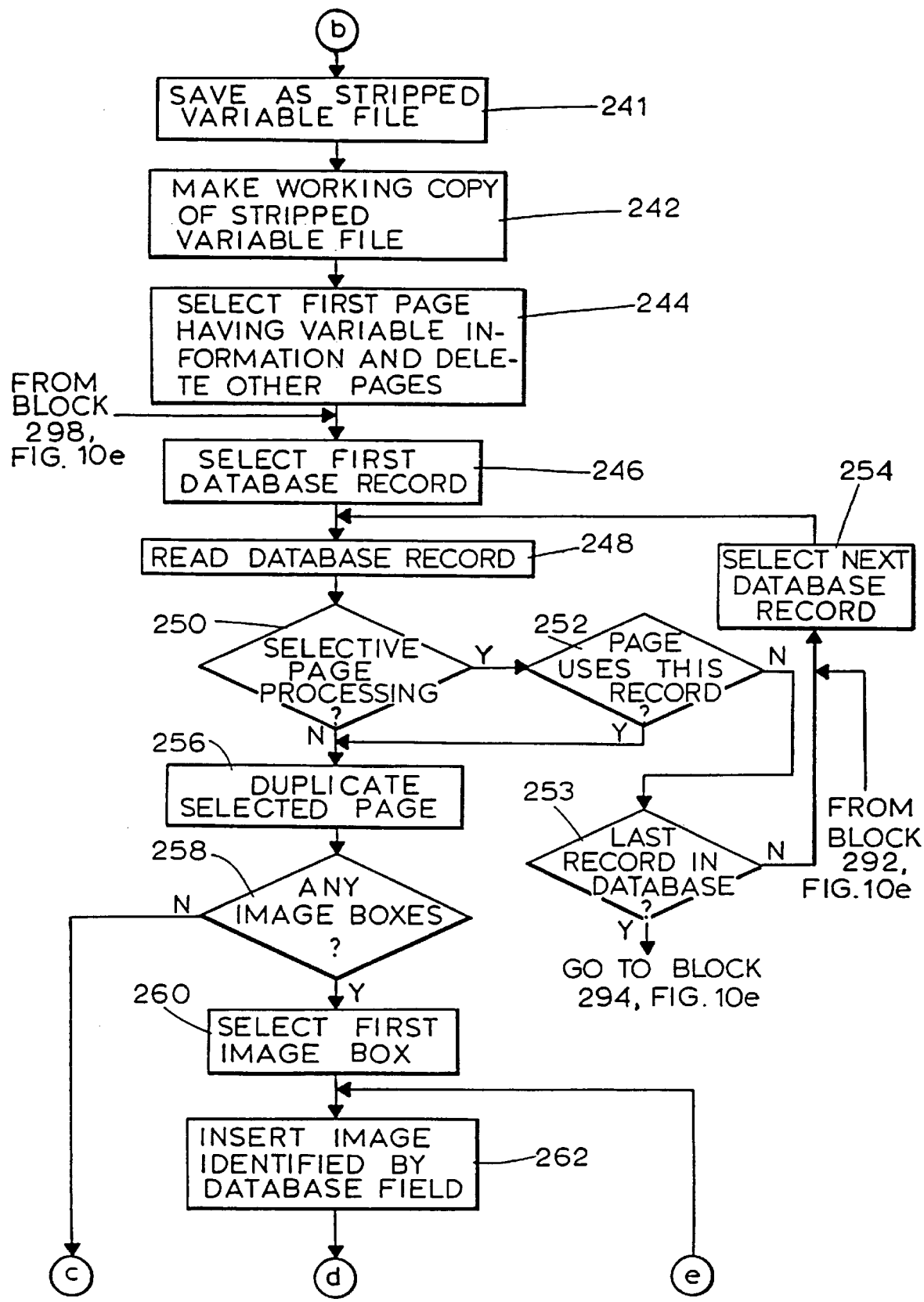
Figure 10D:
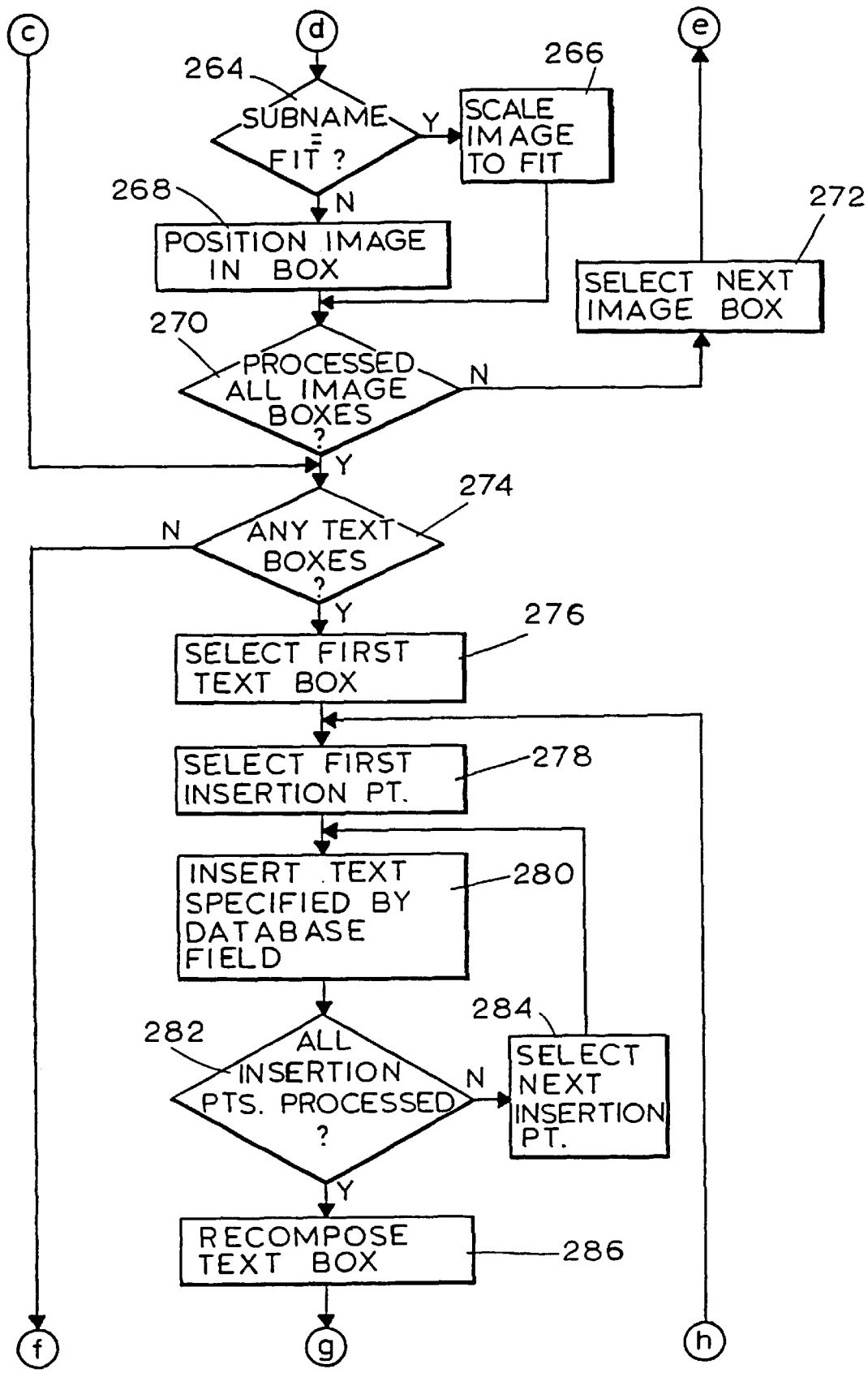
Figure 10E:
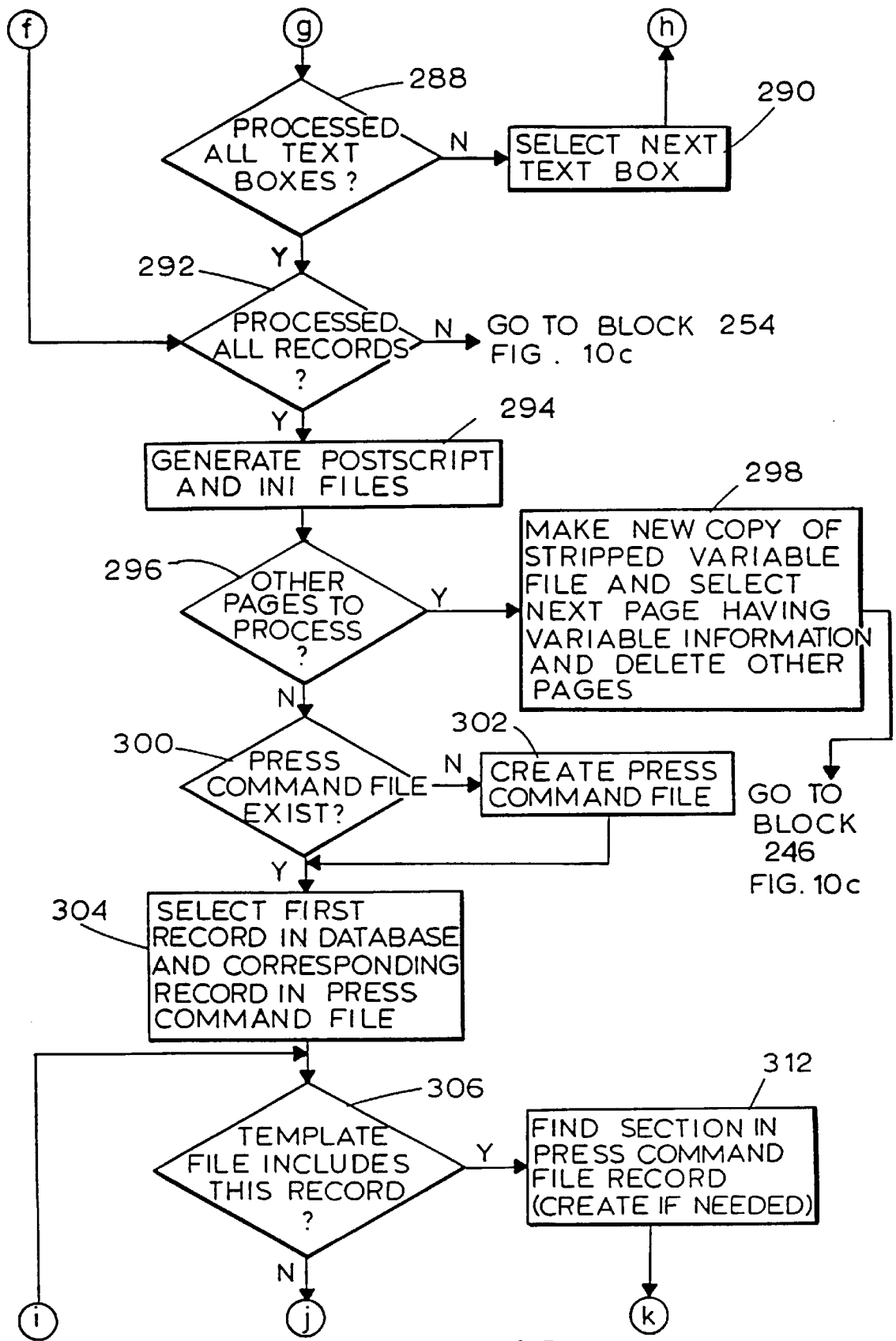
Figure 10:
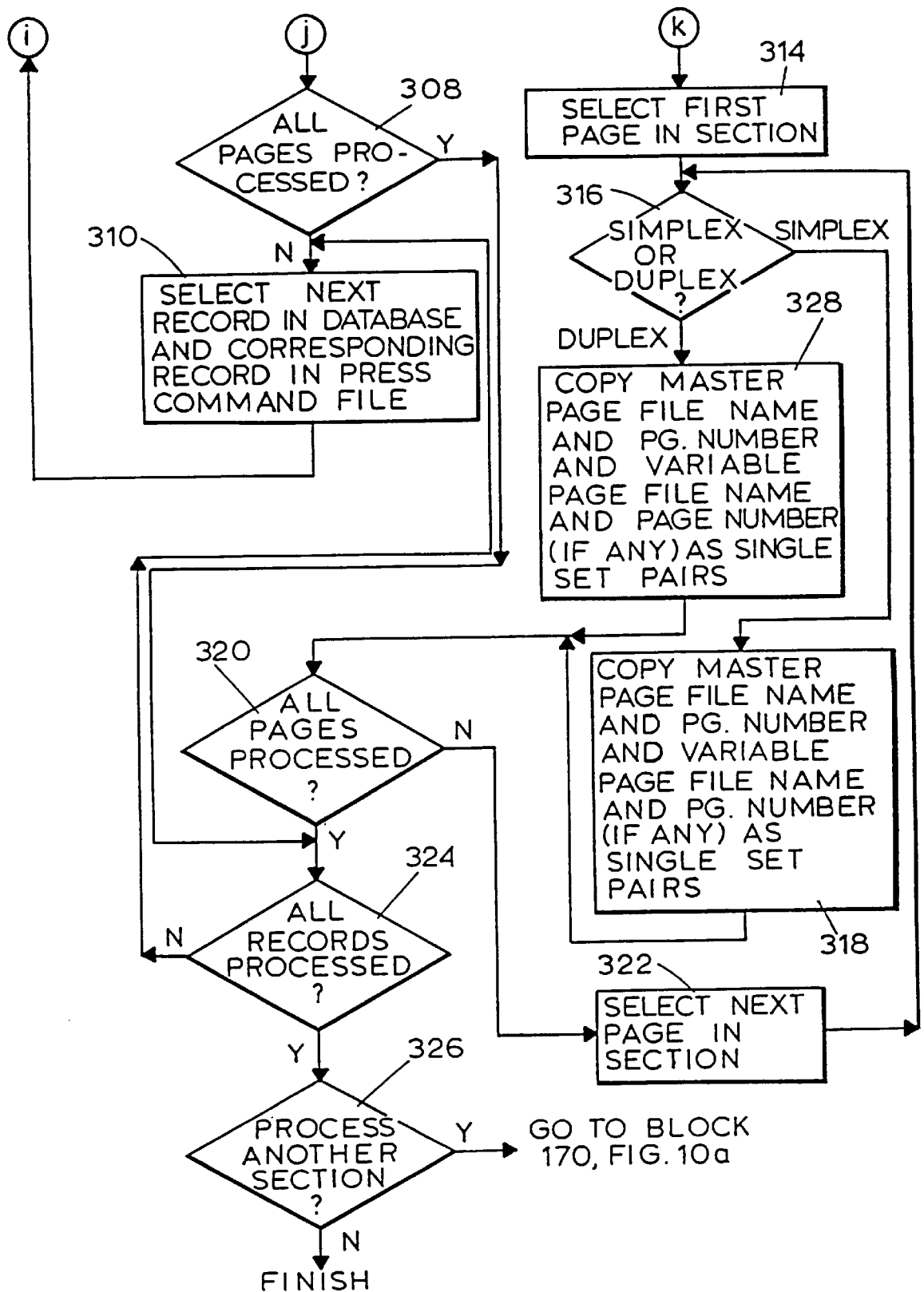

Once the block 270 determines that all image boxes have been processed, or immediately following the block 258 of FIG. 10c if no image boxes are found on the page, a block 274 checks to determine whether there are any text boxes on the page and, if so, a pair of blocks 276, 278 select a first text box and a first insertion point in such box. The appropriate insertion points are selected by block 284. Blocks 280, 282 and 284 serially insert text data stored in the database 108 at the appropriate insertion points in the text box. Once all of the variable text data have been inserted into the text box, a block 286 recomposes all text in the text box so that the text obtains a neat finished appearance. The recomposition process is automatically undertaken by the QUARK XPRESS® program once the variable information is inserted into each text box. The recomposition process is responsive to the user commands as applied to the template file page, such as left, right, center, or full justification, hyphenation and the like. Following the block 286, a block 288, FIG. 10e, checks to determine whether there are remaining text boxes to be processed on the page and, if so, a block 290 selects the next text box on the page and control returns to the blocks 278–288 to insert text information into such text boxes.

Once the block 288 determines that all text boxes for the page have been processed, the programming required to produce one of the pages of the file 134 of FIG. 5 having variable information only thereon is complete. A block 292 then determines whether all records in the database have been considered for inclusion in additional variable pages of the file 134 to be produced. If not all records have been considered, control returns to the block 254, FIG. 10c, where the next database record is identified and read. On the other hand, if all pages of the file 134 have been produced by considering all records in the database 108, a block 294 converts the file data into POSTSCRIPT® or another PDL format to create the variable page file 137 of FIG. 5. Also, an INI file is created as before, except that the "duplex" parameter is set to command simplex printing only. If necessary or desirable, should the press run length exceed a certain limit, the programming may be modified to create more than one variable page file for each variable page of the template file.

Following the block 294, a block 296 checks to determine whether there are other variable pages in the stripped variable page file to be processed. If there are other pages to process (i.e., the answer to the inquiry is "yes"), a block 298 produces a new copy of the stripped variable file, selects the next variable page therein and deletes remaining pages therefrom. Control then returns to the block 246 of FIG. 10c. In the example of FIGS. 6a and 6b, the back page P4 and the corresponding pages of the remaining books are now selected for processing. In the fashion noted above, a file representing the variable portions of such pages is produced by developing the file representing the pages P4-a through P4-c and inserting the database information into such file to obtain the variable page file 136 and the PDL version 138.

Following generation of the variable page files 134, 136, and 137, 138 and if there are no other pages to process (i.e., the answer to the inquiry at block 296 is "no"), control passes from block 296 to a block 300 which checks to determine whether a press command file has already been created. If not, a file is created by a block 302 having placeholder comments indicating where in the press command file individual press commands are to be placed for each book to be produced. The press command file may also include data from one or more fields of the database 108 identifying an intended recipient of each book to be produced to assist in reproducing books found to be defective or to produce sample books. At this point, the press command file for the example of FIGS. 6a and 6b may be as follows (using data from the sample database set out above):

;RECORD1
;:WILLIAM DOE:606248923
;ENDRECORD
;RECORD2
;:HUGH JORGENSEN:606248923
;END RECORD
;RECORD3
;:JAY P. MORGAN:606248924
;END RECORD

Following the block 300 (if the press command file already exists) or the block 302 a block 304 selects the first database record and a corresponding first record in the press command file. A block 306 then checks to determine whether the template file currently being processed includes the selected database record. If not, a block 308 determines whether all pages have been processed, and if this is not the case, the next record in the database 108 and a corresponding record in the press command file are selected. Control then returns to the block 306. If the block 306 ascertains that the template file includes the selected record, a block 312 inserts an indication of the section number in the press command file at an appropriate point if the section number is not already present. If the section number is present already, the press command identified by the section number entered by the user at the block 176 is identified to be overwritten at a later point. The press command file now appears as follows for the example of FIGS. 6a and 6b:

;RECORD1
;:WILLIAM DOE:606248923
;SECTION 1
;ENDSECTION
;ENDRECORD
;RECORD2
;:HUGH JORGENSEN:6062488923
;SECTION 1
;ENDSECTION
;END RECORD
;RECORD3
;:JAY P. MORGAN:606248924
;SECTION 1
;END SECTION
;END RECORD

Following the block 312, a block 314, FIG. 10f, selects a first page of the section and a block 316 checks the state of a flag stored in the memory 53 to determine whether a simplex or duplex job has been requested. If a simplex job has been requested, the file name and page number of the master page file and, if variable information is to appear on the page, the file name and page number of the variable page file for the selected page are stored as a single set pair in the memory 53 by a block 318. The determination of whether variable information is to appear on the selected page is accomplished by summing the contents of the variable image box counter and the variable text box counter as incremented by the blocks 220 and 234 of FIG. 10b.

A block 320 checks to determine whether all pages have been processed and, if not, the next page is selected by a block 322 and control returns to the block 316 for processing of such page. If all pages have been processed, control passes to a block 324 which determines whether all database and press command records have been processed. Control also passes to the block 324 if the block 308 determines that all pages have been processed. If not all records have been processed at this point, control returns to the block 310 where the next records in the database and press command file are selected.

If the block 324 determines that all records for the current section have been processed, a block 326 determines whether another section is to be processed and, if so, control returns to the block 170 of FIG. 10a. If there is not another section to be processed, the press command file has been fully assembled, and hence the process terminates.

If the block 316 determines that a duplex job is to be effected, control passes to a block 328 which stores in the memory 53 a command identifying the file names and page numbers of the master page file (as well as corresponding information relative to variable page files, if variable information is to appear) as two-set pairs. Control from the block 328 then passes to the block 320 described above.

The result of the programming of FIGS. 10a–10f is a press command file having a sequence of press commands which cause printing of pages in a desired order. In the example of FIGS. 6a and 6b, the press command file would read as follows:

BOOK A
;RECORD1
;:WILLIAM DOE:606248923
;SECTION 1
"file.m"1@"file.1"1|"file.m"2
"file.m"3|"file.m"4@"file.4"1
;ENDSECTION
;ENDRECORD
;RECORD2
;:HUGH JORGENSEN:606248923
;SECTION 1
"file.m"1@"file.1"2|"file.m"2
"file.m"3|"file.m"4@"file.4"2
;ENDSECTION
;ENDRECORD
;RECORD3
;:JAY P. MORGAN:606248924
;SECTION 1
"file.m"1@"file.1"3|"file.m"2
"file.m"3|"file.m"4@"file.4"3
;ENDSECTION
;ENDRECORD
ENDBOOK
PRINTRUN R
BOOK A
ENDPRINTRUN In the foregoing example, "file.m" is a file name identifying the master page file 122 and "file.1" and "file.4" are file names identifying the variable page files 137 and 138, respectively. The number following each file name designates a particular page of the file identified by the file name. Thus, for example, "file.m" 1 designates the first page of the master file "file.m" and "file.1" 2 designates the second page of the variable page file "file.1." The @ sign means to associate the pages of the files linked by such sign and the vertical line in the commands indicates that the page(s) on the left side of the vertical line are to be printed on the front side of a piece of paper whereas the page(s) on the right side of the vertical line are to be printed on the reverse side of the piece of paper. In an example of simplex printing, no file name would appear to the right of the vertical line in each command.

Figure 11A:
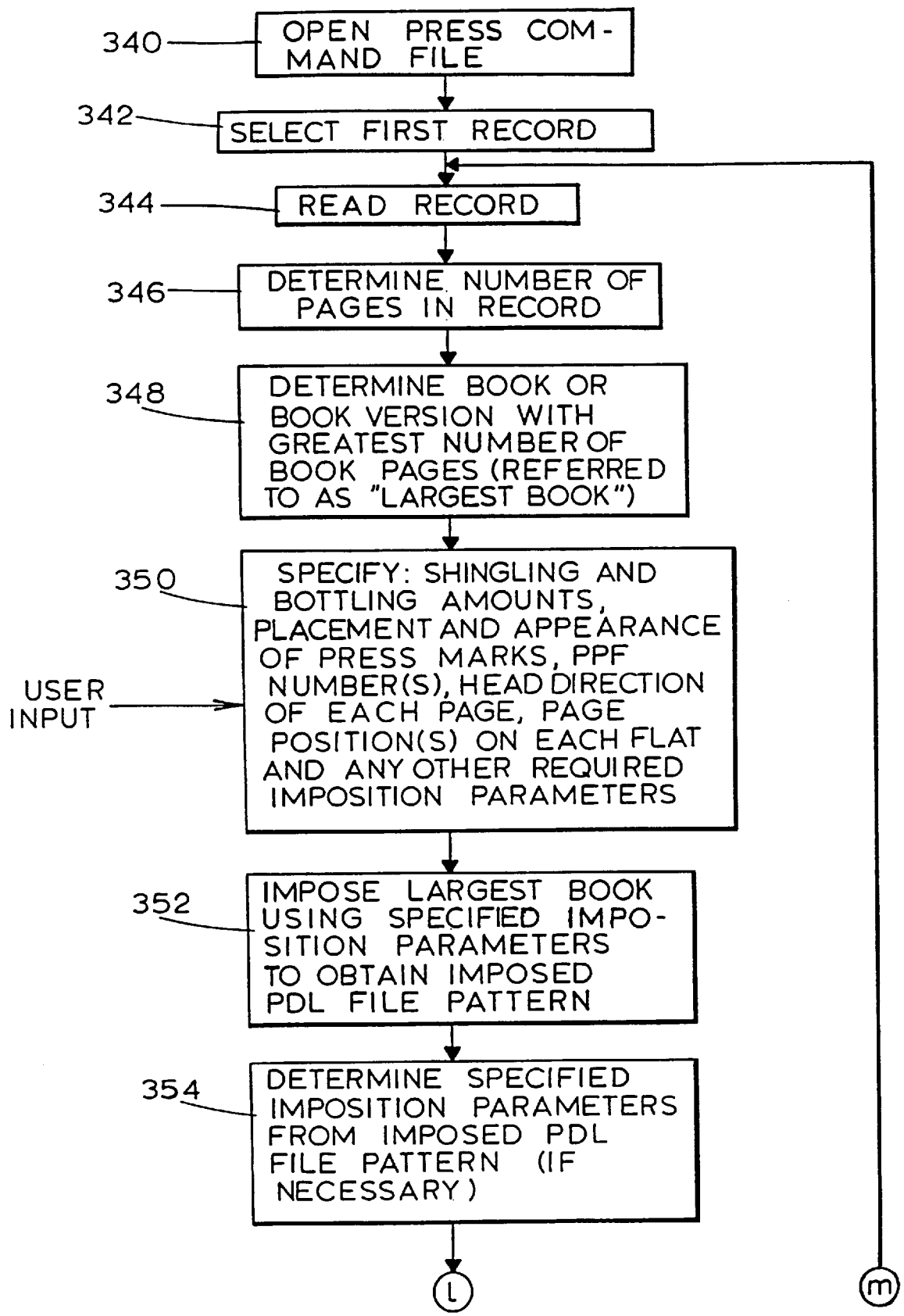
FIGS. 11a–11c, when joined along the similarly-lettered lines, together represent programming executed by the control unit 52 of FIG. 3 to impose pages to be printed by one of the demand printing systems of FIG. 3.
Figure 11B:
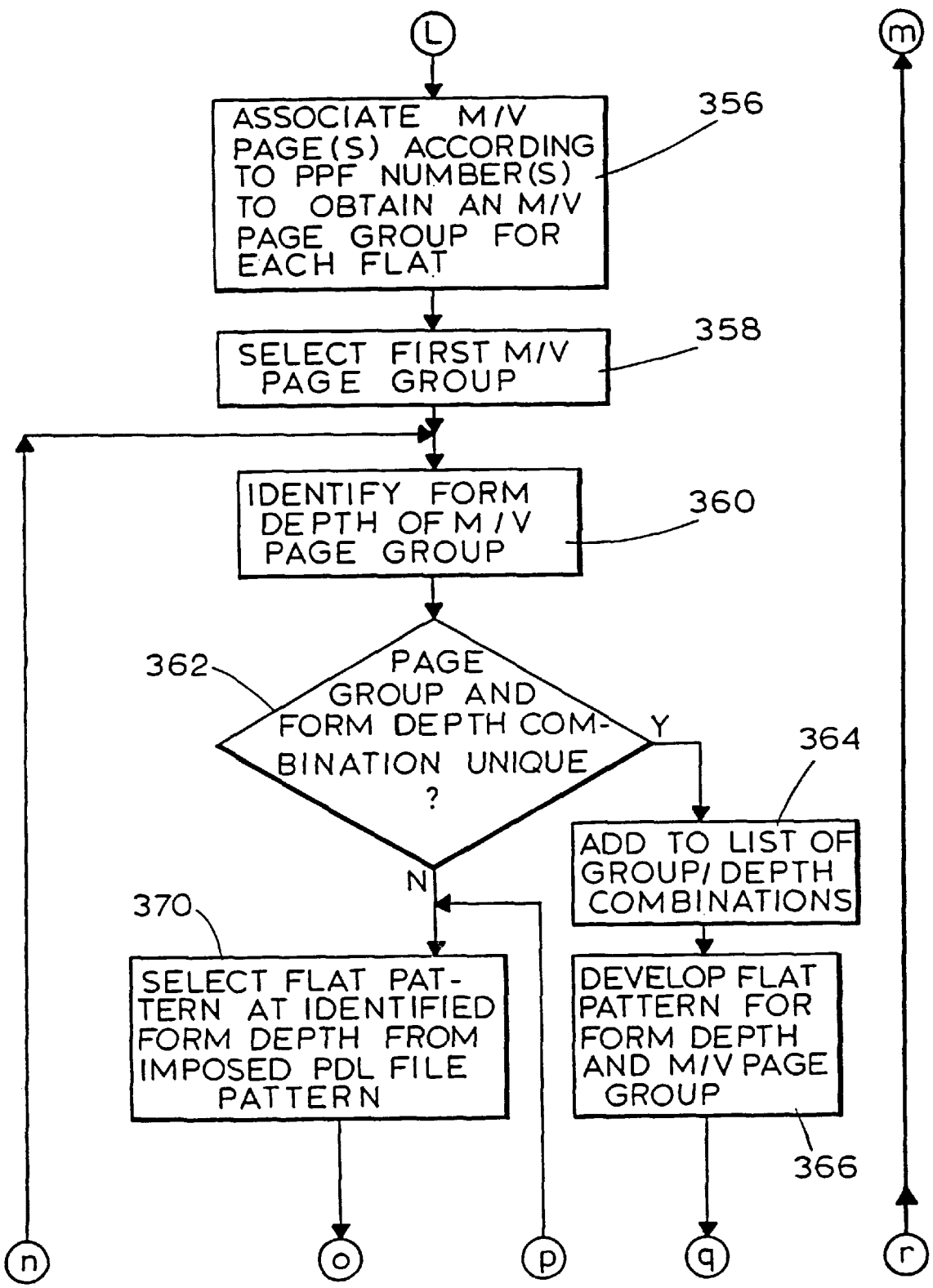
Figure 11C:
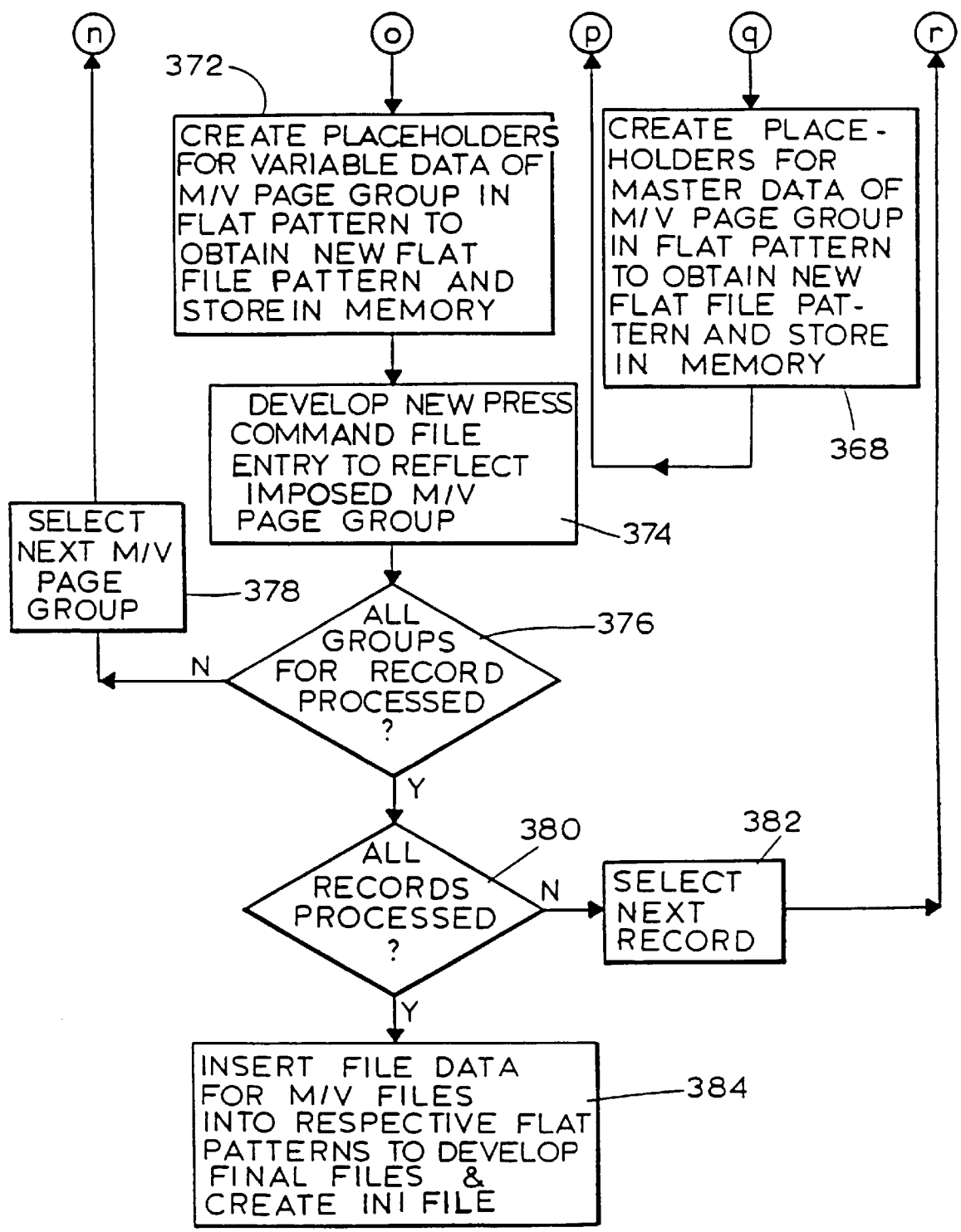

FIGS. 11a–11c illustrate an exemplary imposition system which may be used to impose pages for printing. The imposition system of FIGS. 11a–11c is invoked to create a new press command file which prints at least one, and likely two or more pages on one or both sides of a form. The programming begins at blocks 340 and 342 which open the press command file and select a first record therein. A block 344 then reads such record and a block 346 determines the number of master pages that are in the press command file record read by the block 344. In the example shown in FIGS. 6a and 6b, and as defined in the press command file example set forth above, each book includes four master pages. The block 346 determines the number of master pages in the record to determine page assignments to the various forms. As noted above, "form" designates a single sheet of paper as printed by the press. Each form has two sides, each of which is referred to as a "flat." Each flat includes a number of pages thereon, wherein the number is hereinafter referred to as the "PPF" number (for "pages-per-flat" number).

A block 348 determines the book or the book version to be produced during the print job having the greatest number of book pages. This book or book version is hereinafter referred to as the "largest book". A block 350 then prompts a user to enter various imposition parameters including shingling and bottling amounts, placement and appearance of press marks, head direction of each page (when not all pages have the same head direction, for example, as seen in FIGS. 8a and 8b) page position(s) on each flat and any other required imposition parameters. In addition, the user is prompted to enter the PPF number for each flat type to be produced. For example, the user may be prompted to enter a PPF number of two for the examples of FIGS. 6a, 6b and 7a, 7b and a PPF number of four for the example of FIGS. 8a and 8b. The parameters may be specified by a user using any commercially available and suitable imposition system such as PREPS®, by ScenicSoft, Inc. of Everett, Wash., IMPOSTRIP®, by Ultimate Technographics of Montreal, Quebec, Canada, Quark IMPOSITION® by Quark, Inc. of Denver, Colo., or any other system. Alternatively, the imposition system disclosed in Sands et al. U.S. patent application Ser. No. 738,217, filed Jul. 30, 1991 now U.S. Pat. No. 5,634,091, filed May 27, 1997, and entitled "Digital Page Imaging System" can be used.

Following the block 350 a block 352 develops an imposition pattern allowing a block 354 to derive the specified imposition patterns. This step effected by the block 352 is necessary inasmuch as the specified imposition parameters are not directly available to such programming, and hence the parameters must be obtained by selecting the largest book or book version to be produced and imposing same so that the imposition parameters can be deduced therefrom. If the imposition parameters can be provided to the programming of FIGS. 11b and 11c directly, then the blocks 352 and 354 would be unnecessary and may be omitted.

Following the block 354, a block 356, FIG. 11b, associates master and variable pages to appear on the same flat with each other according to the PPF number for such flat to obtain a master/variable page group for each flat. In the example of FIG. 6a, the master and variable files for the pages P1 and P4 would be associated together. In the example of FIG. 8a, the master and variable files for the pages P9, P12, P13 and P16 would be associated by the block 356.

A block 358 then selects a first master/variable page group and a block 360 determines the form depth of the master/variable page group. The "form depth" is the position of a printed flat in a stack of forms which are stitched together to produce a book.

Following the block 360, a block 362 checks to determine whether the form depth and the identity of the master/ variable page group are a unique combination. If so, a block 364 creates a list in the memory 53 of group/depth combination (if such list has not already been created) and adds the current group and form depth combination to such list.

Following the block 364, a block 366 develops and saves a flat pattern defining a template for the master/variable page group, taking into account the form depth of such group. The flat pattern is a file defining the positions of the pages associated as a group by the block 356. A block 368 then creates placeholders for the master data of the master/variable page group in the flat pattern so that a new flat file pattern is obtained. The new flat file pattern is stored in the memory 53 and control passes to a block 370, FIG. 11b. Control also passes directly to the block 370 from the block 362, bypassing the blocks 364–368, if the page group identity and form depth combination is not unique.

The block 370 identifies and selects the flat pattern from the imposed PDL file pattern developed by the block 352 at the form depth of the selected master/variable page group. A block 372, FIG. 11c, then creates place holders for variable data of the master/variable page group in the flat patterns selected by the block 370 to obtain a new flat pattern which is then stored in the memory 53. A block 374 thereafter develops a new press command file entry to reflect the imposed master/variable page group.

Following the block 374, a block 376 checks to determine whether all master/variable groups for the record of the press command file currently under consideration have been processed. If not, a block 378 selects the next master/variable page group and control returns to the block 360 of FIG. 11b. Otherwise, a block 380 checks to determine whether all records in the press command file have been processed. If not, a block 382 selects the next record and control returns to the block 344 of FIG. 11a. If all records have been processed, a block 384 inserts the file data for the master/variable files into the placeholders in the respective flat patterns to develop the imposed master and variable page files 124 and 139 of FIG. 5. A suitable INI file is also created to reflect the new flat geometry.

Figure 12:
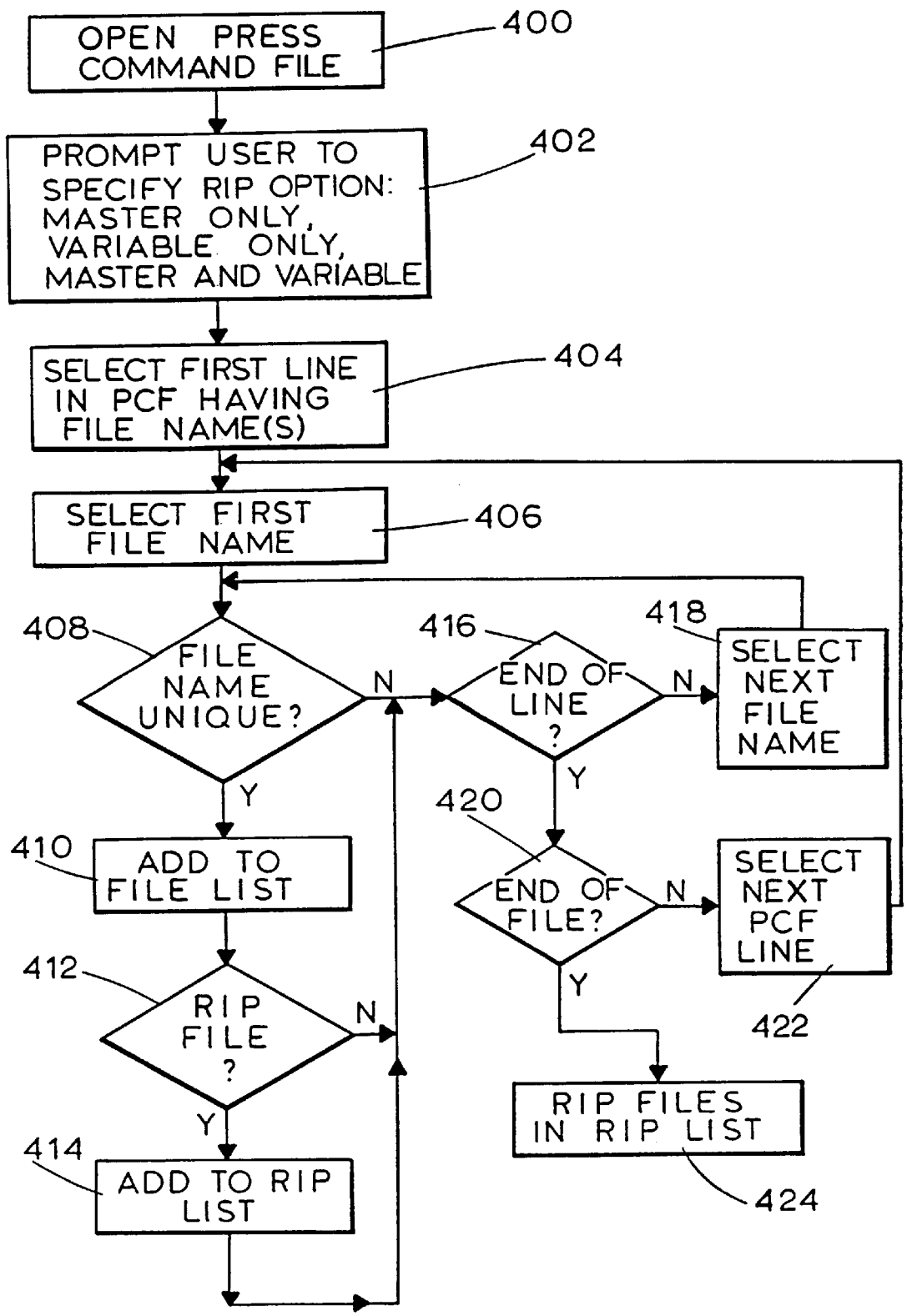
FIG. 12 illustrates programming executed by the control unit of 52 of FIG. 3 to convert page files into bitmap format.

FIG. 12 illustrates programming which may be executed by the control unit 52 of FIG. 3 to facilitate conversion of the imposed page files 124 and 139 into bitmap format using the RIP 82 of FIG. 4. The programming begins at a block 400 which opens the press command file stored in the memory 53. A block 402 then prompts a user to specify options which are available using the RIP 82. The options include the ability to convert only master page files, only variable page files or both master and variable page files into bitmap format. A block 404 then selects the first line in the press command file having at least one file name therein. Thereafter, a block 406 selects a first file name and a block 408 checks a file list stored in the memory 53 to see if the file name has been previously placed in the list. If this is not the case, then this is the first time the file name has been encountered in the programming of FIG. 12. Thus, a block 410 adds the file name to the file list and a block 412 checks the user-specified options set by the block 402 to determine whether the file should be converted into bitmap format. If so, a RIP list stored in the memory 53 is updated by adding the file name thereto and control passes to a block 416. Control also passes to the block 416 from the block 412 bypassing the block 414 if the file is not to be converted into bitmap format, and from the block 408 if the file name currently under consideration is already in the file list.

The block 416 checks to determine whether the end of the current line in the press command file has been reached. If not, a block 418 selects the next file name in the line and control returns to the block 408.

If the block 416 determines that the end of the current line in the press command file has been reached, a block 420 checks to determine whether the end of the press command file has been reached. If not, a block 422 selects the next line in the press command file having at least one file name and control returns to the block 406. On the other hand, if the end of the file has been reached, a block 424 causes the RIP 82 to convert the files identified in the RIP list into bitmap format by issuing commands and files as appropriate to the RIP 82.

The programming of FIG. 12 facilitates conversion of files to bitmap format as required by the print system 79.

Figure 13:
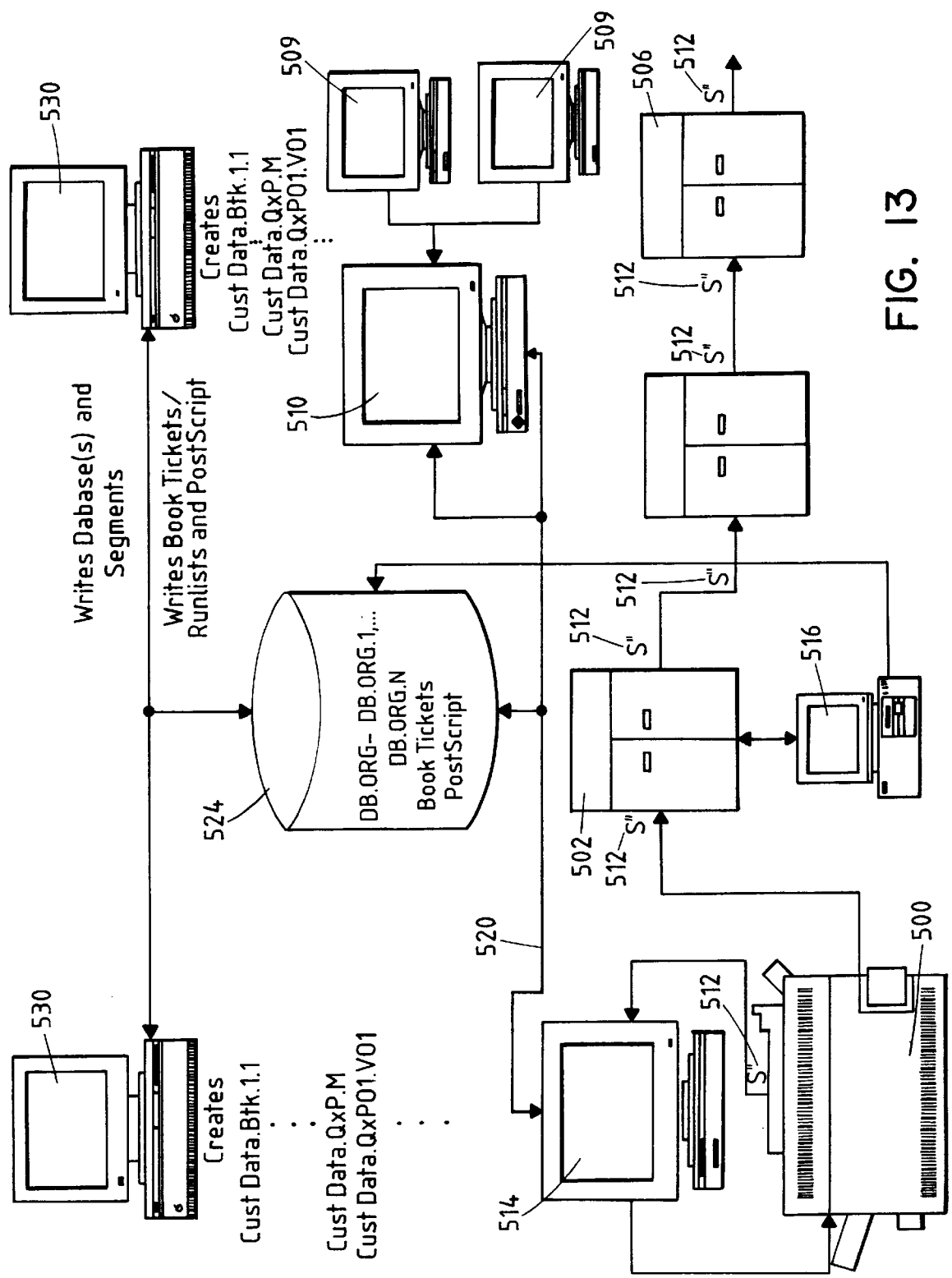
FIG. 13 is a schematic illustration of a reorder system constructed in accordance with the teachings of the invention.

A reorder system constructed in accordance with the teachings of the present invention is illustrated in FIG. 13. As explained in detail below, the disclosed reorder system is adapted for use with one or more demand printers 500 and one or more auxiliary finishing devices 502, 504, 506. For simplicity of illustration, only one exemplary press 500 and three downstream exemplary auxiliary devices 502, 504, 506 are shown in FIG. 13. One or more additional presses with one or more optional auxiliary devices can also be serviced by the system as illustrated by two additional press controllers 509, each of which is associated with a printing press, in FIG. 13.

In any event, the reorder system is preferably adapted for use with electronic printing presses operating in accordance with the method discussed above in connection with FIGS. 2–12. Although the following description is made in the context of employing such a method of producing books with variable and fixed data, persons of ordinary skill in the art will readily appreciate that the present invention is not limited thereto. Such persons will also appreciate that the present invention is not limited to use with any particular type of printing press or auxiliary device. On the contrary, the teachings of the present invention can be applied to any printing press and/or auxiliary device which could benefit from an automatic reordering system, regardless of the system(s) or method(s) used to drive those presses or devices.

As shown in FIG. 13, the disclosed reorder system preferably includes a global reorder processor 510, and sensors 512 (identified by the symbol S* in the drawing) selectively located to sense books that have been fouled or rendered defective by a serviced press 500 or auxiliary device 502, 504, 506. The global processor 510, preferably implemented by a personal computer such as a MICROSOFT® WINDOWS® based personal computer or SUN® Workstation, communicates with press controller(s) 509, 514 associated with each serviced printing press 500, and with device controllers 516, each of which is preferably associated with a particular one of the serviced auxiliary devices 502, 504, 506, via a local area network (LAN) 520. A centralized storage device 524 with an associated server (not shown) for controlling access to the storage device 524 is also preferably coupled to the LAN 520. As illustrated below, in some instances, communication between the various controllers 514, 516 and the global reorder processor 510 is conducted indirectly via changes to data stored in the storage device 524.

Since the reorder system is being disclosed in the context of printing presses operating the method of producing customized books discussed above, one or more set-up computers 530 are also shown networked to the central storage device 524 in FIG. 13. As explained above and discussed further below, these set-up computers 530 perform such functions as developing master page files, variable page files, and command files (hereinafter referred to as "book tickets") from a customer provided database. The files developed by these personal computers 530 are stored on the central storage device 524 for use by the press controller(s) 509, 514 and the reorder system.

Although in the preferred embodiment, the press controller(s) 509, 514 are implemented by SUN® Workstations, the device controllers 516 are implemented by MICROSOFT® WINDOWS® based personal computers, and the set-up computers 530 are implemented by APPLE® MACINTOSH® personal computers, persons of ordinary skill in the art will appreciate that other devices could likewise be utilized in these roles without departing from the scope of the invention. Similarly, it will be further appreciated that, although in the preferred embodiment, the central storage device 524 is implemented by SUN® Workstations, other devices could likewise be employed in this role without departing from the scope of the invention. In addition, it will be appreciated that, although in the preferred embodiments, the sensors 512 are implemented as bar code readers such as those commercially available from ACCUSORT®, under the tradename Model 20, the sensors could likewise be implemented by other devices such as electronic eyes on a positive position device or by optical recognition systems.

In any event, the above described system operates to identify errored books as they are output by the serviced presses 500 and/or as they are output by the auxiliary devices 502, 504, 506. Upon identification of errored books, the reorder system automatically reorders the reprinting of the book. Depending on the circumstances, the system can immediately reorder a book fouled by a printing press locally without involving the global processor 510; the book can be locally saved to be printed at the end of a particular segment; or the global reorder processor 510 can be employed to select an optimum printing press 500 and location in a stream of books for re-printing the fouled book. As explained below, the global reorder processor 510 preferably selects the press and stream location for reprinting to maximize postal rate discounts, but other criteria such as processor time needed to move the book to a new location can also form a basis for selecting the press and stream location for reprinting.

As used herein, the term "errored book" encompasses missing books, books missing one or more pages, or books fouled in any manner. As used herein the term "book" refers to bound books and/or one or more signatures prior to binding.

The operation of the reorder system illustrated in FIG. 13 will now be described in connection with FIGS. 14–23. In particular, preferred programmed steps for the various processors 509, 510, 514, 516, and 530 will be described via flowcharts. Persons of ordinary skill in the art will appreciate that, although for clarity of explanation, the steps are described as occurring in a particular time sequence, in use the operation of the disclosed reorder system will vary dynamically depending on the circumstances of the processed job.

Although for simplicity of discussion, the following description focuses on press controller 514, it will be appreciated that the functioning of the other press controllers 509 are identical to that of press controller 514.

Figure 14A:
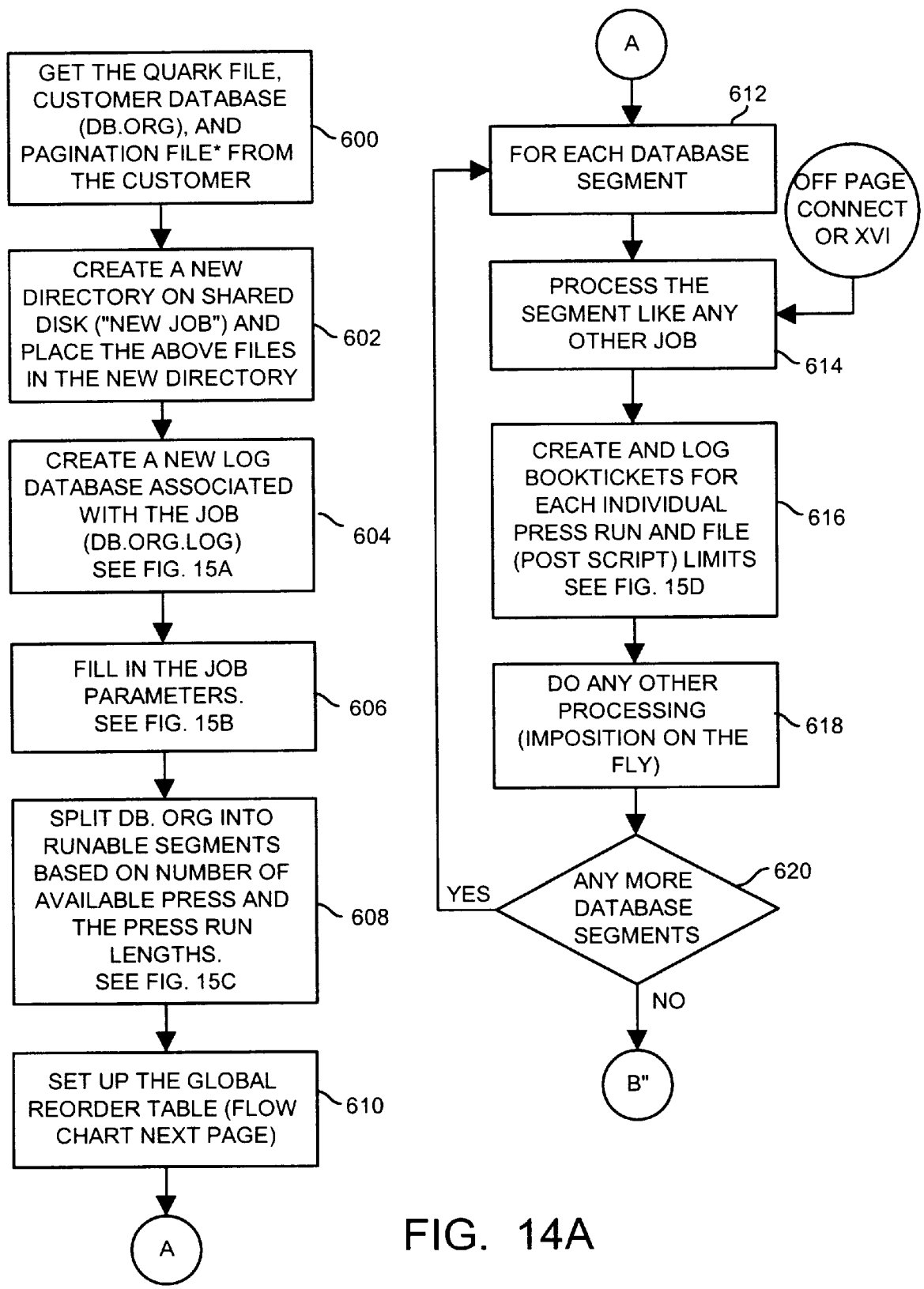
FIGS. 14a–14d are flow charts illustrating exemplary programmed steps performed by the set-up processors and press processors illustrated in FIG. 13.

In order to initiate a job (e.g., printing a plurality of books containing variable and fixed data such as sales brochures and/or health insurance booklets), a customer provides the printer with a QUARKXPRESS® file describing the page layouts, a database (with the filename "DB.ORG" in the instant example), and a pagination file, if specific page impositions are desired. The provision of this information is represented in FIG. 14*a* by block 600. In the following, it is assumed that the customer has provided a QUARKX-PRESS® file named "custData.Qxp" and a database file named "DB.ORG" containing 10,000 records and that the noted records are postal sorted to obtain optimal postal discounts. If the records are not sorted, a conventional sorting algorithm can be employed to obtain an appropriately sorted database before proceeding with the process discussed below. It is also assumed that 5 demand printing presses are available for printing the new job.

Figure 15A:

The customer provided information is then processed by one or more set-up processors 530 (depending on the size of the job). For simplicity of description, the following assumes one set-up processor 530 processes the job. As shown in FIG. 14*a*, the set-up processor 530 begins processing the job by creating a new directory on the central storage device 524 and placing the files received from the customer in the new directory (block 602). The set-up processor 530 then creates a new log database 534 associated with the job (block 604). This log database 534 preferably provides a map of the locations and status of various files associated with the job as explained further below. The log database 534, given the file name DB.ORG.LOG in this example, is saved on the central storage device 524. An exemplary format for the log database 534 is shown in FIG. 15*a*.

After the log database 534 is created on the central storage device 524, the set-up processor 530 begins filling the tables it contains with data as they prepare the job for printing. At block 606, the set-up processor 530 fills in the job parameters in the log database 534. As shown at the bottom of FIG. 15*b*, these parameters preferably comprise the QUARK® filename (e.g., CustData.Qxp) and the database name (e.g., DB.ORG) of the customer provided files.

The set-up processor 530 then splits the customer provided database DB. ORG into more manageable portions or runable segments (block 608). The number of segments developed by the set-up processor 530 is dependent upon the number of printing presses 500 available to print the job (in this example, five presses), the press run lengths, and other production variables. For small jobs, no segmentation is normally required. In this example, it is assumed that the set-up processor 534 splits DB.ORG into five segments (e.g., DB.ORG.1, DB.ORG.2, DB.ORG.3, DB.ORG.4, and DB.ORG.5) of equal size. Each of the segments are stored in a separate file on the central storage device 524. As shown in FIG. 15*c*, the set-up processor 530 fills in the log database 534 with a segment identification number, the starting and ending records, and the filename of each segment for the job.

Figure 16:
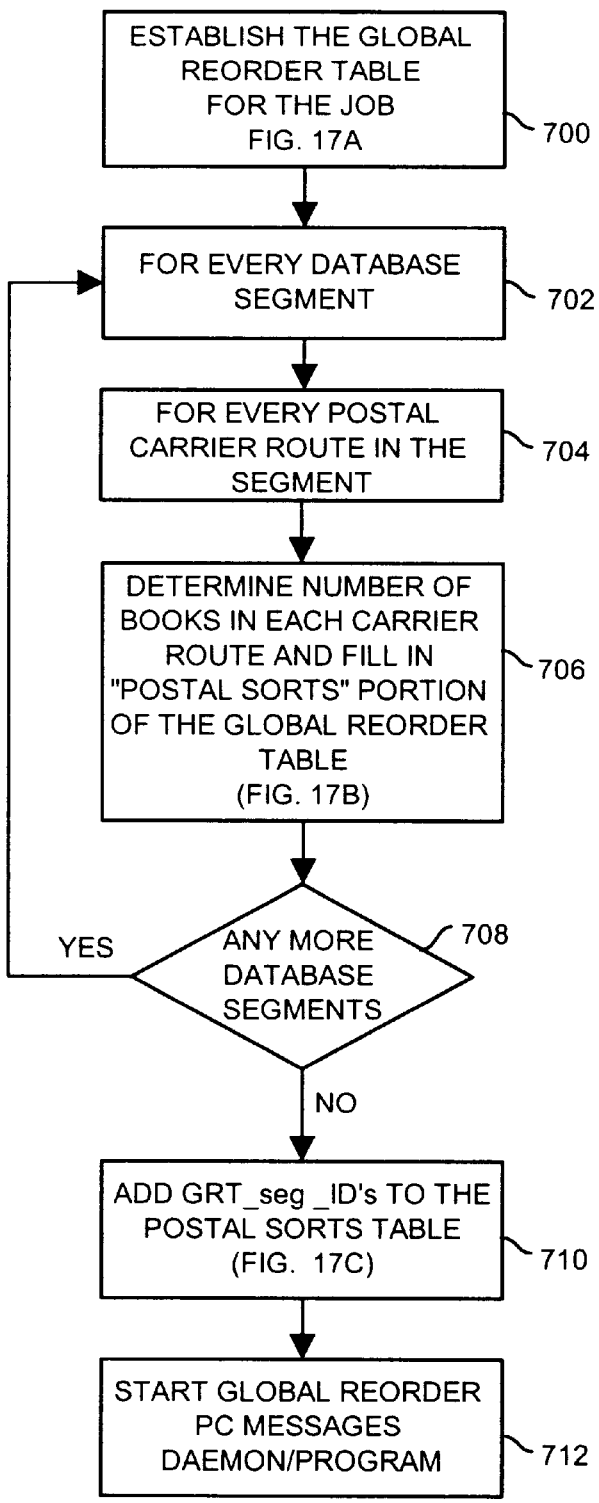
FIG. 16 is a flow chart illustrating exemplary programmed steps for preparing a global reorder table.

At block 610, the set-up processor 530 calls a routine for preparing a global reorder table 540 to be used by the reorder system to manage certain reordering functions as explained below. Turning to FIG. 16, the set-up processor 530 initiates the routine by creating a new global reorder table 540 which it stores on the central storage device 524 (block 700). As explained in detail below, some of the fields of the global reorder table 540 are filled in dynamically as the job progresses to provide information for reordering errored books and for computing postal manifestations. An exemplary global reorder table 540 is shown in FIG. 17*a*.

At block 702, the set-up processor 530 enters a nested loop (blocks 702–708) wherein, for every database segment (DB.ORG.1, DB.ORG.2, etc.) of the database (DB.ORG), the set-up processor 530 develops a sorted list of sub-jobs by postal carrier route. This list is entered into the postal sorts portion 541 of the global reorder table 540. For example, as shown in FIG. 17b, the first database segment DB.ORG.1 has a number of books being sent to the 60610 area code. At block 704, the set-up processor 530 determines that 10 books are being sent to carrier route 12 in area code 60610. At block 706, the set-up processor 530 stores that information in the postal sort portion 541 of the global reorder table 540. As shown in FIG. 17b, the set-up processor enters the database name (DB.ORG.1), the zip code (60610), the carrier route (12), the job parameters in a bit encoded format identifying job processing factors (such as paper size, paper type, finishing mechanisms required, toner, ink, cover stock, and any other preprinted stock), the number of books to be sent to the carrier route in question (ten books to CR12 in this example), and sets a done flag to "False" to indicate that this sub-job has not yet been printed. At block 708, the set-up processor 530 determines whether the postal sorts portion 541 of the global reorder table 540 has been completed for every segment of the database. If not, control returns to block 702. Otherwise, control proceeds to block 710.

If desired, nested loop 702–708 can be provided with another loop layer wherein the set-up processor 530 performs steps 702–708 for more than one database. Such an approach would be desirable in co-mailing applications where two or more databases representing two or more different jobs, possibly from different customers, are combined and printed simultaneously to improve postal discounts for all of the processed jobs. Optionally, a further field could be added to the global reorder table identifying the type of attachments for fulfillment on the fly applications where an attachment or enclosure such as a product sample or preprinted enclosure is added to printed books.

Returning to FIG. 16, after block 708, the set-up processor 530 assigns an identification number GRT_Seg_ID (global reorder table segment identification) to each sub-job and stores the assigned numbers in the postal sorts portion 541 of the global reorder table as shown in FIG. 17c (block 710).

At block 712, the global reorder processor 510 is notified of the upcoming job by the set-up processor 530. The global reorder processor 510 then starts a messages daemon or background program explained in further detail below. Control then returns to block 612 in FIG. 14a.

The set-up processor 530 then enters a loop (blocks 612–620) wherein each segment (DB.ORG.1, DB.ORG.2, etc.) is processed according to the method described above in connection with FIGS. 2–12. These processing steps are compactly illustrated by block 614. After the command files (also referred to herein as "book tickets") identified by reference numeral 140 in FIG. 5 are created, the book tickets are logged in the log database 534 (DB.ORG.LOG). As shown in FIG. 15d by reference numeral 544, the master and variable files created at block 614 are also stored in the log database 534. For example, the filenames of one master file (CustData.Qxp.M) and 4 variable files (CustData.Qxp.01.V01, CustData.Qxp.01.V02, CustData.Qxp.01.V03, and CustData.Qxp.01.V04) are added to the log 534. For ease of reference, each of these filenames is assigned a file identification number as shown in FIG. 15d.

As shown in FIG. 15d by reference numeral 546, each book ticket is assigned at least a portion of a segment of a database. In the instant example, ten book tickets have been created and logged, and each book ticket has been assigned 1000 records (one-half of a segment in this example). As shown in FIG. 15d, each book ticket is assigned an identification number. The records associated with the book ticket and the segment in which those records are contained are also logged in the log database 534.

A map 542 showing which files (by file identification number) are employed by which book ticket is also logged in the log database 534 at block 616.

At block 618, the set-up processor performs any additional processing required by the job in question. For example, the optional imposition processing discussed above in connection with blocks 124 and 139 of FIG. 5 would be performed at this block 618.

At block 620, the set-up processor determines whether all of the segments of the job have been processed. If not, control returns to block 612. When all of the segments have been processed, the set-up processor 530 is finished with the job. All necessary files for printing the job are saved on the central storage device 524 where they can be accessed by any of the presses 500 in the system.

Figure 14B:
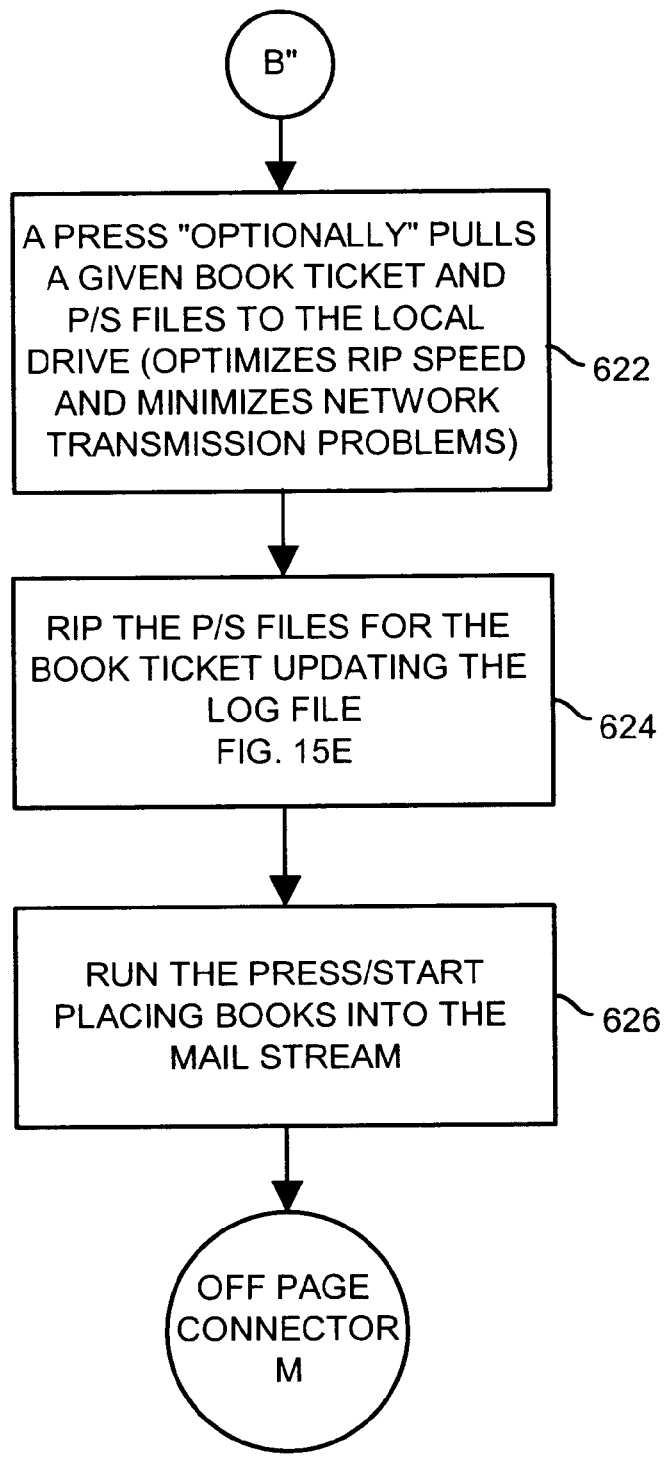

Upon receipt of a command to initiate the printing process from a press operator, the press processor or controller 514 pulls copies of a book ticket, its associated Postscripts files, and other production files from the central database 524 to its local memory such as a hard drive (block 622) (See FIG. 14b). The book ticket pulled is identified by the press operator. At block 624, the press controller 514 raster image processes (RIPs) the files as explained above. The press processor 514 logs these events in the log database 534. As shown in FIG. 15e at reference numeral 548, the press processor 514 logs the identification number (File_ID) of the processed file, the press number of the controller performing the process (Press_Num) and the time and date at which the process was performed (Rip Time). After completion of the job, the time and date on which the RIP files are deleted from the local drive will also be logged to enable efficient determination of the presence of a raster image processed file when reordering errored books as explained below. A RIP log identification number (ID) is also assigned to each file identified in the RIP log for ease of identification.

Persons of ordinary skill in the art will appreciate that, although in the preferred embodiment, the book tickets and their associated files are transferred to the local storage device of the processing press controller 514 for raster imaging processing, the files could also be processed without storing to the local drives without departing from the scope or spirit of the invention. However, it is preferred that the files be transferred to the local drives in order to minimize network transmission problems and to optimize RIP speed.

At block 626, after all necessary files for the subject job have been raster image processed, the press controller 514 runs the press 500 such that the press begins printing books which are placed into the mailstream.

At block 628 (FIG. 14c), the local press processor 514 initializes a control flag referred to as the global reorder flag to false. Any other necessary housekeeping tasks are also performed at block 628.

At block 630, the local processor 514 determines whether any unprinted books remain in the book ticket. If there are no remaining books, the press processor 514 determines whether the global reorder flag is set to false. If the global reorder flag is false and there are no remaining books, the job is finished and control passes to block 631.

Assuming for the moment that a new job is beginning, when control proceeds to block 630 there are books remaining to be printed. Therefore, control passes to blocks 632 and 634 where, for every book output by the press 500, the press controller 514 checks the output of the sensor 512. Based on the output of sensor 512, the press controller 514 determines whether the sensed book is errored (block 636).

Assuming for the moment that the first printed book is not bad, control passes to block 638. If the immediate reorder system is not enabled on this particular press 500, control passes from block 638 to block 630. The press controller 514 then continues looping through blocks 630, 632, 634, 636, and 638 until a bad book is detected at block 636. When a bad book is detected, the press processor 514 proceeds to block 640. Since, in this example, the immediate reorder system is not enabled, control passes to block 642 where the errored book is identified in a local reorder table. The local reorder table is located on the local storage device of the press controller 514, and is not accessible to the rest of the system. The local reorder table can be stored on a disk drive or in random access memory. Preferably, the errored book is uniquely identified in the reorder table by record number to enable reprinting. Preferably, the corresponding record numbers are printed on each book in bar code format to facilitate the identification process.

In any event, after updating the local reorder table, control passes back to block 630. The local processor then continues to loop through blocks 630–642 adding any errored books to the local reorder table until the job is completed.

Figure 19:
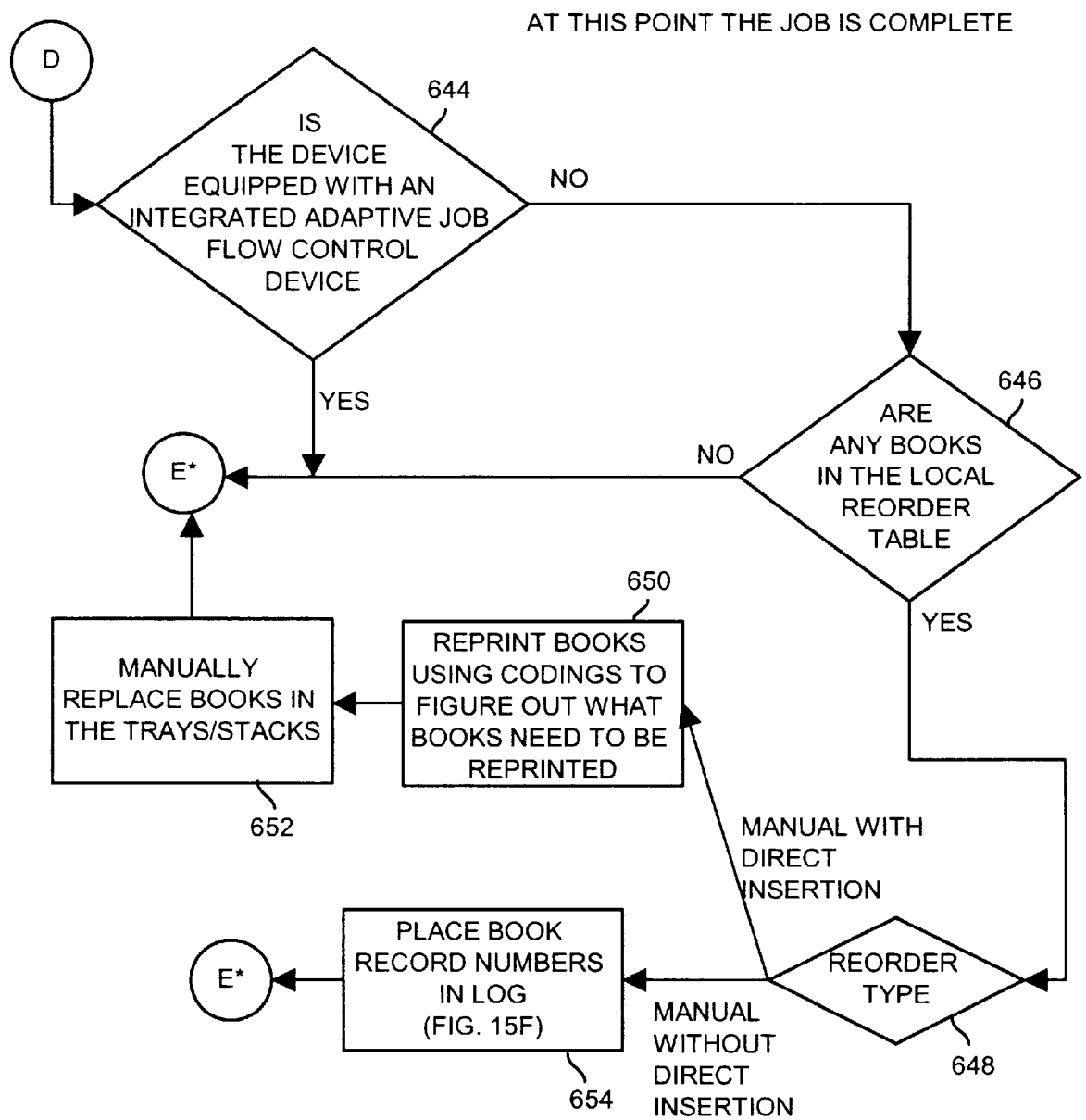
FIG. 19 is a flow chart illustrating exemplary programmed steps performed by the press processors shown in FIG. 13 at the completion of a job.

Turning to FIG. 19, when the job is completed, if, as it is assumed here, it is determined at block 644 that the immediate reorder system is not enabled, control proceeds to block 646. If the device is equipped with an enabled immediate reorder system, or, if it is determined at block 646 that there are no books in the local reorder table, the local print job is finished and the printed books can be advanced to the auxiliary unit(s) for finishing. If, however, there are books in the local reorder table, control passes to block 648. At block 648, the press operator has two options for proceeding with the job. In a first option, the operator instructs the press controller 514 to cause the press 500 to reprint the books locally using the record numbers stored in the local reorder table (block 650). Under this first option, the operator would then position the reprinted books in the appropriate locations in the trays of printed books (block 652) such that a complete stream of books is available for finishing as if no books had been errored.

Under the second option, the press operator instructs the press controller 514 to log the record number of the errored books in the log database 534 reorder table 550 (block 654). The manner in which these errored books are processed is discussed below in connection with FIG. 20. The entry of the book record numbers is shown at reference numeral 550 in FIG. 15*f*.

As mentioned above, the reorder system can be optionally disabled by a press operator via the press controller 514. The press operator might wish to disable the system in small jobs where no other presses 500 are used to print books for the job. Nonetheless, in the preferred embodiment, the reorder system is enabled and functions as described below.

Figure 14C:
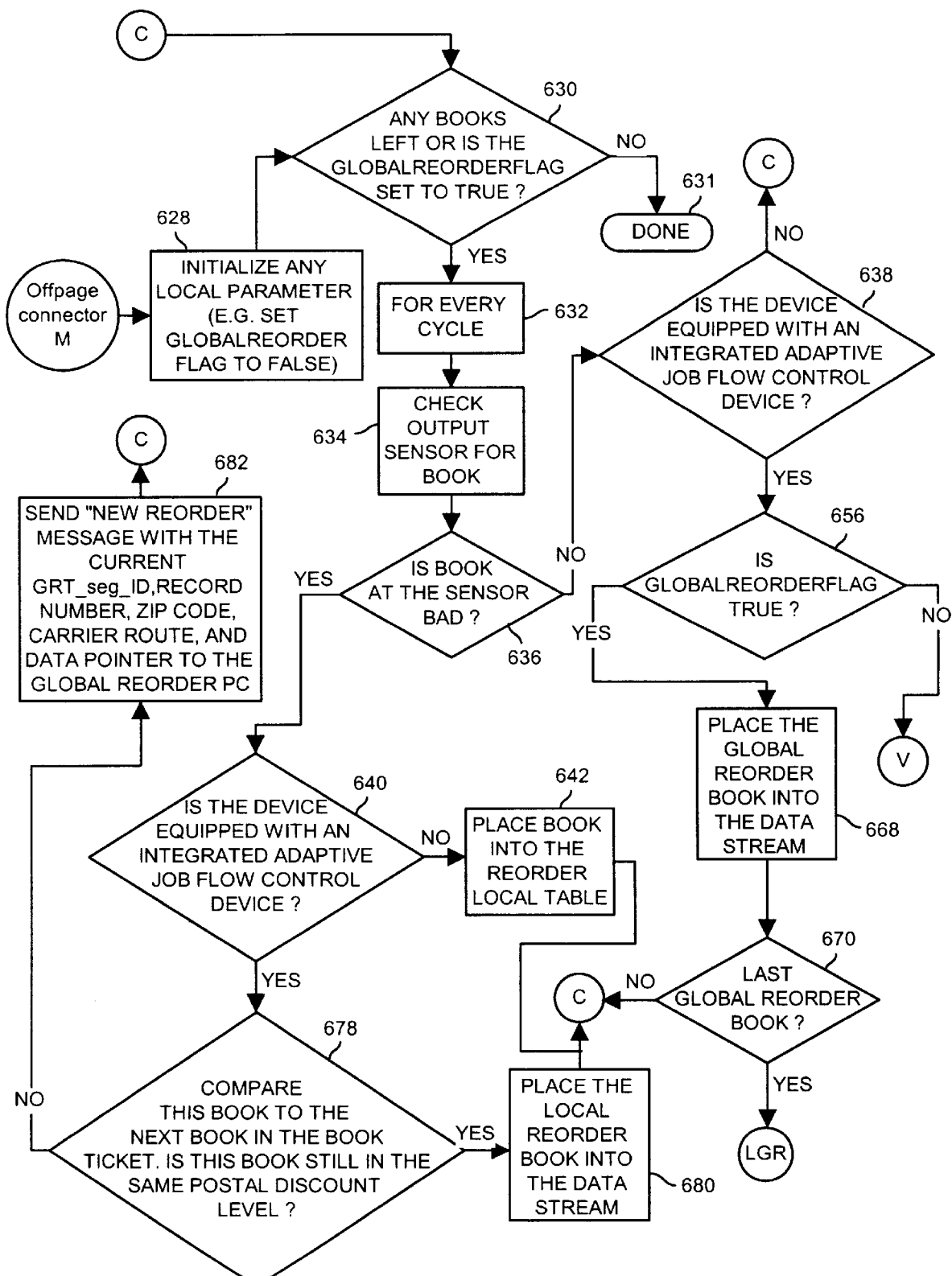
Figure 14D:
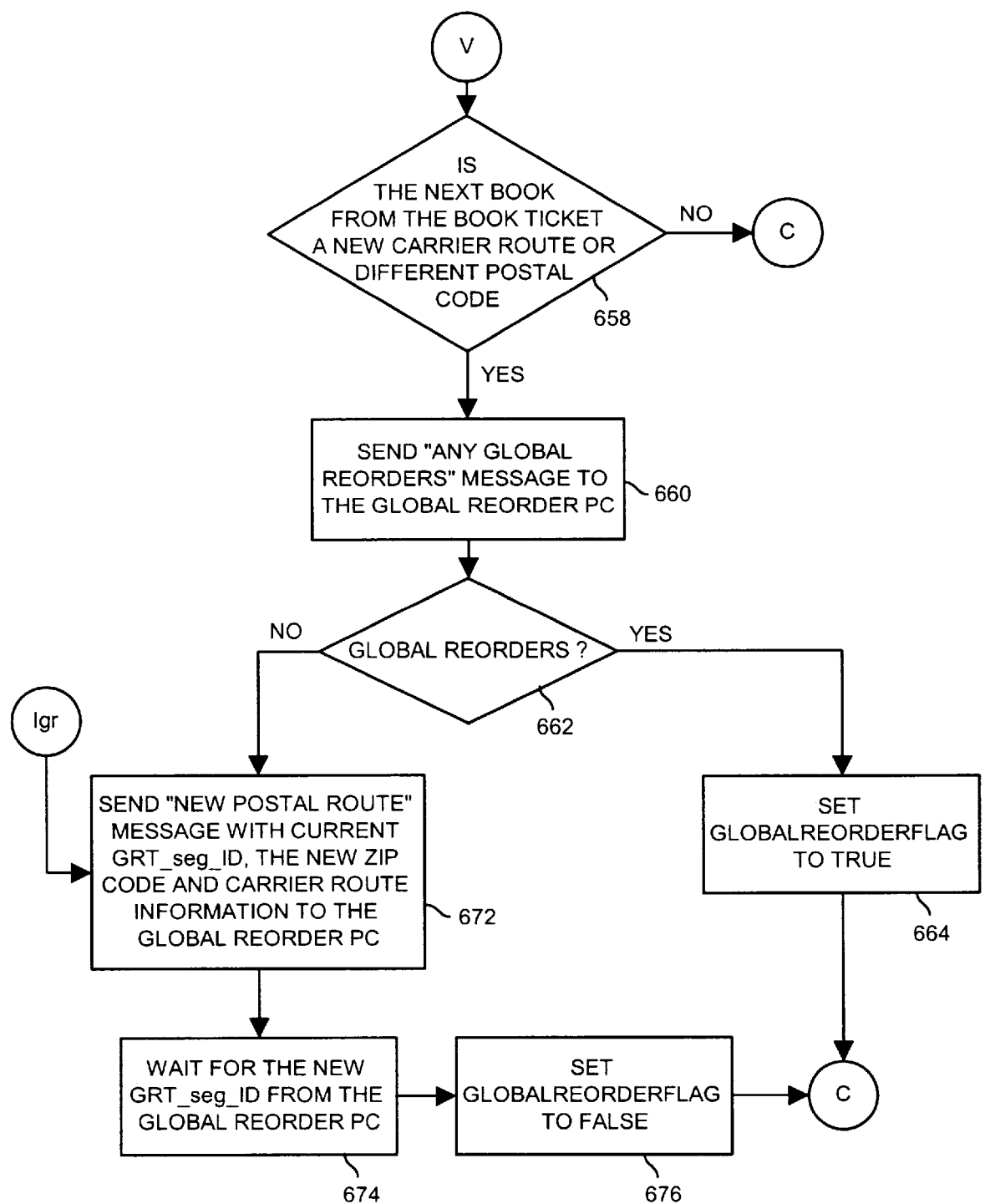

Returning to block 638 of FIG. 14*c*, and assuming now that the immediate reorder system has been enabled, control passes to block 656. Since in the instant example it is assumed that the first book identified in the book ticket has just been printed without error, the global reorder flag will not be set to true. Accordingly, control passes to block 658 (FIG. 14*d*).

At block 658 (FIG. 14*d*), the press controller 514 determines whether the next book in the book ticket (i.e., the next book to be printed by the press) is to be addressed to a new carrier route or different postal code (e.g., different 5-digit zip code, different 3-digit zip code, or different state). If not, control returns to block 630 and the press processor 514 continues looping through blocks 630–638 and blocks 656–658 until an errored book is detected at block 636 or a carrier route or postal code change is identified at block 658.

Assuming for the moment that the next book to be printed is directed to a different carrier route than the current book, control passes from block 658 to block 660. At block 660, the local processor 514 sends a request for any global reorders via the LAN 520 to the global reorder processor 510. The request from the press processor 514 identifies the sub-job number (i.e., GRT_Seg_ID) to the global processor 510. The local processor 514 then awaits a reply to its request.

As mentioned above in connection with block 712 of FIG. 16, the global processor 510 is programmed to run a messages daemon. That program is illustrated by the flow charts shown in FIGS. 18*a*–18*g*.

Figure 18A:
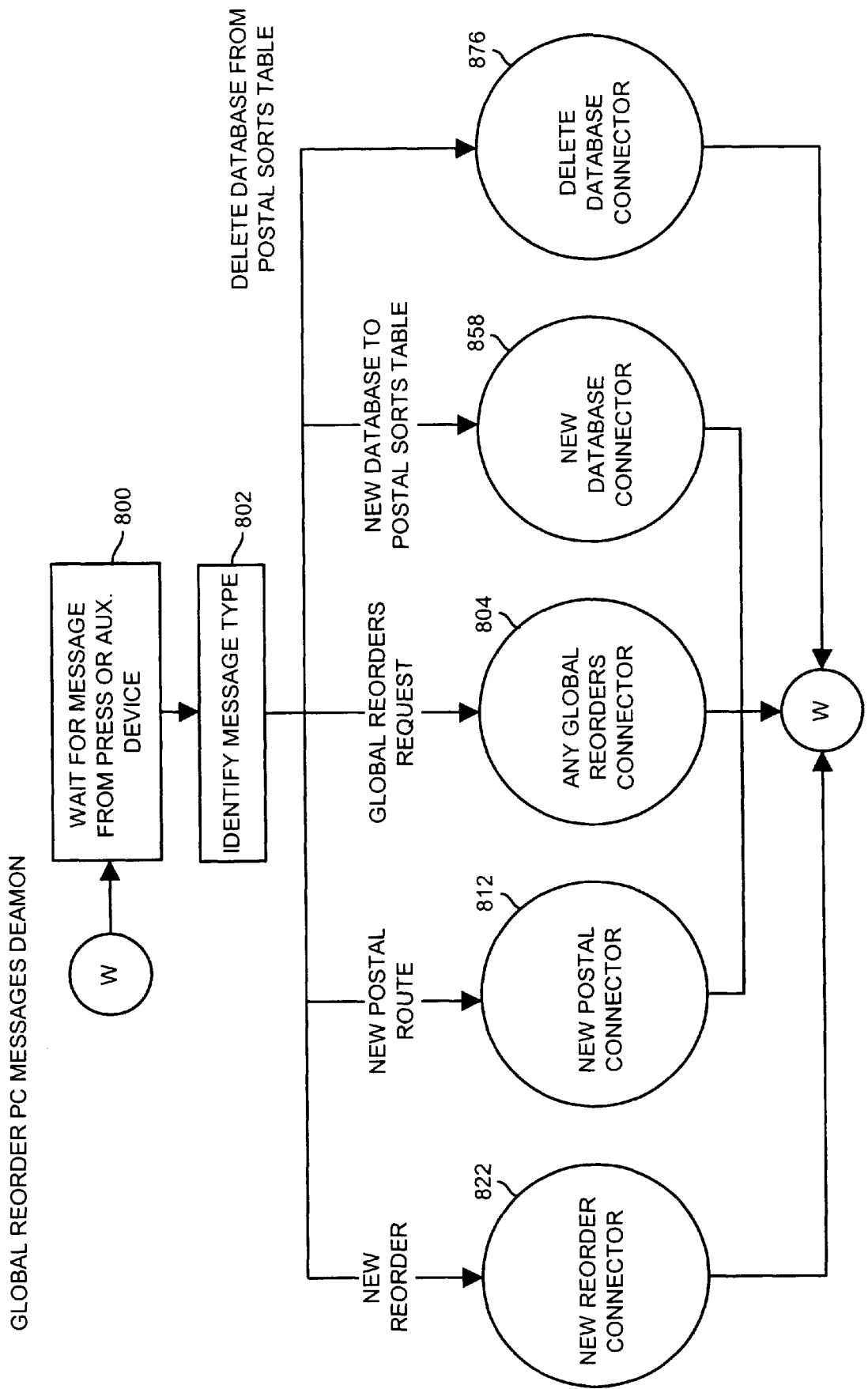
FIGS. 18a–18g are flow charts illustrating exemplary programmed steps performed by the global reorder processor of FIG. 13.

Turning to FIG. 18*a*, at block 800, the global processor 510 waits to receive a message via the LAN 520. Upon receiving a message, control proceeds to block 802 where the global processor 510 identifies the type of message received. In this instance, the global processor 510 has received a global reorder request from the local press controller 514 and, thus, at block 804 it calls the "Any Global Reorders" routine.

Figure 18B:
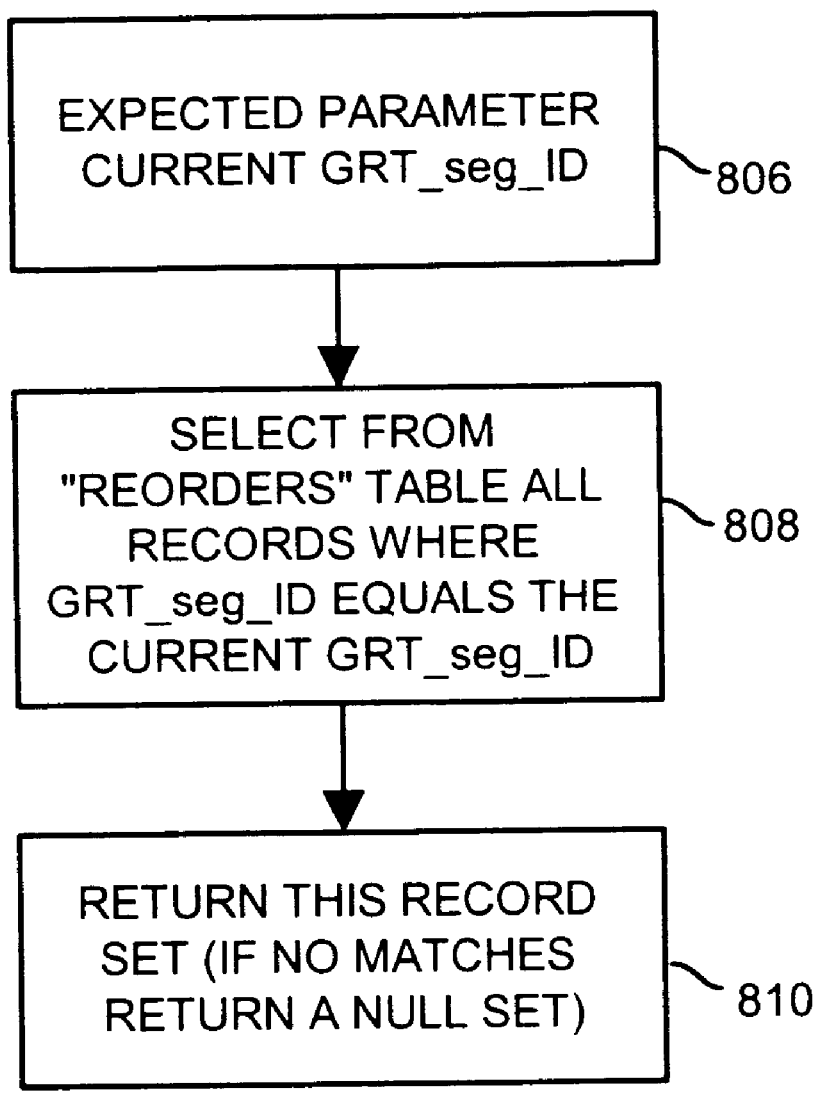

Turning to FIG. 18*b*, at block 806, the global processor 510 identifies the current sub-job based on the GRT_Seg_ID value received from the local processor 514. At block 808, the global processor 510 searches the postal sorts portion 541 of the global reorder table 540 (see FIG. 17*b*) to determine if any reorder books have been assigned to the current sub-job. Such reorder books could have been errored by one of the other demand printers in the system or been fouled by an auxiliary device 502, 504, 506 in the system. Regardless of the source of the errored book(s), if any such book(s) are identified, the files necessary to reprint the errored books, already raster image processed, are downloaded to the requesting local processor 514 (block 810). In the case that the local processor 514 was the requesting processor, only press commands would be transferred. If no reorder books are scheduled for the sub-job, the global processor 510 so notifies the requesting local processor 514 (block 810).

Returning to FIG. 14*d* and assuming that the global processor 510 has returned a global reorder book, the local press controller 514 proceeds from block 662 to block 664 where it sets the global reorder flag to true. Control then returns to blocks 630–636 (FIG. 14*c*). Assuming for the moment that the next serviced book is not bad (block 636), control proceeds to block 656 via block 638. At block 656, the press processor 514 notes that the global reorder flag is set and, therefore, proceeds to block 668 where the global reorder book received from the global processor 510 is put into the datastream. Assuming no errored books are detected at block 636, the loop comprising blocks 630–638, 656 and 668–670 is repeated until the last reorder book received from the global processor 510 has been put into the datastream (block 670).

Upon placement of the last global reorder book into the datastream (block 670) or if no global reorders are received back from the global processor 510 at block 662, control passes to block 672. At block 672, the press processor 514 sends a "new postal route" message to the global processor 510 via LAN 520. The new postal route message notifies the global processor 510 that the press 500 has completed a sub-job and is moving to the next sub-job. The new postal route message preferably includes the current GRT_Seg_ID (i.e., an identification of the sub-job just completed), the new zip code, and the new carrier route of the next sub-job. After sending this message, the local press processor 514 advances to block 674 where it waits for a new GRT_Seg_

ID from the global processor 510. The new GRT_Seg_ID will be used for identifying the new sub-job in future communications with the global processor 510.

Returning to FIG. 18a, upon identifying the message from the press processor 514 as a new postal route message (block 802), the global reorder processor 510 calls the new postal connector routine (block 812).

Figure 18C:
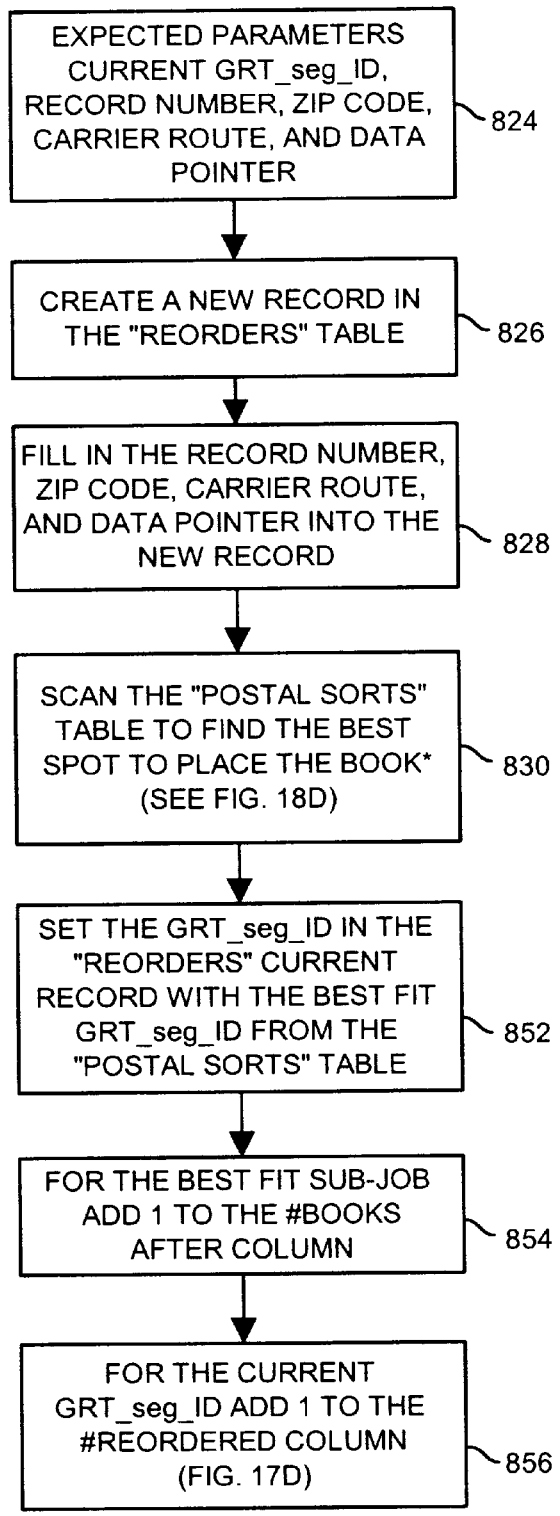
Figure 18D:
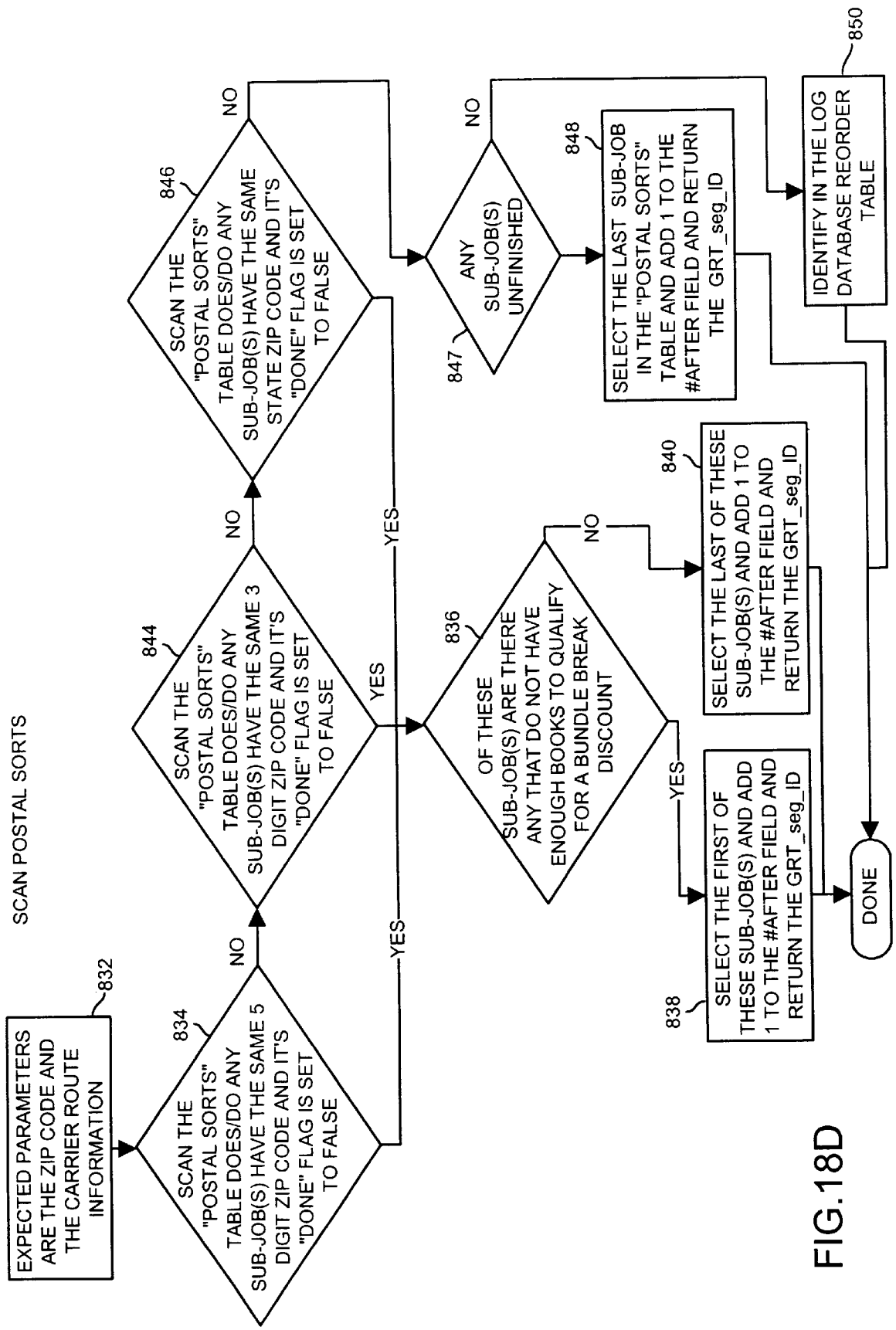
Figure 18E:
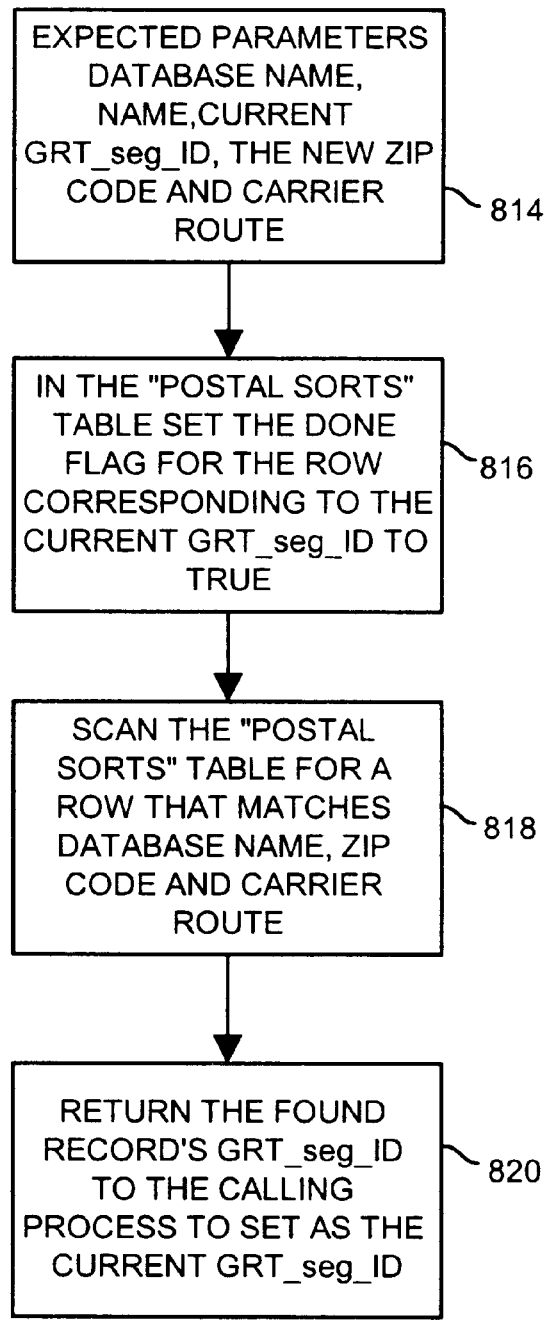
Figure 18F:
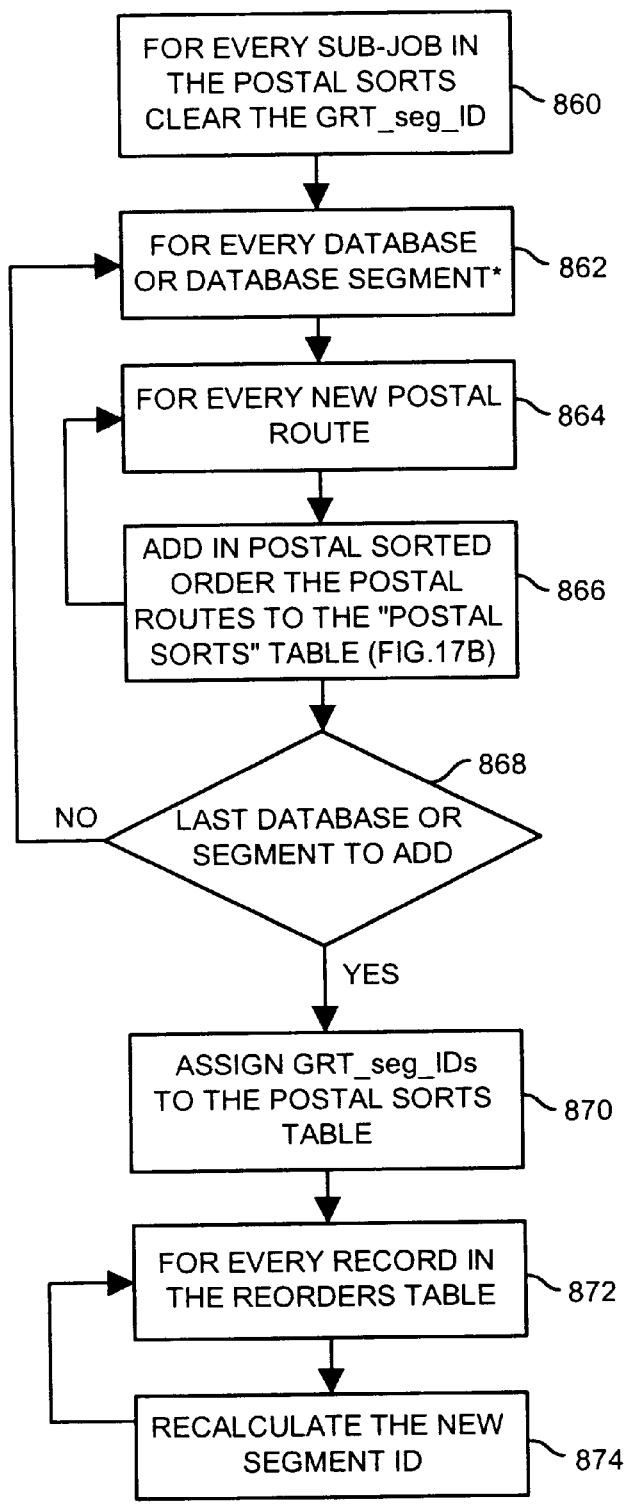

Turning to FIG. 18e, the global reorder processor 510 first identifies the expected parameters in the message received from the press processor 514, namely, the database name (e.g., DB.ORG.1), the current GRT_Seg_ID, the new zip code and the carrier route (block 814). At block 816, the global processor 510 accesses the postal sorts portion 541 of the global reorder table 540 and sets the "Done" flag (see FIG. 17c) for the row corresponding to the current GRT_Seg_ID to "true". The global reorder processor 510 then scans the postal sorts portion 541 of the global reorder table for a row that matches the database name, the new zip code and the new carrier route (block 818). Once such a matching row (i.e., sub-job) is found, the GRT_Seg_ID of the matching row is returned to the calling local press processor 514 by the global processor 510 (step 820).

Returning to FIG. 14d, upon receiving the new GRT_Seg_ID, the press processor 514 advances to block 676 where it sets the global reorder flag to "false" before returning to block 630.

Assuming for the moment that a bad book is detected at block 636, and that the immediate reorder system is enabled (block 640), the local processor 514 advances to block 678. At block 678, the local processor 514 compares the errored book to the next book to be printed. If that comparison indicates that reprinting the book immediately will place the errored book into the same postal discount it would have obtained had no error occurred without re-sorting, control advances to block 680. The errored book is then immediately inserted into the datastream for immediate reprinting (block 680) and control returns to block 630.

If, at block 678, it is determined that reprinting immediately will not entitle the errored book to the same postal discount it would have achieved had it not been for the error without re-sorting, control shifts to block 682. At block 682, the local controller 514 sends a "new reorder" message to the global reorder processor 510. The new reorder message includes the current GRT_Seg_ID, the record number of the errored book, the current zip code, the current carrier route, and a data pointer, to the global reorder processor 510. The data pointer comprises a path name identifying where the raster image processed files for reprinting the book are stored, thereby enabling movement of the reorder to another press without requiring further raster image processing of the errored book. After sending the new reorder message, control advances to block 630.

The local processor 514 continues looping through the flowcharts illustrated in FIGS. 14c and 14d, immediately reordering errored books where appropriate (blocks 678 and 680); sending new reorder messages to the global reorder processor 510 when necessary (blocks 678 and 682); requesting global reorders after every good book that represents the end of a carrier route or change in the postal code when no global reorders are pending in the local queue (i.e., the global reorder flag is false) (blocks 636, 656, 658, and 660); and obtaining new GRT_Seg_IDs from the global reorder processor whenever a sub-job is completed (block 674) until the press controller 514 determines that the last book in the book ticket and the last global reorder book sent from the global reorder processor 510 have been printed (block 630). At such a point, control advances to block 631, and the local processor 514 waits for an operator command to pull a new book ticket to restart the process, or to call the process outlined in FIG. 19 and discussed above.

Turning back to FIG. 18a, when the global reorder processor 510 identifies a new reorder message (block 802), which can be from a press processor 514 or a device controller 516 for an auxiliary finishing device, it calls the new reorder routine (block 822) shown in FIG. 18c. After receiving the expected parameters (e.g., current GRT_Seg_ID, record number, current zip code, current carrier route, and the data pointer) from the calling local processor 514, 516 (block 824), the global reorder processor 510 creates a new record in the "reorders" portion 555 of the global reorders table 540 (block 826). At block 828, the global reorder processor 510 enters the parameters received in the new order message into the reorders portion 555. (See FIG. 17d.) The global reorder processor 510 then scans the postal sorts portion 541 of table 540 to find the best place to fit the reordered book (block 830).

A best fit for book placement and queueing routine is described in full in Wong, U.S. Pat. No. 4,500,083, and Wong, U.S. Pat. No. 4,674,052, both of which are hereby incorporated hereby by reference. Nonetheless, a preferred best fit sorting routine will now be described in connection with FIG. 18d for completeness. Persons of ordinary skill in the art will appreciate that this routine will require minor modifications from time to time to reflect changes in postal regulations.

After identifying the zip code and carrier route information (block 832), the global reorder processor 510 scans the postal sorts portion 541 of the global reorder table 540 for any sub-jobs which have the same 5-digit zip code as the reorder record and whose "Done" flag is set to false (block 834). If one or more such sub-jobs are found, the global reorder processor 510 determines whether any of the sub-job(s) identified at block 834 do not have enough books to qualify for a bundle break discount (block 836). More specifically, the postal office additional discounts to books sorted into bundles within a predefined area (e.g., 5-digit zip code, 3-digit zip code, 1-digit zip code) wherein the number of books in a bundle are above a predefined number, such as ten for bundles sorted by 5-digit zip code. Block 836 attempts to locate any bundle having fewer books than the predefined threshold number for the postal category in question. Referring to FIG. 17d, the global reorder processor 510 makes this determination by calculating the number of books per bundle originally assigned to the sub-job in question (e.g., the "# Book Bundle" category), subtracting any books that were reordered outside the sub-job (e.g., errored books sent to the global reorder processor for reprocessing and not reassigned to be printed in the same sub-job), and adding any global reorder books downloaded by the global reorder processor 510 and processed with the sub-job (e.g., the number of books printed in a sub-job pursuant to a request for global reorders (block 660 in FIG. 14d)). By way of three examples, GRT_Seg_ID 1 in FIG. 17d has 9 books in its bundle (i.e., 10−1+0=9); GRT_Seg_ID 2 in FIG. 17d has 10 books in its bundle (i.e., 10−0+0=10); and GRT_seg_ID 3 in FIG. 17d has 12 books in its bundle (i.e., 11−0+1=12).

After making the noted book bundle calculation, the number of books in the bundles of the sub-job(s) identified in block 834 are then compared to the U.S. postal regulation for the class of mail being produced (block 836). If any of the identified sub-groups do not have enough books to qualify for a bundle book discount, the global reorder processor 510 selects the first such sub-job, and adds one to its "# After" field in the postal sorts portion 541 of the reorder table 540 (block 838). If all of the identified sub-job(s) qualify for a book bundle discount (block 836), control proceeds to block 840, where the last sub-job is assigned the reorder job by adding one to its "# After" field. Upon completion of blocks 838 or 840, control proceeds to block 852 in FIG. 18c.

Assuming for the moment that no sub-job(s) with 5-digit zip code matches or true "Done" flags are identified at block 834, control passes to block 844. At block 844, the global reorder processor 510 searches the postal sorts portion 541 of the global reorder table 540 for sub-jobs with the same first three zip code digits as the reorder book in question and whose "Done" flag is set to false. If any such sub-job(s) are found, the global reorder processor 510 proceeds to blocks 836, 838 and/or 840 as described above. Otherwise, control proceeds to block 846.

Similarly to blocks 834 and 844, at block 846 the global reorder processor 510 scans the postal sorts portion 541 of the global reorder table 540 for sub-job(s) having the same state zip code (i.e., same first digit) and having a false "Done" flag. If any such sub-job(s) are identified, control advances to blocks 836, 838, and/or 840 as described above. If no such sub-jobs are identified, the reorder is added to the last sub-job with a false-done flag (block 848), or, if all sub-jobs are finished (block 847), the reorder is added to the reorder table 550 in the log database 534 (block 850) (see FIG. 15f).

Upon returning to block 852 (FIG. 18c), the global reorder processor 510 sets the GRT_Seg_ID parameter in the reorders portion 555 of the global reorder table 540 to the GRT_Seg_ID value of the matching sub-job identified via the blocks shown in FIG. 18d. The global processor 510 then updates the postal sorts portion 541 of the global reorder table 540 (see FIG. 17d) by adding one to the "# Books After" column of the sub-job assigned the reorder. (block 854) Thus, when the press 500 and controller 514 processing the sub-job assigned the reorder sends a message requesting global reorders to the global reorder processor 510 (block 660 in FIG. 14d), the global reorder processor 510 addresses the reorder portion 555 of the global reorder table for reorders with a matching GRT_Seg_ID, and downloads the pointer to data parameter (e.g., a pathname) to the local processor 514 to initiate the reorder (blocks 808 and 810 in FIG. 18b).

At block 856 in FIG. 18c, the global reorder processor 510 adds one to the "# Reordered" column of the sub-job sending the new reorder message. In the example shown in FIG. 17d, the global processor 510 has received a new order request message from the local processor 514 processing the sub-job with GRT_Seg_ID 1; has identified the sub-job assigned GRT_Seg_ID 3 as an appropriate fit; has added one to the "# Reordered" column for sub-job GRT_Seg_ID 1; and has added one to the "# After" column of GRT_Seg_ID 3.

Although not explicitly shown in the drawings, in selecting a sub-job for reprinting an errored book, the global reorder processor 510 also considers the bit encoded values in the "Job Params" column of the postal sorts table 541 (see FIG. 17d). As discussed above, these parameter values specify physical specifications for printing the book such as paper size. The global reorder processor 510 will preferably only assign the errored book to a sub-job having the same parameters for reprinting to ensure the book is properly printed.

On occasion it may be necessary to add a new database to the system. Such an event can occur when a customer decides to add further books to an earlier order under process, or if it is desirable to co-process and co-mail a second job with a preexisting job. In any event, after the new database is processed in accordance with blocks 600–608, and blocks 612–620 of FIG. 14a, the setup computer 530 causes a "new database" message to be sent to the global reorder processor 510. Turning to FIG. 18a, upon identifying a new database message (block 802), the global reorder processor 510 calls a new database routine (block 858) shown in FIG. 18f.

The global reorder processor 510 begins the new database routine by clearing the GRT_Seg_ID value for every sub-job in the postal sorts portion 541 of the global reorder table 540 (block 860). The processor 510 then enters a nested loop (blocks 862–868) wherein all of the sub-jobs from the new database and all of the sub-jobs from the preexisting job are sorted in postal sort order. Blocks 862–868 are substantially identical to blocks 702–710. Accordingly, for brevity, the description of this nested loop will not be repeated here.

After sorting the postal sorts portion 541 of the global reorder table 540 to include all of the sub-jobs from the new database and the preexisting job, the global reorder processor 510 assigns new GRT_Seg_ID values to each of the sub-jobs in the postal sorts table 541 (block 870). The global reorder processor 510 then re-calculates a new GRT_Seg_ID value for every record in the reorders portion 555 of the global reorders table 540 (blocks 872 and 874). This re-calculation is performed in accordance with blocks 830–856 shown in FIGS. 18c and 18d to ensure that each pending reorder is processed to maximize postal discounts.

In some instances, it may be necessary to delete a database from the global reorder table 540. Such an occasion can arise, for example, when a customer changes its mind concerning a job and decides to not proceed with a mailing that has already been received by the printer. In such an instance, a "delete database" message will be developed by the set-up processor 530. When the global reorder processor 510 identifies a delete database message (block 802 of FIG. 18a), it will call the delete database routine (block 876) shown in FIG. 18g.

Figure 18G:
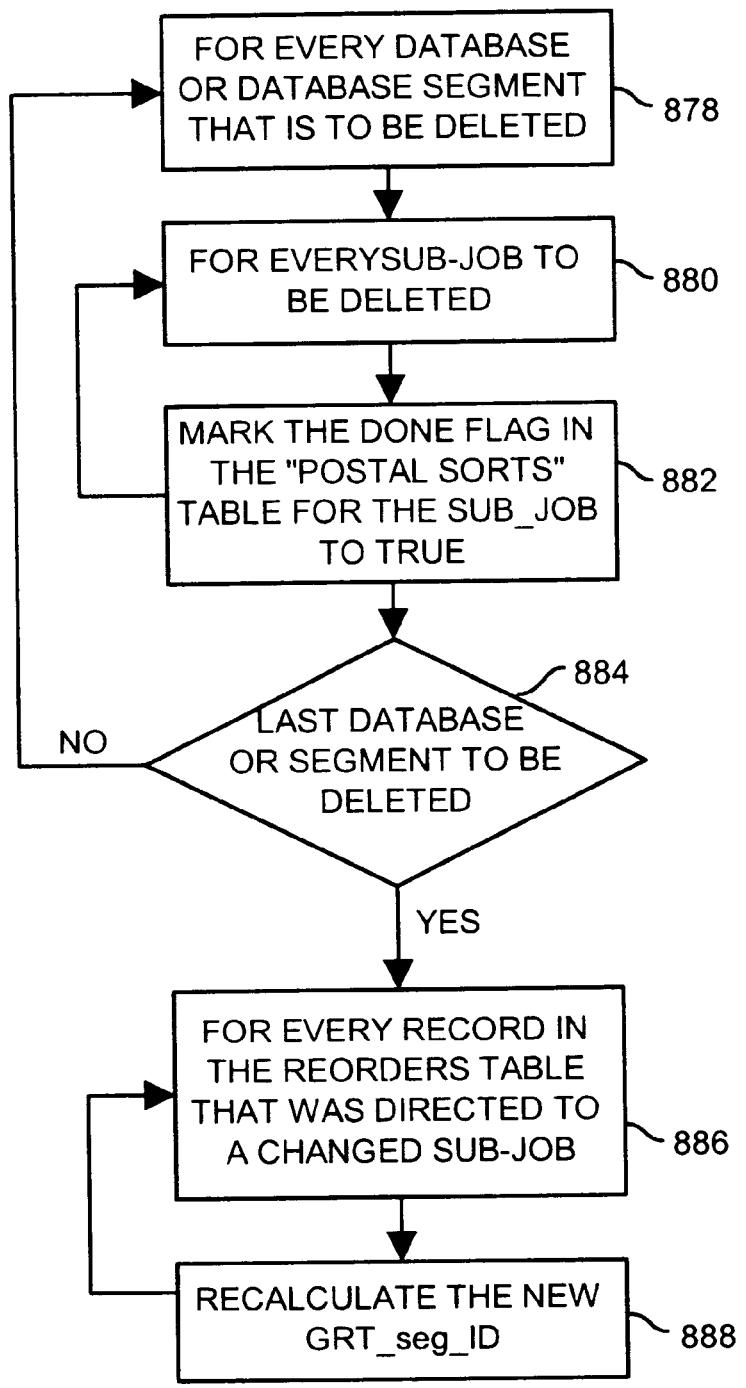

Turning to FIG. 18g, the global reorder processor 510 begins the delete database routine by entering a nested loop illustrated by blocks 878–884. In particular, the global reorder processor 510 identifies the sub-jobs in the postal sorts portion 541 of the global reorder table 540 (block 880) for every database or database segment that is to be deleted (block 878), and sets the done flag for the sub-jobs to be deleted to true (block 882). This process is continued until every sub-job in every database or database segment to be deleted has had its corresponding done flag set to true (block 884). Control then shifts to blocks 886 and 888 where the global reorder processor 510 addresses the reorders portion 555 of the global reorder table 540 to determine if any of the pending reorders were directed to a sub-job whose done flag was changed in the nested loop defined by blocks 878–884. At block 888, the global reorder processor 510 reassigns any such reorders to a new sub-job pursuant to blocks 830–856 shown in FIGS. 18c–18d. The reassignment performed in block 888 ensures that no re-orders that have previously been assigned to a canceled sub-job are inadvertently skipped.

As mentioned above, the reorder system is preferably constructed to automatically reorder books that have been fouled by auxiliary finishing devices. A preferred embodiment for accomplishing this purpose is shown in FIG. 20.

As mentioned above, in the preferred embodiment disclosed in FIG. 13, each of the auxiliary finishing devices includes a device controller 516 and two sensors 512. One of the two sensors 512 is located to monitor books as they are inserted into the finishing device 502, 504, 506, and the other sensor 512 is located to monitor books as they are outputted by the device 502, 504, 506. Although, for clarity of illustration, only one device controller 516 has been included in FIG. 13, in the preferred embodiment, each finishing device, including the auxiliary devices 504 and 506 shown in FIG. 13, is provided with its own device controller 516, and each of these device controllers 516 is coupled to the central storage device 524.

Figure 20:
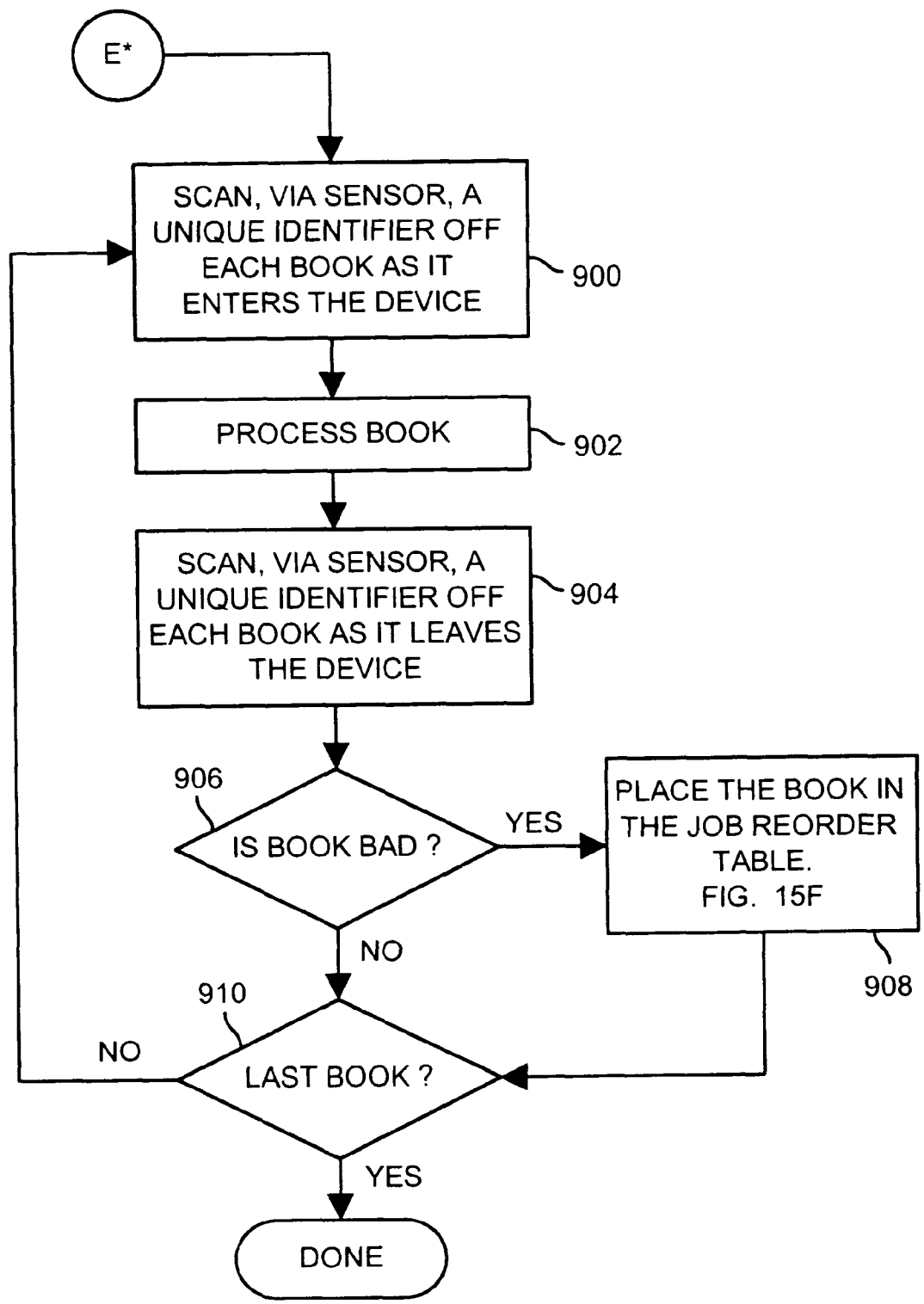
FIG. 20 is a flow chart illustrating exemplary programmed steps performed by the local processor associated with an auxiliary finishing device.

In any event, as shown in FIG. 20, the input sensor 512 and device controller 516 scan each book as it enters the auxiliary finishing device 502, 504, 506 (block 900). The scanned book is then processed by the device (block 902). Each book is then scanned via the output sensor 512 as it leaves the device 502, 504, 506 (block 904). Based on the readings of the input and output sensors 512, the device controller 516 determines whether the book has been fouled by the finishing device 502, 504, 506 (block 906). If an error is detected, control advances to block 908 where the device controller stores the record number of the errored book in the reorder table 550 in the log database 534 (See FIG. 15*f*).

Although in the preferred embodiment, books errored by a finishing device 502, 504, 506, are stored in the reorder table 550 for processing after completion of the job as discussed below in connection with FIGS. 22–23, persons of ordinary skill in the art will appreciate that, if desired, the press controller 516 can instead be adapted to develop and send a new reorder message to the global reorder processor 510. In such an instance, the global reorder processor 510 calls the new reorder routine at block 822 of FIG. 18*a* and processes the new reorder as explained in connection with blocks 824–856 of FIGS. 18*c* and 18*d*. In other words, persons of ordinary skill in the art will appreciate that, for large jobs it may be advantageous to adapt the reorder system to immediately reorder books fouled by auxiliary devices. If such an optional approach is taken, the global reorder processor 510 has the ability to assign reorder jobs resulting from errors by the auxiliary finishing devices to printing presses on the fly. Of course, to enable this approach to proceed without undue processing delays, it will be necessary for the global reorder processor 510 to locate the raster image processed files by referencing the log data base (See FIG. 15*f*).

Returning to FIG. 20, whenever a book output by the auxiliary device 502, 504, 506 has not been fouled (block 906), or after a fouled book has been stored in the re-order table (block 908), control proceeds to block 910. If the local processor 516 determines that there is another book to be processed by the auxiliary device 502, 506, 508, control returns to block 900 (block 910). If, on the other hand, the local processor 516 determines at block 910 that the last book has been processed (block 910), the press controller is finished and waits for the next job to begin on its associated finishing device.

As mentioned above, in the preferred embodiment, each finishing device in each press line includes a device controller 516 and a pair of sensors 512. Each of these press controllers preferably independently perform the steps illustrated by blocks 900–910 in FIG. 20 with one exception discussed below in connection with FIG. 21.

A person of ordinary skill in the art will appreciate that the system could be modified to use a single sensor at the output of the auxiliary device(s), and would identify errored or missed books (e.g., dropped in transition) by comparing the output of the sensor to a list such as the segment lists in the log database 234.

Figure 21:
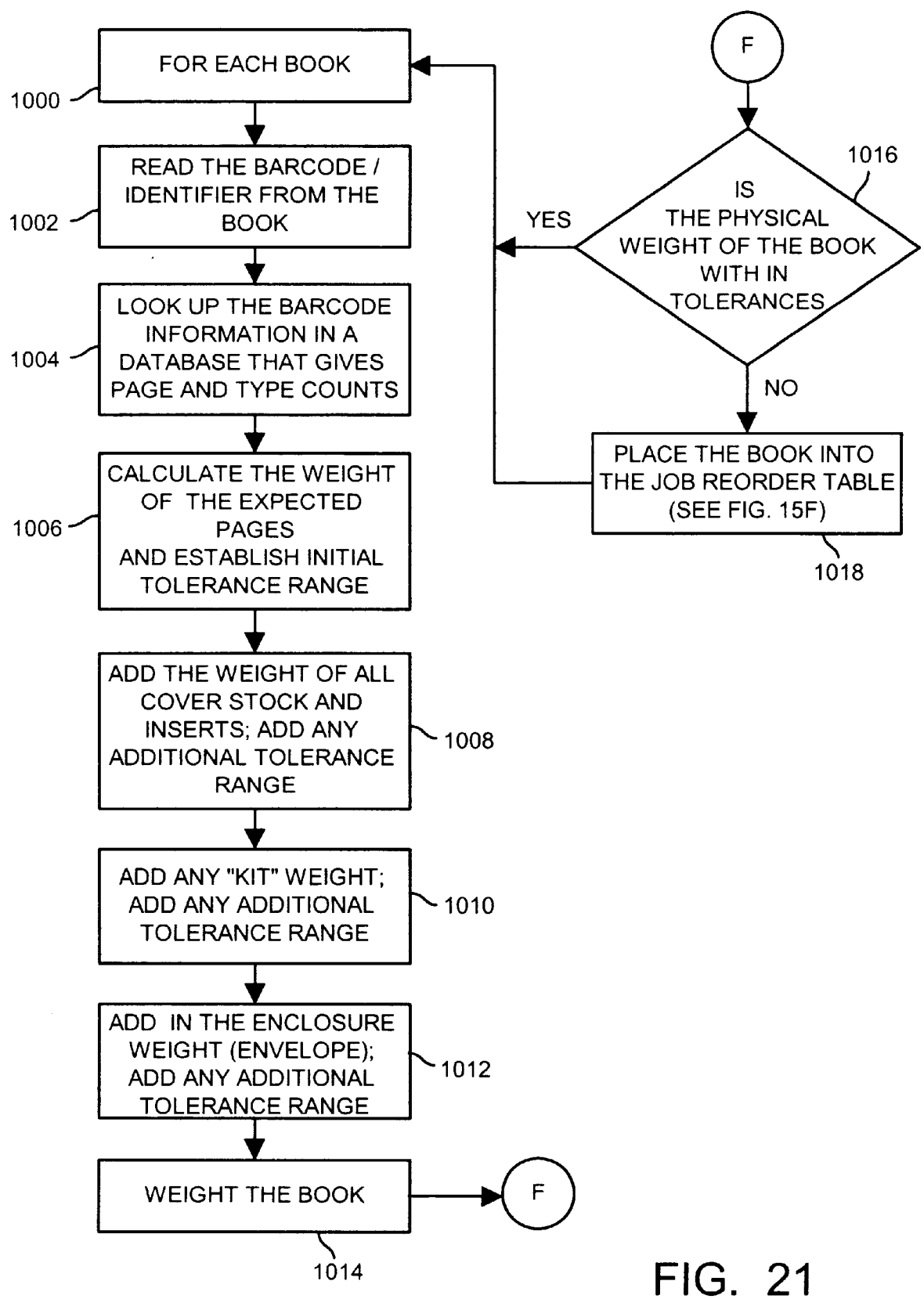
FIG. 21 is a flow chart illustrating exemplary programmed steps performed by a local processor associated with a weight verification device.

The operation of a special type of auxiliary finishing device will now be discussed in connection with FIG. 21. The subject finishing device is a postal weight monitoring device which preferably includes a scale for weighing one or more books and an associated processor for calculating an expected weight of the book(s). If the measured weight of a book falls outside a tolerance range of expected weights for the book, the book can be reordered by either placing it in the job reorder table 550 of the log database 534 (See FIG. 15*f*) or by sending a new reorder message to the global reorder processor 510 to enable the global reorder processor to reorder the book pursuant to block 822–856 of (FIGS. 18*a*, 18*c* and 18*d*).

In the preferred embodiment, the post weight calculating device reads an identifier from each book (blocks 1000 and 1002) via a sensor 512. In the preferred embodiment, the identifier is a bar code, which is read via a bar code sensor. After reading the identifier, the local processor 516 looks up the bar code information in a database that lists page and type counts (block 1004). Block 1004 may be omitted if the page count, name and address of the addressee, or database identifier is embedded in the bar code.

At block 1006, the local processor 516 calculates the expected weight of the identified book based on its expected page count combined with a previously established tolerance range based on the paper weight used in the book. At block 1008, the expected weight of any cover stock and any inserts, together with an additional pre-determined tolerance range for these items, are added to the calculated weight total for the book in question. At block 1010, the local processor 516 adds any applicable expected kit weights (additional fulfillment pieces) (together with any associated pre-determined tolerance) to the calculated weight of the expected book. At block 1012, the expected weight of an envelope (together with any associated pre-determined tolerance weight) is added to the calculated weight of the book identified at block 1002.

At block 1014, the scale of the device is used to weight the book. At block 1016, the local processor 516 compares the measured weight of the book with the expected weight to determine if the subject book falls within the tolerance range developed by blocks 1004–1012. If the actual weight of the book falls within the calculated tolerances, controller 516 returns to block 1000. Otherwise, the book is placed into the job reorder table 550 of the log database 534 (See FIG. 15*f*) for later processing (block 1018) before control returns to block 1000.

Although, in the preferred embodiment, books having a weight falling outside the calculated tolerance range are reordered via the job reorder table 550, persons of ordinary skill in the art will readily appreciate that, if desired, the local processor 516 of the subject auxiliary device could be adapted to develop and send a new reorder message to the global reorder processor 510. In such instances, the global reorder processor 510 processes the reordered book in accordance with blocks 822–856 discussed above in connection with FIGS. 18*a*, 18*c* and 18*d*.

Figure 22A:
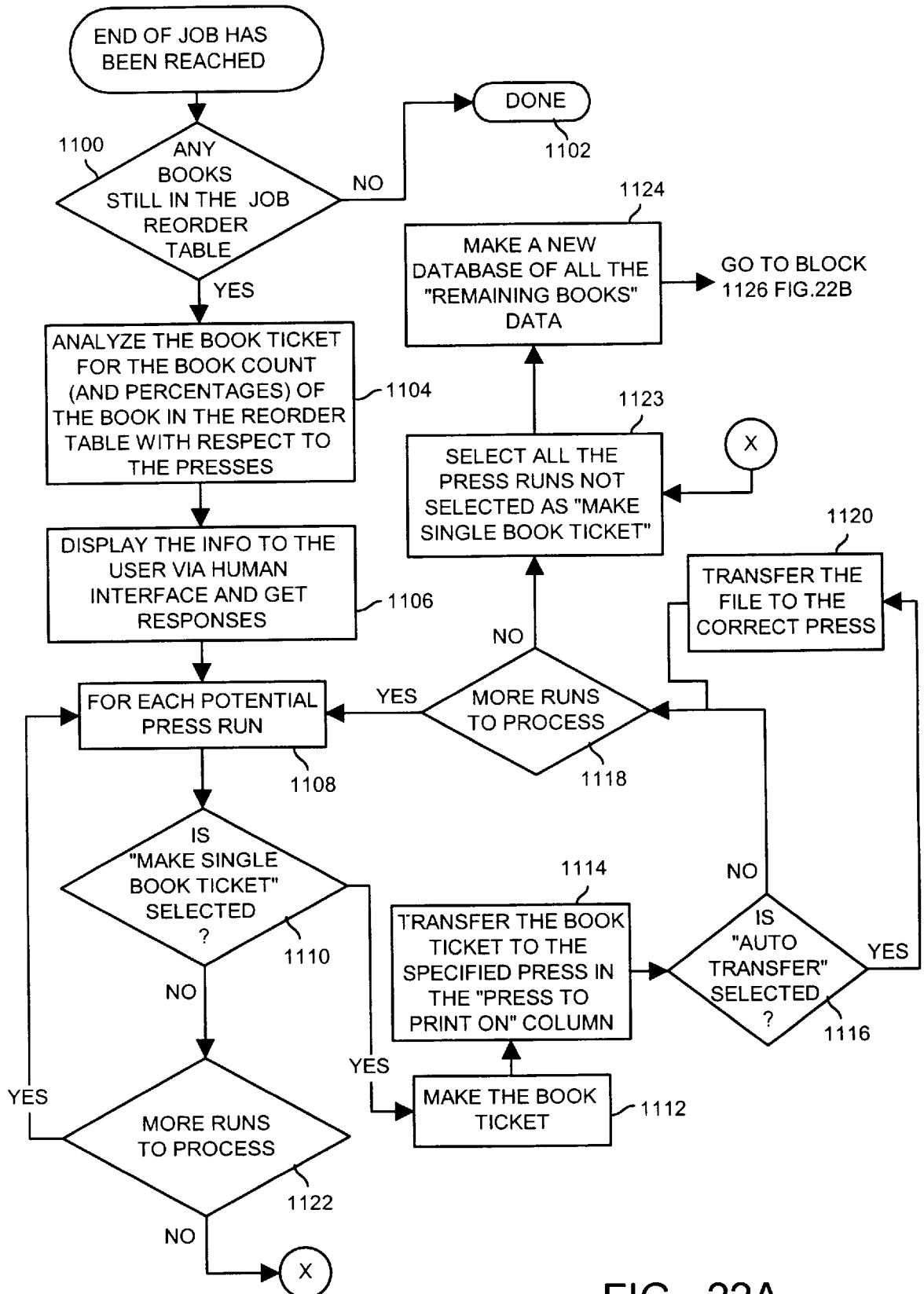
FIGS. 22A–22B are flow chart illustrating exemplary steps performed by the global reorder processor at the end of a job.
Figure 22B:
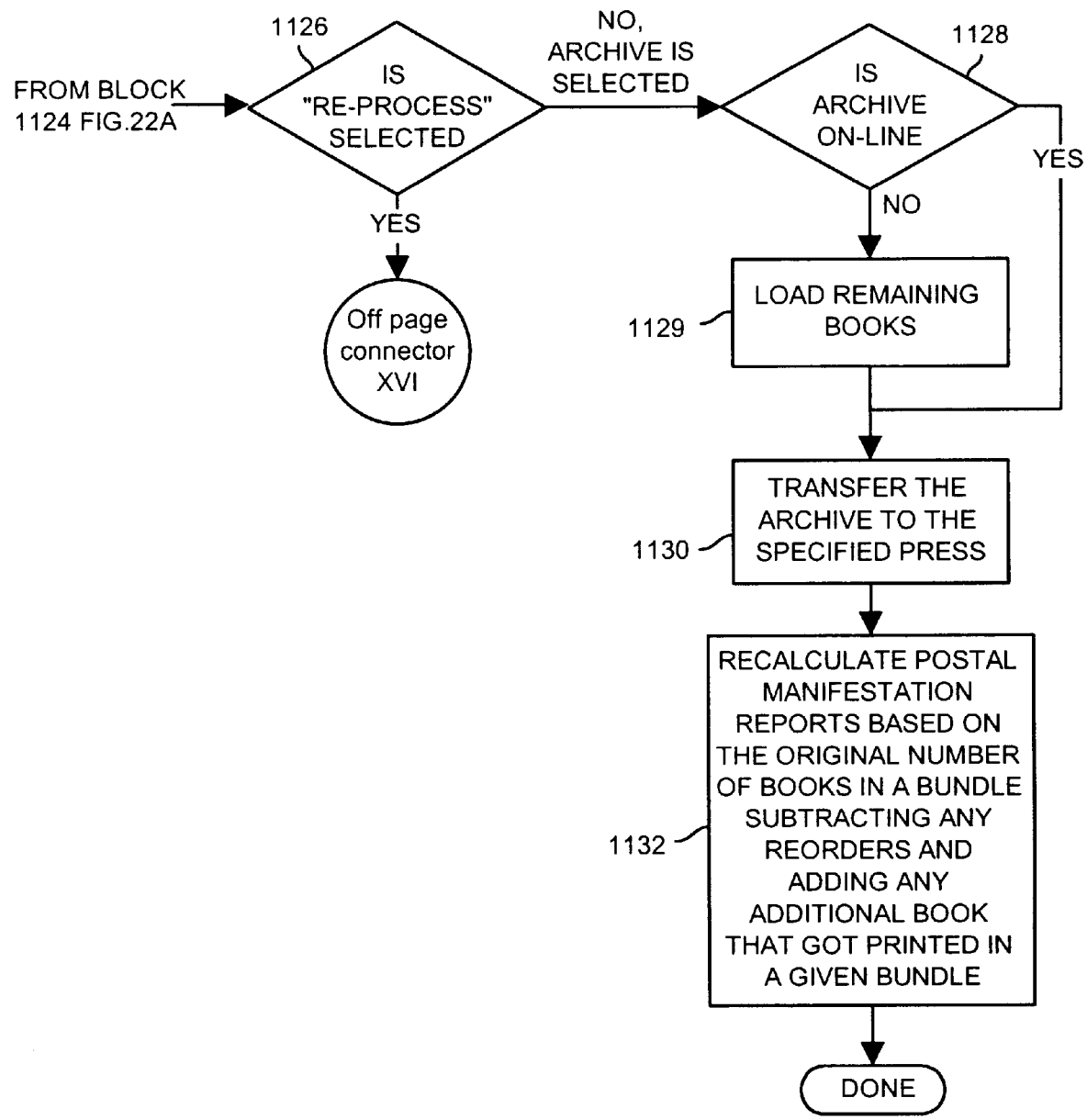

The disclosed reorder system provides a mechanism for re-ordering books contained in the job reorder table 550 of the log database 534 (See FIG. 15*f*) when all presses have completed there assigned jobs. Turning to FIG. 22A, the global reorder processor 510 begins this process by determining whether any books remain in the job reorder table 550 (block 1100). If no books are present in the job reorder table 550, the process terminates (block 1102). Otherwise, the global reorder processor 510 analyses the book ticket identified in the log database 534 to determine how many of the books in the reorder table are still stored to the local drives of the press processors 514 of the individual presses 500 (block 1104). The global reorder processor 510 also calculates the percentage of books to be reprinted remaining on each press. The information developed at block 1104 is then displayed on a display device (block 1106) to enable an operator to decide how to process the remaining jobs.

An exemplary graphical user interface display is shown in FIG. 23. In the illustrated example, the global processor 510 determined that 800 books in the reorder table 550 remain in raster image processed format on press A; 830 of the books in the reorder table 550 remain in raster image processed format on press B; 16 of the books in the reorder table 550 are still in raster image processed format on press C; 14 of the books in the reorder table 550 are still in raster image processed format on press D; and 1024 of the books in the reorder table 550 are not currently in raster image processed format on any press. As shown in FIG. 23, the global reorder processor 510 also determines that the 800 books still on press A constitute 30% of the books requiring reprinting; the 820 books on press B constitute 31% of the books requiring reprinting; the 16 books on press C constitute less then 1% of the books to be reprinted; the 14 books on press D constitute less then 1% of the books to be reprinted; and the 1024 books that are not currently on any press constitute 36% of the books still requiring reprinting.

As shown in FIG. 23, the operator can decide whether or not to make the books present on each of the presses a single book ticket; which press to employ for reprinting the books; whether or not to transfer the files to the selected press; and whether or not reprocessing will be required. After making these selections via the graphical user interface shown in FIG. 23, the operator can initiate the reorder process by selecting the "save/do" button, or the operator can cancel the process and start over by selecting the "cancel" button in a conventional manner.

Optionally, the selection of the reorder parameters in FIG. 23 can be automatically selected based on predefined system guidelines.

Returning to FIG. 22A, after generating the graphical user interface display discussed above, and receiving an indication that the operator has selected the save/do button, the global reorder processor 510 enters a loop defined by blocks 1108–1120. The global reorder processor 510 processes one press run per loop through blocks 1108–1120. For example, with respect to the 800 reorder books on press A, the global reorder processor 510 first determines whether the "make single book ticket" option has been selected (block 1110). If not, the global reorder processor 510 proceeds to the next potential press run via block 1122, in this example, the 820 books on press B.

Since, in this example the operator has selected the "make single book ticket" option for the 800 books on press A, the global reorder processor 510 makes the book ticket at block 1112 and then transfers the book ticket to the press specified in the "press to print on" column of the graphical user interface shown in FIG. 23 (in this instance press A). The global reorder processor 510 then proceeds to block 1116 where it determines whether the "auto file transfer" option has been selected. Since in this example, the "auto file transfer" option has not been selected (see FIG. 23), the global reorder processor 510 proceeds to block 1118 where it determines whether there are more runs to process. Since in this example, there are more runs to process, control returns to block 1108.

The global reorder processor 510 then independently cycles through block 1108–1118 for the remaining presses (B–D) in the same manner as discussed above in connection with press A. With respect to the 14 books on press D, however, upon reaching block 1116, the global reorder processor 510 determines that the "auto file transfer" option has been selected by the operator and, therefore, proceeds to block 1120. At block 1120, the global reorder processor retrieves the raster image processed files on the press controller associated with press D and delivers those files to the press controller associated with press C. Control then proceeds to blocks 1118 and then back to block 1108.

Upon reaching the 1024 books which are not currently stored on any press in raster image processed format (i.e., the last row in FIG. 23), the processor 510, once again begins the loop defined by blocks 1108–1120. However, upon reaching block 1110, the global reorder processor 510 determines that the "make single book ticket" option has not been selected. Accordingly, control proceeds to block 1122 where, if there are more runs to process, control returns block 1108. Otherwise, as in this example, control proceeds to block 1123.

At block 1123, the global reorder processor 510 selects all of the press runs in which the "make single book ticket" option has not been selected (in this example, the 1024 books that do not remain on any press in raster image processed format). These books are referred to hereinafter as "the remaining books".

Control then proceeds to block 1124 where the global reorder processor 510 combines all of the remaining books in a new database. At block 1126 (FIG. 22B), the global reorder processor 510 then determines whether the re-process option has been selected for any of the books in the new database. If so, the global re-order processor 510 transfers the new database to the set-up processor 530, and the set-up processor 530 begins processing the remaining books as a new job at block 614 of FIG. 14a.

If the "reprocess" option is not selected (e.g., the archive option is selected), control proceeds to block 1128. If the global reorder processor 510 determines that the remaining books are not archived on-line, the operator is asked to load the remaining books from its remote storage location such as floppy disk (block 1129). Once the remaining books are placed on-line (block 1129) or, if the remaining books were originally on-line (block 1128), control proceeds to block 1130. At block 1130, the global reorder processor 510 transfers the archived files to the press specified by the operator in the graphical user interface, or to a default press, if no press is specified.

At block 1132, the global reorder processor 510 re-calculates the postal manifestation reports for the entire print job. In particular, the global reorder processor 510 determines whether any book bundles identified in the postal sorts portion 541 of the global reorder table 540 have fallen below the required number of books by subtracting any reorders and adding any additional book printed in a given bundle. It also determines whether any book bundles were bumped up into a discount category by adding reorders thereto. This final re-calculation ensures that the entire print job is properly accorded a proper postal discount. In the preferred embodiment, the re-calculated postal manifestation report is printed out in hard copy or an electronic file is created that can be transmitted to the appropriate postal authority.

Optionally, the reorder system can be adapted such that, if a book bundle or sub-job has fallen out of a postal discount category due to one or more errored books, all of the unprinted books in the sub-job or bundle are transferred to the global reorder processor 510. The global reorder processor then assigns the books in the reordered bundle or sub-job to one or more new sub-jobs in the global reorder table to thereby maximize postal discounts for the reordered books and for the sub-job(s) receiving the reorder books to the extent the additional book(s) push the receiving sub-job (s) into a new postal discount category.

In summary, persons of ordinary skill in the art will appreciate that a new and improved reorder system has been disclosed. The reorder system is capable of immediately locally reordering books errored by a printing press; of transferring errored books from one press to another to maximize postal discounts; and of reordering books fouled by finishing devices. Among other advantages, the disclosed system is able to re-calculate postal discounts to account for books reordered during a given job.

Persons of ordinary skill in the art will readily appreciate that, although in the preferred embodiment, reorders are assigned to sub-jobs to maximize postal discounts, the assignment of reorders could also be based on the amount of processing time required to re-print the job without departing from the scope or spirit of the invention.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. For use with an auxiliary device located downstream from a first printing press printing a stream of books with fixed and variable data, the auxiliary device being adapted to perform a process on books printed by the first printing press, a reorder system comprising:
   a first sensor located downstream of the auxiliary device to monitor books output by the auxiliary device; and
   a local processor associated with the auxiliary device, the local processor being in communication with the first sensor and being adapted to recognize an errored book based at least in part on an output of the first sensor; and,
   a global processor in communication with the local processor, the global processor being responsive to a communication from the local processor identifying the errored book to cause the errored book to be reprinted with fixed and variable data after at least one other book in the stream of books has been printed by the first printing press.

2. A system as defined in claim 1 wherein the local processor identifies a missing book by comparing the output of the first sensor to a list of expected books.

3. A system as defined in claim 1 further comprising a log identifying the variable data and the fixed data to be used to reprint the errored book.

4. A system as defined in claim 1 wherein the auxiliary device comprises one of the group comprising: a folding device, a trimming device, a weighing device, a binding device, a gluing device, a dot wacker, a tip-on, a card feeder, a strapper, and a mechanical co-mailer.

5. A system as defined in claim 1 further comprising a press processor associated with the first printing press for controlling the operation thereof.

6. A system as defined in claim 5 wherein the global processor is in communication with the press processor for causing the first printing press to reprint the errored book in response to signals received by the global processor from the local processor.

7. A system as defined in claim 1 further comprising a second sensor located upstream of the auxiliary device.

8. A system as defined in claim 7 wherein the local processor identifies a missing book by comparing the output of the first sensor with an output of the second sensor.

9. A system as defined in claim 7 wherein the first and second sensors comprise barcode readers.

10. A system as defined in claim 7 wherein the first and second sensors comprise electronic eyes on a positive position device.

11. A system as defined in claim 7 wherein the first and second sensors comprise part of an optical recognition system.

12. A system as defined in claim 1 further comprising a second printing press, the global processor being in selective communication with a first press processor associated with the first printing press and with a second press processor associated with the second printing press, wherein the global processor selectively causes the errored book to be reprinted on one of the first and second printing presses.

13. A system as defined in claim 12 wherein the global processor selects the one of the first and second printing presses to minimize processing time.

14. A system as defined in claim 12 wherein the global processor selects the one of the first and second printing presses to maximize a postal rate discount.

15. A system as defined in claim 14 wherein the global processor selects the one of the first and second printing presses by comparing postal information for the errored book to postal information of a book to be printed by the first printing press.

16. A system as defined in claim 15 wherein the global processor selects the one of the first and second printing presses by comparing postal information for the errored book to postal information of a book to be printed by the second printing press.

17. A system as defined in claim 1 wherein the local processor identifies errored books in a log and, after the stream of books has been processed by the auxiliary device, the global processor causes the errored books to be reprinted in accordance with instructions input by the user.

18. A system as defined in claim 17 further comprising a graphical user interface, the graphical user interface displaying data associated with the errored books and permitting a user to enter instructions specifying how the errored books are to be reprinted.

19. A system as defined in claim 18 wherein the graphical user interface permits the user to specify the printing press to reprint the errored books.

20. A system as defined in claim 18 wherein the graphical user interface permits the user to group the errored books into discrete jobs.

21. A system as defined in claim 20 wherein the processor is adapted to process as a separate job any errored books not grouped into a discrete job by the user.

22. For use with a weight measuring device located downstream from a first printing press printing a stream of books, the weight measuring device being adapted to weigh books printed by the first printing press, a reorder system comprising:
   a first sensor located upstream of the weight measuring device to monitor books entering the weight measuring device;
   a processor in communication with the first sensor for identifying each book input into the weight measuring device, the processor being adapted to calculate an expected weight range for the identified book, and to cause the identified book to be automatically reprinted with fixed and variable data if a measured weight of the identified book developed by the weight measuring device falls outside the expected weight range.

23. A system as defined in claim 22 further comprising a log identifying the variable data and the fixed data to be used to reprint the identified book.

24. A system as defined in claim 22 wherein the expected weight is developed by summing the expected weights of at least two factors in the group comprising: a total paper weight for the identified book, a cover weight for a cover of the identified book, an insert weight for an insert to the identified books, an envelope weight for an envelope associated with the identified book, and a kit weight for a kit associated with the identified book.

25. A system as defined in claim 24 wherein the expected weight is further developed by adding in a weight tolerance for each of the as least two factors.

26. A system as defined in claim 25 wherein the processor comprises a global process and a local processor, the local processor being associated with the weight measuring device.

27. A system as defined in claim 26 further comprising a press processor associated with the first printing press for controlling the operation thereof.

28. A system as defined in claim 27 wherein the global processor is in communication with the press processor for causing the first printing press to reprint the identified book in response to signals received by the global processor from the local processor.

29. A system as defined in claim 26 further comprising a second printing press, the global processor being in selective communication with a first press processor associated with the first printing press and with a second press processor associated with the second printing press, wherein the global processor selectively causes the identified book to be reprinted on one of the first and second printing presses.

30. A system as defined in claim 29 wherein the global processor selects the one of the first and second printing presses to minimize processing time.

31. A system as defined in claim 29 wherein the global processor selects the one of the first and second printing presses to maximize a postal rate discount.

32. A system as defined in claim 31 wherein the global processor selects the one of the first and second printing presses by comparing postal information for the identified book to postal information of a book to be printed by the first printing press.

33. A system as defined in claim 32 wherein the global processor selects the one of the first and second printing presses by comparing the postal information for the identified book to postal information for a book to be printed by the second printing press.

34. For use with a first and a second printing press, a first press processor being associated with the first printing press and a second press processor being associated with the second printing press, a reorder system comprising:
　a global processor in selective communication with each of the first and second press processors; and
　a sensor located downstream of the first printing press for monitoring books output by the first printing press, the sensor being in communication with the first press processor whereby the first press processor can detect errored books and wherein, the first press processor notifies the global processor of the errored book and the global processor causes one of the first and second presses to reprint the errored book.

35. A system as defined in claim 34 wherein the global processor selects the corresponding one of the first and second printing presses to minimize processing time.

36. A system as defined in claim 34 wherein the errored book comprises fixed and variable data, and further comprising a log identifying the variable data to be used to reprint the errored book.

37. A system as defined in claim 34 wherein the global processor causes one of the first and second printing presses to reprint the errored book within a stream of books already being printed.

38. A system as defined in claim 34 wherein the sensor comprises a barcode reader.

39. A system as defined in claim 34 wherein the sensor comprises electronic eyes on a positive position device.

40. A system as defined in claim 34 wherein the sensor comprises part of an optical recognition system.

41. A system as defined in claim 34 wherein the global processor selects the corresponding one of the first and second printing presses to maximize a postal rate discount.

42. A system as defined in claim 41 wherein the global processor selects the one of the first and second printing presses by comparing postal information for the errored book to postal information of a book to be printed by the first printing press.

43. A system as defined in claim 42 wherein the global processor selects the one of the first and second printing presses by comparing the postal information for the errored book to postal information of a book to be printed by the second printing press.

44. A system as defined in claim 34 wherein the global processor identifies errored books in a log and, after the first and second presses have finished printing, causes at least one of the first and second printing presses to reprint the errored books in accordance with instructions input by the user.

45. A system as defined in claim 44 further comprising a graphical user interface, the graphical user interface displaying data associated with the errored books and permitting a user to enter instructions specifying how the errored books are to be reprinted.

46. A system as defined in claim 45 wherein the graphical user interface permits the user to specify the printing press to reprint the errored books.

47. A system as defined in claim 45 wherein the graphical user interface permits the user to group the errored books into discrete jobs.

48. A system as defined in claim 47 wherein the global processor is adapted to process as a separate job any errored books not grouped into a discrete job by the user.

49. A reorder system for use in a printing facility having first and second printing presses, each of the first and second printing presses being adapted to print books including both variable and fixed data, the reorder system comprising:
　a first sensor located to monitor books output by the first printing press; and
　a first press processor associated with the first printing press and being in communication with the first sensor to recognize errored books, the first press processor being adapted to control a printing order of books in a stream of books to be printed by the first printing press in a given job, wherein, upon recognizing an errored book, the first press processor causes the first printing press to insert the errored book into the stream of books to be printed after at least one other book has been printed if re-printing the errored book with the stream will entitle the errored book to at least a first predefined postal discount.

50. A system as defined in claim 49 further comprising a global processor in selective communication with the first press processor, wherein, if the first press processor determines that re-printing the errored book with the stream will not entitle the errored book to at least the first predefined postal discount, the first press processor identifies the errored book to the global processor.

51. A system as defined in claim 50 wherein the global processor instructs a second press processor associated with the second printing press to cause the second printing press to re-print the errored book if re-printing the book on the second printing press will entitle the errored book to at least a second predefined postal discount.

52. A system as defined in claim 51 wherein the first and second postal discounts are identical.

53. A system as defined in claim 51 wherein the first and second postal discounts are different.

54. A system as defined in claim 49 further comprising a second sensor located to monitor books output by the second printing press, and a second press processor associated with the second printing press and being in communication with the second sensor to recognize errored books, the second press processor being adapted to control a printing order of books in a stream of books to be printed by the second printing press in a given job, wherein, upon recognizing an errored book, the second press processor causes the second printing press to insert the errored book into the stream of books to be printed if re-printing the errored book with the stream will entitle the errored book to at least a second predefined postal discount.

55. A system as defined in claim 54 further comprising a global processor in selective communication with the first and second press processors, wherein, if the first press processor determines that re-printing an errored book with the stream associated with the first printing press will not entitle the errored book to at least the first predefined postal discount, the first press processor identifies the errored book to the global processor, and, wherein, if the second press processor determines that reprinting an errored book with the stream associated with the second printing press will not entitle the errored book to at least the second predefined postal discount, the second press processor identifies the errored book to the global processor.

56. A system as defined in claim 55 wherein the global processor is adapted to develop a new job to re-print errored books received from the first and second press processors.

57. A system as defined in claim 55 wherein the global processor is adapted to selectively re-assign errored books received from the first and second printing presses to one of the first and second printing presses for reprinting to optimize a postal discount.

58. A system as defined in claim 57 wherein the postal discount is optimized for a re-assigned errored book.

59. A system as defined in claim 57 wherein the postal discount is optimized for a job as a whole.

60. A system as defined in claim 57 wherein the global processor calculates the postal discounts to which each bundle of books printed by the first and second presses are entitled based on the number of books in each bundle, the number of reprinted books added to each bundle, and the number of errored books removed from each bundle.

61. A method for reordering an errored book detected at an auxiliary device located downstream of a first printing press printing a stream of books containing variable data and fixed data, the method comprising the steps of:

creating at least one database identifying the variable and fixed data to be included in each book in the stream of books;

recording an identifier of each book exiting the auxiliary device;

comparing the identifier of the books exiting the auxiliary device to the at least one database to recognize an errored book; and, ordering one of the group comprising the first printing press and a second printing press to reprint an errored book by using the identifier of the errored book to access the at least one database and providing the fixed and variable data needed to reprint the errored book to the selected one of the first and second printing presses.

62. A method as defined in claim 61 further comprising the step of selecting the one of the first and second printing presses for reprinting the errored book by matching the errored book to a group of books to be printed, wherein grouping the errored book with the group of books entitles the errored book to a postal discount.

63. A method as defined in claim 61 further comprising the step of selecting the one of the first and second printing presses for reprinting the errored book by matching the errored book to a group of books to be printed, wherein grouping the errored book with the group of books entitles the group of books to a postal discount.

64. A method for reordering an errored book detected at an auxiliary device located downstream of a first printing press printing a stream of books containing variable data and fixed data, the method comprising the steps of:

creating at least one database identifying the variable and fixed data to be included in each book in the stream of books;

recording an identifier of each book entering the auxiliary device;

recording the identifier of each book exiting the auxiliary device;

comparing the identifiers of the books entering the auxiliary device with the identifiers of the books exiting the auxiliary device to recognize an errored book; and, ordering one of the group comprising the first printing press and a second printing press to reprint an errored book after at least one other book in the stream has been printed by using the identifier of the errored book to access the at least one database and providing the fixed and variable data needed to reprint the errored book to the selected one of the first and second printing presses.

65. A method as defined in claim 64 further comprising the step of selecting the one of the first and second printing presses for reprinting the errored book by matching the errored book to a group of books to be printed, wherein grouping the errored book with the group of books entitles the errored book to a postal discount.

66. A method as defined in claim 64 further comprising the step of selecting the one of the first and second printing presses for reprinting the errored book by matching the errored book to a group of books to be printed, wherein grouping the errored book with the group of books entitles the group of books to a postal discount.

67. A method for reordering a book printed by a first printing press printing a stream of books, the method comprising the steps of:

identifying a book in the stream of books to be reordered;

determining whether reprinting the book on the first printing press without re-sorting the stream of books will entitle the reprinted book to a predefined postal discount;

automatically reprinting the book on the first printing press only if the reprinted book will be entitled to at least the predefined postal discount.

68. A method for reordering a book printed by a first printing press printing a stream of books, the method comprising the steps of:
   identifying a book in the stream of books to be reordered;
   if reprinting the book on the first printing press without re-sorting the stream of books will not entitle the reprinted book to at least a predefined postal discount, determining if reprinting the book on a second printing press printing a second stream of books without re-sorting the second stream will entitle the reprinted book to at least a second predefined postal discount; and
   reprinting the book on the second printing press if the reprinted book will be entitled to at least the second predefined postal discount.

69. A method for reordering a book printed by a first printing press printing a first stream of books, the method comprising the step of:
   identifying a book in the first stream of books to be reordered;
   determining a first postal discount that the reprinted book will be entitled to if reprinted on the first printing press if the first stream of books is not re-sorted;
   determining a second postal discount that the reprinted book will be entitled to if reprinted on a second printing press printing a second stream of books if the second stream of books is not re-sorted;
   comparing the first postal discount to the second postal discount; and,
   selecting one of the first or second printing presses for reprinting the book based on the comparison between the first and second postal discounts.

70. For use with a first printing press having a first press controller and a second printing press having a second press controller, each of the first and second printing presses printing a stream of books containing fixed and variable data, a reorder system comprising:
   a storage device including a global reorder table, the global reorder table including a list of sub-jobs to be printed by the first and second printing presses, each of the sub-jobs being associated with a group of books to be delivered within a predefined postal area; and
   a global processor coupled to the storage device, the global processor being in communication with the first and second press controllers to update the global reorder table to indicate completion of the sub-jobs by the first and second printing presses, the global processor being further adapted to assign an errored book identified by the first or second press controllers to a sub-job which has not yet been completed in order to optimize a postal discount.

71. A system as defined in claim 70 wherein the predefined postal areas comprise carrier routes.

72. A system as defined in claim 70 wherein the predefined postal areas comprise areas defined by five digit zip codes.

73. A system as defined in claim 70 wherein the predefined postal areas comprise areas defined by first three digits of zip codes.

74. A system as defined in claim 70 wherein the predefined postal areas comprise states.

75. A system as defined in claim 70 further comprising an auxiliary finishing device having an associated device controller, the device controller being coupled to the storage device to identify errored books in a table for subsequent reprinting.

76. A system as defined in claim 70 further comprising an auxiliary finishing device having an associated device controller, the device controller identifying errored books to the global reorder processor, the global processor being further adapted to assign errored books identified by the device controller to a new sub-job which has not yet been completed in order to maximize a postal discount.

77. A system as defined in claim 70 wherein the postal discount is optimized with respect to the errored book.

78. A system as defined in claim 70 wherein the global reorder table includes a book count for each sub-job identifying the number of books associated with each sub-job, and wherein the global processor updates the book count of the new sub-job to reflect the addition of a book and updates the book count of the sub-job wherein the errored book originated to reflect the subtraction of a book.

79. A system as defined in claim 78 wherein the global processor calculates postal discounts for each of the sub-jobs based on the updated book counts.

80. A system as defined in claim 70 wherein the global reorder processor selects the new sub-job by searching the global reorder table for a sub-job containing books addressed to the same postal area as the errored book.

81. A system as defined in claim 80 wherein, in the event multiple sub-jobs are identified by searching the global reorder table, the global processor selects the new sub-job by comparing the book counts of the multiple sub-jobs.

82. A system as defined in claim 70 wherein the global processor is adapted to terminate a sub-job being processed by one of the first and second printing presses and to assign the unprinted books in the terminated sub-job to one or more new sub-jobs containing books addressed to the same postal area as the terminated sub-job if, upon receiving an errored book from one of the first and second press controllers, the global processor determines that the book count of the sub-job associated with the errored book has fallen below a predetermined value and that sub-jobs containing books addressed to the same postal area remain unprinted.

83. A system as defined in claim 82 wherein the predetermined value comprises a minimum number of books that must be contained in a bundle of books for the bundle of books to be entitled to a postal discount.

84. A system as defined in claim 70 wherein the postal discount is optimized with respect to a job defined by a group of the sub-jobs.

85. A system as defined in claim 84 wherein the group comprises all of the sub-jobs.

86. For use with an auxiliary device located downstream from a first printing press printing a stream of books, the auxiliary device being adapted to perform a process on books printed by the first printing press, a reorder system comprising:
   a first sensor located downstream of the auxiliary device to monitor books output by the auxiliary device; and
   a processor in communication with the first sensor, the processor being adapted to recognize an errored book based at least in part on an output of the first sensor, to identify the errored book in a log, and, after the stream of books has been processed by the auxiliary device, to cause the errored books in the log to be reprinted in accordance with instructions input by the user.

87. A system as defined in claim 86 wherein the processor identifies a missing book by comparing an output of the first sensor to a list of expected books.

88. A system as defined in claim 86 wherein the auxiliary device comprises one of the group comprising: a folding device, a trimming device, a weighing device, a binding device, a gluing device, a dot wacker, a tip-on, a card feeder, a strapper, and a mechanical co-mailer.

89. A system as defined in claim 86 further comprising a second sensor located upstream of the auxiliary device.

90. A system as defined in claim 89 wherein the processor identifies a missing book by comparing outputs of the first and second sensors.

91. A system as defined in claim 86 further comprising a graphical user interface, the graphical user interface displaying data associated with the errored books and permitting a user to enter instructions specifying how the errored books are to be reprinted.

92. A system as defined in claim 91 wherein the graphical user interface permits the user to specify the printing press to reprint the errored books.

93. A system as defined in claim 91 wherein the graphical user interface permits the user to group the errored books into discrete jobs.

94. A system as defined in claim 93 wherein the processor is adapted to process as a separate job any errored books not grouped into a discrete job by the user.

95. For use with a weight measuring device located downstream from a first printing press printing a stream of books, the weight measuring device being adapted to weigh books printed by the first printing press, a reorder system comprising:

a press processor associated with the first printing press for controlling the operation thereof;

a first sensor located upstream of the weight measuring device;

a local processor in communication with the first sensor for identifying each book input into the weight measuring device, the local processor being adapted to calculate an expected weight range for the identified book, and to determined that the identified book is errored if the measured weight of the identified book developed by the weight measuring device falls outside the expected weight range; and a global processor in communication with the local processor, the global processor being in communication with the press processor to cause the first printing press to reprint the identified book in response to a signal received by the global processor from the local processor.

96. For use with a weight measuring device located downstream from a first printing press printing a stream of books, the weight measuring device being adapted to weigh books printed by the first printing press, a reorder system comprising:

a first press processor associated with the first printing press for controlling the operation thereof;

a second press processor associated with a second printing press for controlling the operation thereof, a first sensor located upstream of the weight measuring device;

a local processor in communication with the first sensor for identifying each book input into the weight measuring device, the local processor being adapted to calculate an expected weight range for the identified book, and to determined that the identified book is errored if the measured weight of the identified book developed by the weight measuring device falls outside the expected weight range; and a global processor in communication with the local processor, the global processor being in selective communication with the first press processor and with the second press processor to selectively cause the identified book to be reprinted on one of the first and second printing presses if the local processor determines that the identified book is errored.

97. A system as defined in claim 96 wherein the global processor selects the one of the first and second printing presses to minimize processing time.

98. A system as defined in claim 96 wherein the global processor selects the one of the first and second printing presses to maximize a postal rate discount.

99. A system as defined in claim 98 wherein the global processor selects the one of the first and second printing presses by comparing postal information for the identified book to postal information of a book to be printed by the first printing press.

100. A system as defined in claim 99 wherein the global processor selects the one of the first and second printing presses by comparing the postal information for the identified book to postal information for a book to be printed by the second printing press.

* * * * *